(12) United States Patent  
Kurokawa et al.

(10) Patent No.: US 8,373,792 B2  
(45) Date of Patent: Feb. 12, 2013

(54) AUTOFOCUS APPARATUS WITH CORRECTION OF FOCUSING DATA

(75) Inventors: Hiroyuki Kurokawa, Tokyo (JP);
Hirotake Nozaki, Kawasaki (JP);
Koutarou Murakami, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/591,014

(22) Filed: Nov. 4, 2009

(65) Prior Publication Data

US 2010/0110236 A1     May 6, 2010

Related U.S. Application Data

(60) Continuation of application No. 11/785,764, filed on Apr. 19, 2007, now abandoned, and a continuation of application No. 09/550,640, filed on Apr. 14, 2000, now Pat. No. 7,209,175, which is a division of application No. 08/834,926, filed on Apr. 7, 1997, now abandoned.

(51) Int. Cl.
*H04N 5/232* (2006.01)
*G03B 13/00* (2006.01)

(52) U.S. Cl. ........................ 348/345; 348/350

(58) Field of Classification Search .......... 348/345–357; 396/113–114
See application file for complete search history.

(56) References Cited

U.S. PATENT DOCUMENTS

| | | | |
|---|---|---|---|
| 5,097,282 A | 3/1992 | Itoh et al. ...................... 348/345 |
| 5,212,513 A | 5/1993 | Ishida et al. .................. 396/104 |
| 5,264,890 A | 11/1993 | Komiya ........................ 348/355 |
| 5,477,303 A | 12/1995 | Goto ............................ 396/114 |
| 5,597,999 A | 1/1997 | Kinba et al. ............... 250/201.7 |
| 5,619,260 A | 4/1997 | Miyadera | |
| 5,678,097 A | 10/1997 | Suda ............................. 396/113 |
| 5,745,175 A | 4/1998 | Anderson .................... 348/345 |

OTHER PUBLICATIONS

U.S. Appl. No. 11/785,764, filed Apr. 19, 2007, Hiroyuki Kurokawa, et al., Nikon Corporation.
U.S. Appl. No. 09/550,640, filed Apr. 14, 2000, Hiroyuki Kurokawa, et al., Nikon Corporation, Issued U.S. Patent No. 7,209,175.
U.S. Appl. No. 08/834,926, filed Apr. 7, 1997, Hiroyuki Kurokawa, et al., Nikon Corporation.
Office communication mailed from the United States Patent and Trademark Office on Oct. 31, 2003 in the related U.S. Appl. No. 09/550,640.
Office communication mailed from the United States Patent and Trademark Office on Jul. 14, 2004 in the related U.S. Appl. No. 09/550,640.
Office communication mailed from the United States Patent and Trademark Office on Apr. 5, 2005 in the related U.S. Appl. No. 09/550,640.
Office communication mailed from the United States Patent and Trademark Office on Jul. 1, 2005 in the related U.S. Appl. No. 09/550,640.
Office communication mailed from the United States Patent and Trademark Office on May 4, 2009 in the related U.S. Appl. No. 11/785,764.
U.S. Office Action from related U.S. Appl. No. 09/550,640; mailed Mar. 20, 2006.
U.S. Notice of Allowance from related U.S. Appl. No. 09/550,640; mailed Dec. 14, 2006.
U.S. Office Action from related U.S. Appl. No. 08/834,926; mailed Oct. 14, 1999.

*Primary Examiner* — Kelly L Jerabek
(74) *Attorney, Agent, or Firm* — Staas & Halsey LLP

(57) ABSTRACT

An autofocus apparatus with a photographic optical system having a movably disposed focus adjusting lens, an optical element to split light beams received from an object, a plurality of image forming lenses to form images from portions of the split light beams, a plurality of focusing estimating portions to create focusing data for focusing the image of the object on the corresponding image forming lenses, a data detecting device to detect data for focusing the image, a data creating device to correct the detected focusing data, a selecting portion to select from among the focusing estimating portions, and a moving device to move the focus adjusting lens.

5 Claims, 36 Drawing Sheets

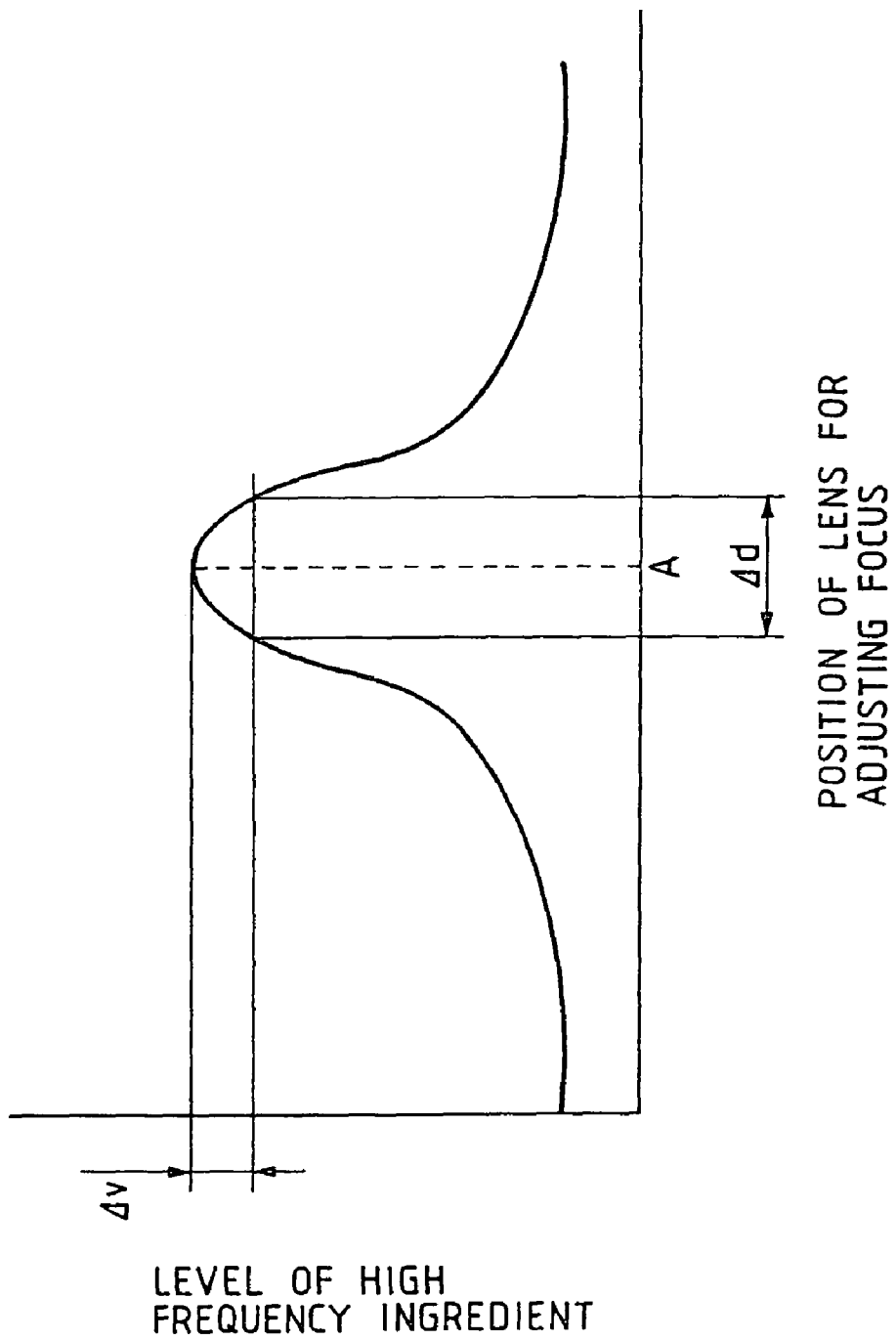

AUTOFOCUS APPARATUS WITH CORRECTION OF FOCUSING DATA

This application is a continuation of U.S. application Ser. No. 11/785,764, filed Apr. 19, 2007, and now pending, which is a continuation application of U.S. application Ser. No. 09/550,640, filed Apr. 14, 2000; and now U.S. Pat. No. 7,209,175, which is a divisional application of U.S. application Ser. No. 08/834,926, filed Apr. 7, 1997, now abandoned, and Japanese Application Nos. 8-085192, 8-085193, 8-116742, 8-116743, 8-154086, 8-154087, the contents of all of the foregoing being incorporated herein by reference in their entirety.

BACKGROUND OF THE INVENTION

1. Field of the Invention

The present invention relates to an autofocus apparatus and a camera that are used for a camera, mainly for a video camera and particularly for a TV camera. The present invention also relates to a lens barrel and a camera that are used chiefly for a lens interchangeable type video camera and particularly for a lens interchangeable type TV camera.

2. Related Background Art

There have hitherto been two kinds of autofocus apparatuses as an autofocus apparatus for a camera. One type is generally called a crest climbing type autofocus apparatus used for mainly a video camera. The other type is called an image deviation type autofocus apparatus employed for chiefly a still camera. The two types of autofocus apparatuses will hereinafter be described with reference to the drawings.

First of all, the crest climbing type autofocus apparatus will be explained with reference to FIGS. 1 and 2. FIG. 1 is a schematic block diagram illustrating the crest climbing type autofocus apparatus. FIG. 2 is an explanatory graph showing a relationship between a level of a high frequency component of a picture signal.

The crest climbing type autofocus apparatus includes, as illustrated in FIG. 1, a photographing optical system 90 constructed of a focus adjusting lens 901, a variable magnification lens 902, a correcting lens 903, a stop 904 and an image forming lens 905. This autofocus apparatus also includes an imaging element 91 for picking up an image formed by the photographing optical system 90 and converting it into an electric signal, a picture signal making device 92 for generating a picture signal corresponding to the electric signal transmitted from the imaging element 91, and a focusing estimated value creating device 93 for creating an item of data (a focusing estimated value) for focusing the image formed on the imaging element 91 on the basis of the picture signal transmitted from the picture signal making device 92. The crest climbing type autofocus apparatus further includes a motor 94 for moving the focus adjusting lens 901 in an optical-axis direction of the photographing optical system 90, and a motor driving device 95 for driving the motor 94 referring to the focusing estimated value obtained by the focusing estimated value creating device 93.

Next, an operation of the crest climbing type autofocus apparatus will be explained. To begin with, the photographing optical system 90 forms an image on the imaging element 91. This image is, after being converted into the electric signal by the imaging element 91, further converted into the picture signal by the picture signal making device 92. This picture signal can be regarded as being formed by synthesizing sine waves of a plurality of frequencies.

By the way, it is well known that the level of the high frequency component of the picture signal, as shown in FIG. 2, rises more steeply as a degree of sharpness of the image formed on the imaging element 91 increases, viz., as the focus adjusting lens move closer to a focusing point A. Then, it is also a generally known fact that when the image on the imaging element 91 is focused on, the high frequency component level of the picture signal reaches its peak. Further, a crest of this level has a tendency of becoming steeper with a higher frequency. While on the other hand, an image forming performance of the lens and an S/N ratio of the picture signal worsen as the frequency gets higher.

Such being the case, the focusing estimated value creating device 93 selects a proper high frequency component from the picture signal obtained by the picture signal making device 92 in consideration of the S/N ratio of the picture signal as well as of the image forming performance of the photographing optical system 90, and creates a focusing estimated value by monitoring the level of this frequency component at an adequate sampling interval. For example, when the level of the selected frequency component is rising, it is estimated that the focus adjusting lens 901 is moving in such a direction as to approach a focusing point. Contrastingly, when the level of the selected frequency component is lowering, it is estimated that the focus adjusting lens 901 is moving in such a direction as to get away from the focusing point. Then, when the level of the selected frequency component exists within a predetermined range (shown by e.g., $\Delta V$ in FIG. 2), it is estimated that the image on the imaging element 91 is focused on.

Next, the motor driving device 95 refers to the focusing estimated values sequentially sent from the focusing estimated value creating device 93, and drives the motor 94 to move the focus adjusting lens 901 to such a position as to make a judgement of being focused on. Thus, in the crest climbing type autofocus apparatus, the focus adjusting lens 901 moves as if climbing the crest of the high frequency. This is the reason why the above autofocus apparatus is called the crest climbing type.

The above crest climbing type autofocus apparatus estimates the focusing by use of the picture signal and is therefore capable of highly accurately focusing the image on the imaging element 91 upon the corresponding object. Further, the image on the imaging element 91 is focused on without providing an element for an exclusive use of measuring a distance, and hence there must be an advantage costwise. Therefore, the apparatus is used as the autofocus apparatus mainly for the video camera.

Next, the image deviation type autofocus apparatus will be explained with reference to the drawings. FIGS. 3, 5 and 7 are explanatory diagrams each showing what the principle of the image deviation type autofocus apparatus is. Herein, FIG. 3 illustrates a light path when in a focused state. FIGS. 5 and 7 show the light paths when in a defocused state. Further, throughout the drawings, the numeral 96 designates an image forming optical system for forming the light beams into a conjugate image. The numeral 97 represents a predetermined focal surface of the image forming optical system 96, and 98a, 98b denote image re-forming lenses, disposed in positions substantially symmetric with respect to the optical axis of the image forming optical system 96, for re-forming some of the light beams (image) into images, which beams have been image-formed by the image forming optical system 96. Designated further by 99a, 99b are line sensors disposed in positions substantially symmetric with respect to the optical axis of the image forming optical system 96 and on predetermined focal surfaces of the image re-forming lenses 98a, 98b.

As illustrated in FIG. 3, when the light beams passing through the image forming optical system are focused on the predetermined focal surface 97, some of the light beams are again image-formed on the line sensors 99*a*, 99*b* through the image re-forming lenses 98*a*, 98*b*. Accordingly, when focused on the predetermined focal surface 97, images $E_1$, $E_2$ picked up by the two line sensors 99*a*, 99*b* are, as illustrated in FIG. 4, formed in substantially coincident positions of the line sensors. On the other hand, as shown in FIG. 5, when the light beams passing through the image forming optical system are focused on anterior to the predetermined focal surface 97 (which is a so-called rear focus state), there must be a deviation between the images $E_1$, $E_2$ picked up by the two line sensors 99*a*, 99*b* as shown in FIG. 6. Further, as illustrated in FIG. 7, when the light beams passing through the image forming optical system are focused on posterior to the predetermined focal surface 97 (which is a so-called front focus state), there must be, as illustrated in FIG. 8, a deviation between the images picked up by the two line sensors 99*a*, 99*b* in a direction opposite to that in the rear focus state.

Hence, it is feasible to calculate a moving direction and a moving quantity of the focus adjusting lens, which are needed for focusing on the predetermined focal surface 97, by detecting a deviating direction and a deviation quantity between the images picked up by the line sensors 99*a*, 99*b*. As discussed above, in the image deviation type autofocus apparatus, the focusing is performed based on the deviating direction and the deviation quantity between the images picked up by the two line sensors 99*a*, 99*b*. This is the reason why the above autofocus apparatus is called the image deviation type.

The above-described image deviation type autofocus apparatus directly calculates the required-for-focusing moving direction and moving quantity of the focus adjusting lens on the basis of the deviating direction and the deviation quantity between the images picked up by the two line sensors 99*a*, 99*b*, and is therefore capable of focusing quickly. The image deviation type autofocus apparatus is therefore used mainly for the still camera.

Principally, the crest climbing type autofocus apparatus has hitherto been used for the video camera. The video camera to which the conventional crest climbing type autofocus apparatus is applied, will hereinafter be explained with reference to the drawings. FIG. 9 is a schematic block diagram showing the video camera to which the prior art crest climbing type autofocus apparatus is applied. FIG. 2 is an explanatory graph showing how a level of a high frequency of the picture signal relates to a position of the focus adjusting lens.

The video camera to which the conventional crest climbing type autofocus apparatus is applied includes, as illustrated in FIG. 9, a lens barrel 8 and a camera body 9 to which the lens barrel 8 is attached.

The lens barrel 8 is so constructed as to be attachable to the camera body 9, and a user is able to interchange the lens barrel 8 attached to the camera body 9 according to applications thereof. Further, the lens barrel 8 has a photographing optical system 120 constructed of a focus adjusting lens 801, a variable magnification lens 802, a correcting lens 803, a stop 804 and an image forming lens 805. The lens barrel 8 also has a motor 122 for moving the focus adjusting lens 801 in the optical-axis direction of the photographing optical system 120, and a motor driving circuit 123 for driving the motor 122 based on a motor driving signal transmitted via a connector 125.

The camera body 9 includes an imaging element 91 for picking up the image obtained by the photographing optical system 120 and converting it into an electric signal, a picture signal making device 92 for generating a picture signal corresponding to the electric signal transmitted from the imaging element 91, and a focusing estimated value creating device 93 for creating the data (a focusing estimated value) for focusing the image on the imaging element 91 on the basis of the picture signal from the picture signal making device 92. The camera body 9 also includes an AF processing circuit 104 for generating a motor driving signal with reference to the focusing estimated value obtained by the focusing estimated value creating device 93, and a connector 105 through which the motor driving signal generated by the AF processing circuit 104 is transmitted to the motor driving circuit 123 of the lens barrel 8. Note that the connector 105 is so constructed as to be electrically connected to a connector 125 of the lens barrel when the lens barrel 8 is attached to the camera body 9.

Next, an autofocusing operation of the video camera shown in FIG. 9 will be explained. At the first onset, the photographing optical system 120 forms the image on the imaging element 91. This image is converted into the electric signal by the imaging element 91 and thereafter converted further into the picture signal by the picture signal making device 92. This picture signal can be regarded as being formed by synthesizing sine waves of a plurality of frequencies.

By the way, it is well known that the level of the high frequency component of the picture signal, as shown in FIG. 2, rises more steeply as a degree of sharpness of the image formed on the imaging element 91 increases, viz., as the focus adjusting lens move closer to a focusing point A. Then, it is also a generally known fact that when the image on the imaging element 91 is focused on, the high frequency component level of the picture signal reaches its peak. Further, a crest of this level has a tendency of becoming steeper with a higher frequency. While on the other hand, an image forming performance of the lens and an S/N ratio of the picture signal worsen as the frequency gets higher.

Such being the case, the focusing estimated value creating device 93 selects a proper high frequency component from the picture signal obtained by the picture signal making device 92 in consideration of the S/N ratio of the picture signal as well as of the image forming performance of the photographing optical system 120, and creates a focusing estimated value by monitoring the level of this frequency component at an adequate sampling interval. For example, when the level of the selected frequency component is rising, it is estimated that the focus adjusting lens 801 is moving in such a direction as to approach a focusing point. Contrastingly, when the level of the selected frequency component is lowering, it is estimated that the focus adjusting lens 801 is moving in such a direction as to get away from the focusing point. Then, when the level of the selected frequency component exists within a predetermined range (shown by e.g., $\Delta V$ in FIG. 2), it is estimated that the image on the imaging element 91 is focused on.

Next, the AF processing circuit 104 refers to the focusing estimated values sequentially sent from the focusing estimated value creating device 93, and generates a motor driving signal to move the focus adjusting lens 801 to such a position as to make a judgement of being focused on. The motor driving circuit 123 drives the motor 122 based on the motor driving signal generated by the AF processing circuit 104.

Thus, in the crest climbing type autofocus apparatus, the focus adjusting lens 801 moves as if climbing the crest of the high frequency. This is the reason why the above autofocus apparatus is called the crest climbing type.

The video camera to which the above crest climbing type autofocus apparatus is applied, estimates the focusing by use of the picture signal and is therefore capable of well accurately focusing on the object corresponding to the image on the imaging element 91. Further, this video camera is advantageous costwise because of focusing the image on the imaging element 91 without providing an element for an exclusive use of measuring a distance.

In the above-described crest climbing type autofocus apparatus, the focus adjusting lens 901 is moved to such a position as to make the judgement of being focused while referring to the focusing estimated values sequentially transmitted from the focusing estimated value creating device 93 at a predetermined sampling interval. This might lead to a problem, in which it takes much time to attain the focusing. Especially when the focus adjusting lens 901 is positioned far from the focusing point (which is a so-called largely defocused state), as illustrated in FIG. 2, a variation in the high frequency component level of the picture signal might be small enough to be hidden by noises, etc., or there must be a high possibility of not indicating a peak of the level thereof. Consequently, the focusing estimated value creating device 93 becomes harder to make the estimation. Therefore, the time till the focusing is attained might extremely elongate in some cases.

The problem of requiring a good deal of time for focusing might bring about a possibility in which the photographer would miss an instantaneous photographing chance on the occasion of reporting news and so forth when, e.g., the above crest climbing type autofocus apparatus is used for the TV camera.

In this respect, the above image deviation type autofocus apparatus is, as stated earlier, capable of focusing quickly. When the image deviation type autofocus apparatus is employed for the video camera, however, it is required that the light beams be diverged from the photographing optical system for forming the image on the imaging element, and the image be formed in a position different from the imaging element surface. Therefore, whether or not the image on the imaging element be focused on is estimated by making use of the image formed in the position different from the imaging element surface. Hence, this leads to a problem of being incapable of focusing with a high accuracy. The high accuracy (a deviation on the image surface in the optical-axis direction of the photographing optical system is within approximately several μm), is required of particularly the autofocus apparatus for the TV camera. Meeting this accuracy in the above image deviation type autofocus apparatus must involve a remarkable increase in costs.

Further, in the video camera to which the above prior art crest climbing type autofocus apparatus is applied, the focus adjusting lens 801 is moved to such a position as to make the judgement of being focused while referring to the focusing estimated values sequentially transmitted from the focusing estimated value creating device 93 at the predetermined sampling interval. Therefore, the problem is that the focusing might need much time. In particular, when the focus adjusting lens 801 is positioned far from the focusing point (which is the so-called largely defocused state), as shown in FIG. 2, the level of the high frequency component of the picture signal remains almost unchanged even by moving the focus adjusting lens 801. Hence, the focusing estimated value creating device 93 is hard to make the estimation in terms of considering the noises, etc. contained in the high frequency components. Consequently, the time needed till the focusing is attained might extremely elongate in some cases. The problem of requiring a good deal of time till the focusing is done might further conduce to the possibility, wherein the photographer would miss the instantaneous photographing chance on the occasion of the reporting news when, e.g., the above-described crest climbing type autofocus apparatus is used for the TV camera.

Moreover, in the video camera to which the above prior art crest climbing type autofocus apparatus is applied, as illustrated in FIG. 9, the camera body incorporates the focusing estimated value creating device and the AF processing device. Therefore, in the video camera, both of the camera body corresponding the autofocusing and the lens barrel corresponding to the relevant camera body, are needed for actualizing the autofocus function. Particularly the camera body of the TV camera employed by a professional cameraman is, however, very expensive and therefore causes such a problem that the user is forced to expend much in order to actualize the autofocus function in that TV camera.

Furthermore, when replacing the lens barrel attached to the video camera body, a so-called tracking adjustment is required to be performed, wherein a predetermined focal surface of the lens barrel is adjusted to the imaging element surface of the video camera body by moving the image forming lens of the lens barrel in the optical-axis direction of the lens barrel. Upon carrying out the tracking adjustment, there must be produced a deviation in an optical positional relationship between the imaging element surface of the video camera body and the predetermined focal surface 97 for estimating the focusing, resulting in a decline in terms of the focusing accuracy.

SUMMARY OF THE INVENTION

It is a primary object of the present invention, which was contrived under such circumstances, to provide an autofocus apparatus, a camera and a lens barrel that are inexpensive and capable of focusing quickly with a high accuracy.

It is another object of the present invention to provide a lens barrel capable of actualizing an autofocus function even when attached to a camera body incorporating no autofocus function.

It is a further object of the present invention to provide an autofocus apparatus capable of focusing on a photographing target at a high efficiency.

To accomplish the above objects, an autofocus apparatus according to the present invention comprises a photographing optical system having at least a focus adjusting lens disposed movably and an optical element for splitting light beams inputted and emerging from an object. The autofocus apparatus also comprises a first focusing estimating device having a first optical system for forming an image corresponding to the object by inputting one light beam of the light beams split by the optical element, a first imaging element for picking up the image obtained by the first optical system and converting it into an electric signal, and a first data creating device for selecting a proper frequency component from the electric signal obtained by the first imaging element and, on the basis of a level of this frequency component, creating an item of data for focusing the image on the first imaging element upon the object. The autofocus apparatus further comprises a second focusing estimating device having a second optical system for forming an image corresponding to the object by inputting the other light beam of the light beams split by the optical system, an image re-forming optical system for respectively re-forming, into images, the light beams passing through portions with different pupils among the light beams for forming the image formed by the second optical system, a second imaging element for picking up the images obtained by the image re-forming optical system, and a second data creating device for creating an item of data for focusing the image on the first imaging element upon the object on the basis of a positional deviation between the images on the second imaging element. The autofocus apparatus still further comprises a focusing estimation selecting device for selecting at least one item of data out of the data given from the first focusing estimating device and the data from the second focusing estimating device, and a moving device for moving the focus adjusting lens on the basis of the data selected by the focusing estimation selecting device.

Herein, it is preferable that the focusing estimation selecting device selects the data from the second focusing estimating device when the image picked up by the first imaging element is roughly focused on, and selects the data from the first focusing estimating device when the image picked up by the first imaging element is finely focused on.

Further, the focusing estimation selecting device, if any one item of the data of two items of data from the first focusing estimating device and from the second focusing estimating device is useless, may select the other item of data. Herein, "being useless" implies a case in which the image on the first imaging element can not be focused with that estimated value. It is because, as described in the prior art, the principle of the crest climbing method is absolutely different from that of the image deviation method, and the focusing point is undetectable depending on the objects as the case may be.

Furthermore, the focusing estimation selecting device may select any one item of data of two items of data from the first focusing estimating device and from the second focusing estimating device with reference to data for specifying a depth of field. Herein, the "data for specifying the depth of field" correspond to, e.g., an aperture value of the photographing optical system, positions of the focus adjusting lens and of the variable magnification lens in the photographing optical system, and an existence or non-existence and a kind of an optical accessary.

The autofocus apparatus according to the present invention may further comprise an object dimension calculating device for calculating a real dimension of the object on the basis of a distance from an image side principal point of the photographing optical system to an image surface, a distance from an object-side principal point of the photographing optical system to the object, and a dimension of the object on the first imaging element. The autofocus apparatus may still further comprise an object dimension setting device for setting a dimension of the object, and a focusing object controlling device for comparing the object real dimension calculated by the object dimension calculating device with the object dimension set by the object dimension setting device, and controlling the first focusing estimating device and the second focusing estimating device on the basis of a result of this comparison.

The real dimension Y of the object is expressed by the following formula:

$$Y = ay/b$$

where b is the distance from the image side principal point of the photographing optical system to the image surface, a is the distance from the object-side principal point of the photographing optical system to the object, and y is the dimension of the object on the first imaging element. Herein, the distance a from the object-side principal point of the photographing optical system to the object, can be calculated based on an imaging positional deviation between the images respectively picked up by the plurality of second imaging elements in the second focusing estimating device. Further, the dimension y of the object on the first imaging element can be obtained by executing the image processing on the electric signal transmitted from the first imaging element.

Incidentally, it is preferable that the focusing object controlling device controls the first focusing estimating device and the second focusing estimating device so as to focus on the relevant object when the object real dimension calculated by the object dimension calculating device is substantially the same as the object dimension set by the object dimension setting device, or alternatively the focusing object controlling device controls the first focusing estimating device and the second focusing estimating device so as to focus on an object exclusive of the relevant object.

Moreover, if the second focusing estimating device is disposed so that the plurality of image re-forming optical systems and the plurality of second imaging elements are capable of picking up a plurality of portions of the image formed by the second optical system, it is preferable that the object dimension calculating device is capable of calculating the real dimension of respective objects corresponding to the plurality of portions of the image formed by the second optical system.

Furthermore, it is preferable that the object real dimension calculated by the object dimension calculating device is displayed on a display medium such as a monitor, a finder, etc. or stored on storage medium such as a video tape or the like together with the picture signal.

The autofocus apparatus according to the present invention may further comprise a focus area setting device for setting a size of a focus area. The first focusing judging device may create the data for focusing the image on the first imaging element upon the object, with respect to the focus area having the size set by the focus area setting device. Herein, the "focus area" is an area in which to create the data for focusing on the object in an area on the first imaging element.

Note that the focus area setting device preferably sets the size of the focus area of the first focusing estimating device smaller than the focus area of the second focusing estimating device. Further, the focus area setting device may set the size of the focus area of the first focusing estimating device larger than the focus area of the second focusing estimating device.

Moreover, when a plurality of focus areas are previously set in the second focusing estimating device, it is preferable that the focus area setting device detects the focus areas adjacent to each other and having substantially the same distance from the photographing optical system to the object corresponding to the image on the relevant focus area out of the plurality of focus areas on the basis of pieces of data respectively created about the plurality of focus areas by the second focusing estimating device, and sets a size of the focus area of the first focusing estimating device in accordance with a total size of these focus areas.

Also, a focus size inputting device for inputting data about the size of the focus area is provided, and the focus area setting device may set the size of the focus of the first focusing estimating device on the basis of the data about the focus area size inputted by the focus size inputting device.

The autofocus apparatus according to the present invention may be provided with a focus position inputting device for inputting data about a position of the focus area. The first focusing judging device and the second focusing judging device may create the data for focusing the image on the first imaging element upon the object with respect to the focus area existing in the position inputted by the focus position inputting device.

Note that the focusing estimation selecting device preferably selects only the data given from the first focusing estimating device when the focus area position inputted by the focus position inputting device is a position in which the image can not be detected by the image re-forming optical system of the second focusing estimating device.

Displayed also on a display medium such as a monitor, a finder, etc. are the data by which the focus area of the first focusing estimating device can be identified when the focusing estimation selecting device selects the data obtained by the first focusing estimating device, and the data by which the focus area of the second focusing estimating device can be identified when selecting the data obtained by the second focusing estimating device.

Another autofocus apparatus according to the present invention comprises a photographing optical system having at least a focus adjusting lens disposed movably, and an image forming lens for forming an image corresponding to an object by inputting light beams emerging from the object. The autofocus apparatus also comprises an imaging element for picking up an image obtained by the photographing optical system and converting it into an electric signal, and a data creating device for selecting a proper frequency component from the electric signal obtained by the imaging element, and creating an item of data for focusing the image on the imaging element upon the object on the basis of a level of this frequency component. The autofocus apparatus further comprises a moving device for moving the focus adjusting lens on the basis of the data created by the data creating device. The autofocus apparatus may also comprise a distance measuring device for measuring a distance from an object-side principal point of the photographing optical system to the object. The autofocus apparatus may further comprise an object dimension calculating device for calculating a real dimension of the object on the basis of the distance, measured by the distance measuring device, from an object-side principal point of the photographing optical system to the object, a distance from an image side principal point of the photographing optical system to an image surface, and a dimension of the object on the first imaging element, an object dimension setting device for setting a dimension of the object, and a focusing object controlling device for comparing the object real dimension calculated by the object dimension calculating device with the object dimension set by the object dimension setting device, and controlling an area in which the data creating device creates the data for focusing the image on the first imaging element upon the object on the basis of a result of this comparison.

Still another autofocus apparatus according to the present invention comprises a photographing optical system having at least a focus adjusting lens disposed movably, and an optical element for splitting light beams inputted and emerging from an object, and a first optical system for forming an image corresponding to the object by inputting one light beam of the light beams split by the optical element. The autofocus apparatus also comprises a first imaging element for picking up the image obtained by the first optical system, a second optical system for forming the image corresponding to the object by inputting the other light beam of the light beams split by the optical element, and an image re-forming optical system for respectively re-forming, into images, the light beams passing through portions with different pupils among the light beams for forming the image formed by the second optical system. The autofocus apparatus further comprises a second imaging element for picking up the images obtained by the image re-forming optical system, a data creating device for creating an item of data for focusing the image on the first imaging element upon the object on the basis of a positional deviation between the images on the second imaging element, a moving device for moving the focus adjusting lens on the basis of the data created by the data creating device, and an object dimension calculating device for calculating a real dimension of the object on the basis of a distance from an image side principal point of the photographing optical system to an image surface, a distance from an object-side principal point of the photographing optical system to the object, and a dimension of the object on the first imaging element. The autofocus apparatus still further comprises an object dimension setting device for setting a dimension of the object, and a focusing object controlling device for comparing the object real dimension calculated by the object dimension calculating device with the object dimension set by the object dimension setting device, and controlling an area in which the data creating device creates the data for focusing the image on the first imaging element upon the object on the basis of a result of this comparison.

A camera according to the present invention is attachable with a lens barrel comprising a photographing optical system having at least a focus adjusting lens disposed movably, and an optical element for splitting light beams inputted and emerging from an object, a first optical system for forming an image corresponding to the object by inputting one light beam of the light beams split by the optical element, and a moving device for moving the focus adjusting lens. Preferably, the camera comprises a first focusing estimating device having a first imaging element for picking up the image obtained by the first optical system and converting it into an electric signal, and a first data creating device for selecting a proper frequency component from the electric signal obtained by the first imaging element and, on the basis of a level of this frequency component, creating an item of data for focusing the image on the first imaging element upon the object. The camera also comprises a second focusing estimating device having a second optical system for forming an image corresponding to the object by inputting the other light beam of the light beams split by the optical system, an image re-forming optical system for respectively re-forming, into images, the light beams passing through portions with different pupils among the light beams for forming the image formed by the second optical system, a second imaging element for picking up the images obtained by the image re-forming optical system, and a second data creating device for creating an item of data for focusing the image on the first imaging element upon the object on the basis of a positional deviation between the images on the second imaging element. The camera further comprises a focusing estimation selecting device for selecting at least one item of data out of the data given from the first focusing estimating device and the data from the second focusing estimating device, and a controlling device of controlling the moving device on the basis of the data selected by the focusing estimation selecting device.

Herein, the first focusing estimating device estimates the image on the first imaging element by use of a so-called crest climbing method. As stated in the prior art, it is well known that the level of the high frequency component of the electric signal obtained by the imaging element rises more steeply according as a degree of sharpness of the image formed on the imaging element increases, videlicet, as the focus adjusting lens moves closer to the focusing point, and this level reaches its peak when the image on the imaging element is focused on. This being the case, the first focusing estimating device selects a proper frequency component in consideration of an S/N ratio of the electric signal as well as of an imaging performance of the photographing optical system, out of the electric signal obtained by the first imaging element. Then, the first focusing estimating device creates the data (a focusing estimated value) for focusing the image on the first imaging element by monitoring the level of this frequency component at a predetermined sampling interval. For example, when the level of the selected frequency component rises, it is estimated that the focus adjusting lens is moving in such a direction as to approach the focusing point. Further, when the level of the selected frequency component lowers, it is estimated that the focus adjusting lens is moving in such a direction as to get away from the focusing point. Then, when the level of the selected frequency component exists within a predetermined range from the peak value, it is estimated that the image on the first imaging element is focused on.

Moreover, the second focusing estimating device estimates the image on the first imaging element by use of a so-called image deviation method. The light beams diverged by the photographing optical system, after being image formed by the second optical system, pass through the plurality of image re-forming optical systems and respectively form images on the corresponding second imaging elements. Herein, it is preferable that each of the second imaging elements is disposed to make output signals of the picked-up images coincident with each other when the image on the first imaging element is focused on. The second data creating device detects a deviating direction and a deviation quantity between the images picked up by the respective imaging elements, thereby creating the data (the focusing estimated value) for focusing the image on the first imaging element.

In the autofocus apparatus of the present invention, the first focusing estimating device creates the focusing estimated value by use of the so-called crest climbing method, and the second focusing estimating device creates the focusing estimated value by use of the so-called image deviation method. Then, the focusing estimation selecting device selects at least one of the focusing estimated value created by the first focusing estimating device and the focusing estimated value created by the second focusing estimating device, and the focus adjusting lens is moved based on the selected focusing estimated value.

Accordingly, the focusing estimation selecting device is set so that at first the image on the first imaging element is roughly focused on by use of the focusing estimated value of the second focusing estimating device, and thereafter the image on the first imaging element is finely focused on by employing the focusing estimated value of the first focusing estimating device. It is therefore feasible to execute focusing quickly with a high accuracy. Further, the high accuracy is not required of the second focusing estimating device using the image deviation method, and hence the costs can be restrained.

Further, if any one of the first focusing estimated value and the second focusing estimated value is useless, the focusing estimation selecting device is set to select the other estimated value, whereby the focusing on the object can be done more surely.

Furthermore, the focusing estimation selecting device is set to select at least one of the first focusing estimated value and the second focusing estimated value with reference to the depth of field. With this setting, it is possible to select the data given from the second focusing estimating device if a focusing accuracy in the first focusing estimating device is inferior to a focusing accuracy in the second focusing estimating device.

Moreover, the autofocusing apparatus of the present invention is provided with the object dimension calculating device, the object dimension setting device and the focusing object controlling device that are constructed as described above. With this construction, a focusing range can be further limited by focusing on the object concerned only when the object real dimension calculated by the object dimension calculating device is coincident with a photographing target dimension set by the object dimension setting device. Further, the first focusing estimating device is made to create the estimated value in a small area, with the result that the second focusing estimating device does not necessarily create the estimated value in the small area enough to decrease a resolution of the second focusing estimating device. The costs for the second focusing estimating device can be thereby restrained.

Moreover, when the autofocus apparatus of the present invention is provided with the above-constructed focus area setting device, for example, the focus area of the first focusing estimating device is set smaller than the focus area of the second focusing estimating device, thereby making it feasible to decrease a detection sensitivity of the imaging positional deviation with respect to the second focusing estimating device. The resolution of the second imaging element can be thereby enhanced, and consequently the costs for the second focusing estimating device can be restrained.

Further, in another autofocus apparatus according to the present invention, with the construction described above, for instance, only a specified object (e.g., human being) can be focused on from within the photographic area by focusing on the object concerned only when the object real dimension calculated by the object dimension calculating device is coincident with the photographing target dimension set by the object dimension setting device.

A lens barrel according to the present invention is attachable to a camera body having a first focusing estimating device for creating focusing data for focusing an image on an imaging surface upon an object on the basis of a level of a frequency component selected from an electric signal obtained by an image formed on the imaging surface. Preferably, the lens barrel comprises a photographing optical system having a focus adjusting lens disposed movably, a beam splitting element for splitting light beams incident on the focus adjusting lens and emerging from the object, and a first image forming lens for forming one light beam of the light beams split by the beam splitting element into an image. The photographing optical system guides the light beam incident on the first image forming lens and emerging from the object onto the imaging surface. The lens barrel also comprises a second focusing estimating device having a second image forming lens for forming the other light beam of the light beams split by the beam splitting element into an image, at least one pair of image re-forming lenses for respectively re-forming, into images, the light beams emerging from the object which beams have been image-formed by the second image forming lens, and an imaging element for picking up the images obtained by at least one pair of image re-forming lenses, the second focusing estimating device creating an item of focusing data for focusing the image on the imaging surface upon the object on the basis of an imaging positional deviation on the imaging element between the images obtained by at least one pair of image re-forming lenses. The lens barrel further comprises a moving device for moving the focus adjusting lens on the basis of the focusing data created by the first focusing estimating device or the second focusing estimating device.

It is preferable that the lens barrel according to the present invention further comprises a selecting device for selecting at least one of the first focusing estimating device and the second focusing estimating device. The moving device moves the focus adjusting lens on the basis of the focusing data created by the focusing estimating device selected by the selecting device.

A lens barrel according to the present invention is attachable to a camera body for generating an electric signal based on an image formed in an imaging surface. Preferably, the lens barrel comprises a photographing optical system having a focus adjusting lens disposed movably, a beam splitting element for splitting light beams incident on the focus adjusting lens and emerging from an object, and a first image forming lens for forming one light beam of the light beams split by the beam splitting element into an image. The photographing optical system guides the light beam incident on the first image forming lens and emerging from the object onto the imaging surface. The lens barrel also comprises a first focusing estimating device for creating focusing data for focusing an image on the imaging surface upon the object on the basis of a level of a frequency component selected from the electric signal. The lens barrel further comprises a second focusing estimating device having a second image forming lens for forming the other light beam of the light beams split by the beam splitting element into an image, at least one pair of image re-forming lenses for respectively re-forming, into images, the light beams emerging from the object which beams have been image-formed by the second image forming lens, and an imaging element for picking up the images obtained by at least one pair of image re-forming lenses, the second focusing estimating device creating an item of focusing data for focusing the image on the imaging surface upon the object on the basis of an imaging positional deviation on the imaging element between the images obtained by at least one pair of image re-forming lenses. The lens barrel still further comprises a selecting device for selecting at least one of the first focusing estimating device and the second focusing estimating device, and a moving device for moving the focus adjusting lens on the basis of the focusing data created by the focusing estimating device selected by the selecting device.

In the present invention, it is preferable that the selecting device, if the imaging positional deviation detected by the positional deviation detecting device is under a predetermined value, selects the first focusing estimating device and, if larger than the predetermined value, selects the second focusing estimating device.

A lens barrel according to the present invention is attachable to a camera body containing identification data indicating whether to have a first focusing estimating device for creating an item of focusing data for focusing an image on an imaging surface upon an object on the basis of a level of a predetermined frequency component selected from an electric signal obtained by an image formed on the imaging surface. Preferably, the lens barrel comprises a photographing optical system having a focus adjusting lens disposed movably, a beam splitting element for splitting light beams incident on the focus adjusting lens and emerging from an object, and a first image forming lens for forming one light beam of the light beams split by the beam splitting element into an image. The photographing optical system guides the light beam incident on the first image forming lens and emerging from the object onto the imaging surface. The lens barrel also comprises a second focusing estimating device having a second image forming lens for forming the other light beam of the light beams split by the beam splitting element into an image, at least one pair of image re-forming lenses for respectively re-forming, into images, the light beams emerging from the object which beams have been image-formed by the second image forming lens, and an imaging element for picking up the images obtained by at least one pair of image re-forming lenses, the second focusing estimating device creating an item of focusing data for focusing the image on the imaging surface upon the object on the basis of an imaging positional deviation on the imaging element between the images obtained by at least one pair of image re-forming lenses. The lens barrel further comprises a judging device for judging whether or not the camera body has the first focusing estimating device on the basis of the identification data, and a selecting device for selecting, if the judging device judges that the camera body does not have the first focusing estimating device, the second focusing estimating device, and selecting, if the judging device judges that the camera body has the first focusing estimating device, at least one of the first focusing estimating device and the second focusing estimating device. The lens barrel still further comprises a moving device for moving the focus adjusting lens on the basis of the focusing data created by the focusing estimating device selected by the selecting device.

In the present invention, it is preferable that the selecting device, when the judging device judges that the camera body has the first focusing estimating device, selects the first focusing estimating device if the imaging positional deviation detected by the positional deviation detecting device is under a predetermined value, and, if larger than the predetermined value, selects the second focusing estimating device.

A camera according to the present invention preferably comprises a camera body for generating an electric signal based on an image form on an imaging surface, and a lens barrel comprising a photographing optical system having a focus adjusting lens disposed movably, a beam splitting element for splitting light beams incident on the focus adjusting lens and emerging from an object, and a first image forming lens for forming one light beam of the light beams split by the beam splitting element into an image. The photographing optical system guides the light beam incident on the first image forming lens and emerging from the object onto the imaging surface. The camera also comprises a first focusing estimating device for creating focusing data for focusing an image on the imaging surface upon the object on the basis of a level of a frequency component selected from the electric signal, and a second focusing estimating device having a second image forming lens for forming the other light beam of the light beams split by the beam splitting element into an image, at least one pair of image re-forming lenses for respectively re-forming, into images, the light beams emerging from the object which beams have been image-formed by the second image forming lens, and an imaging element for picking up the images obtained by at least one pair of image re-forming lenses, the second focusing estimating device creating an item of focusing data for focusing the image on the imaging surface upon the object on the basis of an imaging positional deviation on the imaging element between the images obtained by at least one pair of image re-forming lenses. The camera further comprises a selecting device for selecting at least one of the first focusing estimating device and the second focusing estimating device, and a moving device for moving the focus adjusting lens on the basis of the focusing data created by the focusing estimating device selected by the selecting device. The camera body incorporates the first focusing estimating device and the selecting device, while the lens barrel incorporates the second focusing estimating device and the moving device.

A camera according to the present invention preferably comprises a camera body for generating an electric signal based on an image form on an imaging surface, and a lens barrel comprising a photographing optical system having a focus adjusting lens disposed movably, a beam splitting element for splitting light beams incident on the focus adjusting lens and emerging from an object, and a first image forming lens for forming one light beam of the light beams split by the beam splitting element into an image. The photographing optical system guides the light beam incident on the first image forming lens and emerging from the object onto the imaging surface. The camera also comprises a first focusing estimating device for creating focusing data for focusing an image on the imaging surface upon the object on the basis of a level of a frequency component selected from the electric signal, and a second focusing estimating device having a second image forming lens for forming the other light beam of the light beams split by the beam splitting element into an image, at least one pair of image re-forming lenses for respectively re-forming, into images, the light beams emerging from the object which beams have been image-formed by the second image forming lens, and an imaging element for picking up the images obtained by at least one pair of image re-forming lenses, the second focusing estimating device creating an item of focusing data for focusing the image on the imaging surface upon the object on the basis of an imaging positional deviation on the imaging element between the images obtained by at least one pair of image re-forming lenses. The camera further comprises a selecting device for selecting at least one of the first focusing estimating device and the second focusing estimating device, and a moving device for moving the focus adjusting lens on the basis of the focusing data created by the focusing estimating device selected by the selecting device. The camera body incorporates the first focusing estimating device, while the lens barrel incorporates the second focusing estimating device, the selecting device and the moving device.

A camera according to the present invention preferably comprises a camera body for picking up an image formed on a predetermined plane, and a lens barrel comprising a photographing optical system, having a focus adjusting lens disposed movably, for guiding the light beam incident on the focus adjusting lens and emerging from an object onto the predetermined plane. The camera body contains identification data indicating whether or not the camera body has a first focusing estimating device for creating focusing data for focusing the image on the predetermined plane upon the object. The lens barrel further comprises a second focusing estimating device for creating the focusing data for focusing the image on the predetermined plane upon the object, a judging device for judging whether or not the camera body has the first focusing estimating device on the basis of the identification data, a selecting device for selecting the second focusing estimating device when the judging device judges that the camera body does not have the first focusing estimating device, and selecting at least one of the first focusing estimating device and the second focusing estimating device when the judging device judges that the camera body has the first focusing estimating device, and a moving device for moving the focus adjusting lens on the basis of the focusing data created by the focusing estimating device selected by the selecting device.

A camera according to the present invention preferably comprises a camera body for generating an electric signal based on an image formed on an imaging surface, and a lens barrel comprising a photographing optical system having a focus adjusting lens disposed movably, a beam splitting element for splitting light beams incident on the focus adjusting lens and emerging from an object, and a first image forming lens for forming one light beam of the light beams split by the beam splitting element into an image. The photographing optical system guides the light beam incident on the first image forming lens and emerging from the object onto the imaging surface. The camera body contains identification data indicating whether or not the camera body has a first focusing estimating device for creating focusing data for focusing the image on the imaging surface upon the object on the basis of a level of a predetermined frequency component selected from the electric signal. The lens barrel further comprises a second focusing estimating device having a second image forming lens for forming the other light beam of the light beams split by the beam splitting element into an image, at least one pair of image re-forming lenses for respectively re-forming, into images, the light beams emerging from the object which beams have been image-formed by the second image forming lens, and an imaging element for picking up the images obtained by at least one pair of image re-forming lenses, the second focusing estimating device creating an item of focusing data for focusing the image on the imaging surface upon the object on the basis of the imaging positional deviation on the imaging element between the images obtained by at least one pair of image re-forming lenses. The lens barrel further comprises a judging device for judging whether or not the camera body has the first focusing estimating device on the basis of the identification data, and a selecting device for selecting the second focusing estimating device when the judging device judges that the camera body does not have the first focusing estimating device, and selecting at least one of the first focusing estimating device and the second focusing estimating device when the judging device judges that the camera body has the first focusing estimating device. The lens barrel further comprises a moving device for moving the focus adjusting lens on the basis of the focusing data created by the focusing estimating device selected by the selecting device.

A lens barrel according to the present invention is attachable to a camera body for generating an electric signal based on an image formed on an imaging surface. Preferably, the lens barrel comprises a photographing optical system having a focus adjusting lens disposed movably, and an image forming lens for forming a light beam incident on the focus adjusting lens and emerging from an object into an image. The photographing optical system guides the light beam incident on the image forming lens and emerging from the object onto the imaging surface. The lens barrel also comprises a focusing estimating device for creating an item of focusing data for focusing the image on the imaging surface upon the object on the basis of a level of a predetermined frequency component selected from the electric signal, and a moving device for moving the focus adjusting lens on the basis of the focusing data created by the focusing estimating device.

A lens barrel according to the present invention is attachable to a camera body for picking up an image formed on a predetermined plane. Preferably, the lens barrel comprises a photographing optical system having a focus adjusting lens disposed movably, a beam splitting element for splitting light beams incident on the focus adjusting lens and emerging from an object, and a first image forming lens for forming one light beam of the light beams split by the beam splitting element into an image. The photographing optical system guides the light beam incident on the first image forming lens and emerging from the object onto the predetermined plane. The lens barrel also comprises a focusing estimating device having a second image forming lens for forming the other light beam of the light beams split by the beam splitting element into an image, at least one pair of image re-forming lenses for respectively re-forming, into images, the light beams emerging from the object which beams have been image-formed by the second image forming lens, and an imaging element for picking up the images obtained by at least one pair of image re-forming lenses, the focusing estimating device creating an item of focusing data for focusing the image on the predetermined plane upon the object on the basis of the imaging positional deviation on the imaging element between the images obtained by at least one pair of image re-forming lenses. The lens barrel further comprises a moving device for moving the focus adjusting lens on the basis of the focusing data created by the focusing estimating device.

An autofocus apparatus according to the present invention preferably comprises a photographing optical system having at least a focus adjusting lens disposed movably and an image forming lens for forming, into an image, light beams incident on the focus adjusting lens and emerging from an object. The autofocus apparatus also comprises a plurality of focusing estimating devices for creating focusing data for focusing an image formed on a predetermined plane through the photographing optical system, upon the object. The autofocus apparatus further comprises a storage device stored with a correction value for the focusing data created by at least one of the plurality of focusing estimating devices, and a correcting device for correcting, with the correction value, the focusing data corresponding to the correction value stored in the storage device. The autofocus apparatus still further comprises a selecting device for selecting at least one of the plurality of focusing estimating devices, and a moving device for moving the focus adjusting lens on the basis of the focusing data created by the focusing estimating device selected by the selecting device, or the relevant corrected focusing data if the relevant focusing data has been corrected by the correcting device.

An autofocus apparatus according to the present invention preferably comprises a photographing optical system having at least a focus adjusting lens disposed movably, a beam splitting element for splitting light beams incident on the focus adjusting lens and emerging from an object, a first image forming lens for forming one light beam of the light beams split by the beam splitting element into an image, and a second image forming lens for forming the other light beam of the light beams split by the beam splitting element into an image. The autofocus apparatus also comprises a first focusing estimating portion having a data detecting device for detecting an item of data for focusing the image obtained by the second image forming lens upon the object on a second plane, a storage device stored with the data detected by the data detecting device as a correction value when the image obtained by the first image forming lens is focused on the object on the first plane, and a data creating device for creating an item of focusing data for focusing the image obtained by the first image forming lens upon the object on the first plane. The autofocus apparatus further comprises a selecting portion for selecting at least one of the first focusing estimating portion and the second focusing estimating portion, and a moving device for moving the focus adjusting lens on the basis of the focusing data created by the focusing estimating device selected by the selecting portion.

It is preferable that the autofocus apparatus according to the present invention further comprises a storage controlling device for storing the storage device with the data detected by the data detecting portion as the correction value when the first focus estimating portion creates the focusing data indicating that the image obtained by the first image forming lens is focused on the object on the first plane.

An autofocus apparatus according to the present invention preferably comprises a photographing optical system having at least a focus adjusting lens disposed movably, a beam splitting element for splitting light beams incident on the focus adjusting lens and emerging from an object, a first image forming lens for forming one light beam of the light beams split by the optical element into an image, and a second image forming lens for forming the other light beam of the light beams split by the beam splitting element into an image. The autofocus apparatus also comprises a first focusing estimating portion having a first imaging element for picking up the image obtained by the first image forming lens and converting it into an electric signal, a level detecting device for detecting a level of a proper frequency component from the electric signal obtained by the first imaging element, and a first data creating device for creating an item of focusing data for focusing the image on the first imaging element upon the object on the basis of the frequency component level detected by the level detecting device. The autofocus apparatus further comprises a second focusing estimating portion having an image re-forming optical system for respectively re-forming, into images, the light beams passing through portions with different pupils among the light beams for forming the image formed by the second image forming lens, a second imaging element for picking up the images obtained by the image re-forming optical system, a positional deviation detecting device for detecting an imaging positional deviation on the second imaging element, a storage device stored, as a correction value, with the imaging positional deviation detected by the positional deviation detecting device when the image on the first imaging element is focused on the object, a correcting device for correcting, with the correction value stored in the storage device, the imaging positional deviation detected by the positional deviation detecting device, and a second data creating device for creating an item of focusing data for focusing the image on the first imaging element upon the object on the basis of the imaging positional deviation corrected by the correcting device. The autofocus apparatus still further comprises a selecting portion for selecting at least one of the first focusing estimating portion and the second focusing estimating portion, and a moving device for moving the focus adjusting lens on the basis of the focusing data created by the focusing estimating device selected by the selecting portion.

The autofocus apparatus according to the present invention preferably further comprises a storage controlling device for storing the storage device with the imaging positional deviation detected by the positional deviation detecting device as the correction value when the first focus estimating portion creates the focusing data indicating that the image on the first imaging element is focused on the object.

Provided further are the storage device stored with the correction value for the focusing data created by at least one of the plurality of focusing estimating devices, and the correcting device for correcting, with a correction value, the focusing data corresponding to the relevant correction value stored in the storage device. Therefore, for example, as one of the plurality of focusing estimating devices, as in the case of the image deviation type focusing estimating device explained in the prior art, the light beams are diverged from the photographing optical system for forming the image on the imaging surface of the camera body and form an image in a different position from the imaging surface, and whether or not the image on the imaging surface is focused on is estimated by use of the above image. Even in the case of using this method, the storage device stores, as a correction value, a deviation in the optical positional relationship between the imaging surface of the camera body and the surface formed with the image for estimating the focusing. The focusing data of the corresponding focusing estimating device is corrected by use of the above stored correction value, whereby a focusing accuracy is prevented from declining when using the relevant focusing estimating device.

An autofocus apparatus according to the present invention preferably comprises a photographing optical system having at least a focus adjusting lens disposed movably, and an image forming lens so movably disposed as to form light beams incident on the focus adjusting lens and emerging from an object into an image. The autofocus apparatus also comprises a plurality of focusing estimating devices for creating focusing data for focusing an image formed on a predetermined plane through the photographing optical system upon the object, and a position detecting device for detecting position data of the image forming lens. The autofocus apparatus further comprises a correcting device for correcting the focusing data created by at least one of the plurality of focusing estimating devices on the basis of the data about the position detected by the position detecting device, a selecting device for selecting at least one of the plurality of focusing estimating devices, and a moving device for moving the focus adjusting lens on the basis of the focusing data created by the focusing estimating device selected by the selecting device, or the relevant corrected focusing data if the relevant focusing data has been corrected by the correcting device.

An autofocus apparatus according to the present invention preferably comprises a photographing optical system having at least a focus adjusting lens disposed movably, a beam splitting element for splitting light beams incident on the focus adjusting lens and emerging from an object, a first image forming lens for forming one light beam of the light beams split by the optical element into an image, and a second image forming lens for forming the other light beam of the light beams split by the beam splitting element into an image. The autofocus apparatus also comprises a first focusing estimating portion for creating the focusing data for focusing the image obtained by the first image forming lens upon the object on a first plane on the basis of the image obtained by the first image forming lens. The autofocus apparatus further comprises a second focusing estimating portion having a data detecting device for detecting the data for focusing the image obtained by the second image forming lens upon the object on a second plane, a position detecting device for detecting the position data of the first image forming lens, a correcting device for correcting the data detected by the data detecting device on the basis of an item of data corresponding to the data about the position of the first image forming lens that has been detected by the position detecting device, which item of data is obtained from a relationship between the position of the first image forming lens and the data detected by the data detecting device when the image on the first plane is focused on the object, and a data creating device for creating focusing data for focusing the image obtained by the first image forming lens upon the object on the first plane. The autofocus apparatus still further comprises a selecting portion for selecting at least one of the first focusing estimating portion and the second focusing estimating portion, and a moving device for moving the focus adjusting lens on the basis of the focusing data created by the focusing estimating device selected by the selecting portion.

An autofocus apparatus according to the present invention preferably comprises a photographing optical system having at least a focus adjusting lens disposed movably, a beam splitting element for splitting light beams incident on the focus adjusting lens and emerging from an object, a first image forming lens for forming one light beam of the light beams split by the optical element into an image, and a second image forming lens for forming the other light beam of the light beams split by the beam splitting element into an image. The autofocus apparatus also comprises a first focusing estimating portion for picking up the image obtained by the first image forming lens and converting it into an electric signal, a level detecting device for detecting a level of a proper frequency component from the electric signal obtained by the first imaging element, and a first data creating device for creating an item of focusing data for focusing the image on the first imaging element upon the object on the basis of the frequency component level detected by the level detecting device. The autofocus apparatus further comprises a second focusing estimating portion having an image re-forming optical system for respectively re-forming, into images, the light beams passing through portions with different pupils among the light beams for forming the image formed by the second image forming lens, a second imaging element for picking up the images obtained by the image re-forming optical system, a positional deviation detecting device for detecting an imaging positional deviation on the second imaging element, a position detecting device for detecting position data of the first image forming lens, a correcting device for correcting imaging positional deviation detected by the data detecting device on the basis of an imaging positional deviation corresponding to the data about the position of the first image forming lens that has been detected by the position detecting device, which imaging positional deviation is obtained from a relationship between the position of the first image forming lens and the imaging positional deviation detected by the positional deviation detecting device when the image on the first imaging element is focused on the object, and a second data creating device for creating focusing data for focusing the image on the first imaging element upon the object on the basis of the imaging positional deviation corrected by the correcting device. The autofocus apparatus still further comprises a selecting portion for selecting at least one of the first focusing estimating portion and the second focusing estimating portion, and a moving device for moving the focus adjusting lens on the basis of the focusing data created by the focusing estimating device selected by the selecting portion.

An autofocus apparatus according to the present invention preferably comprises a photographing optical system having at least a focus adjusting lens disposed movably, a beam splitting element for splitting light beams incident on the focus adjusting lens and emerging from an object, a first image forming lens so disposed movably as to form one light beam of the light beams split by the optical element into an image, and a second image forming lens for forming the other light beam of the light beams split by the beam splitting element into an image. The autofocus apparatus also comprises a first focusing estimating portion having a first imaging element for picking up the image obtained by the first image forming lens and converting it into an electric signal, a level detecting device for detecting a level of a proper frequency component from the electric signal obtained by the first imaging element, and a first data creating device for creating an item of focusing data for focusing the image on the first imaging element upon the object on the basis of the frequency component level detected by the level detecting device. The autofocus apparatus further comprises a second focusing estimating portion having an image re-forming optical system for respectively re-forming, into images, the light beams passing through portions with different pupils among the light beams for forming the image formed by the second image forming lens, a second imaging element for picking up the images obtained by the image re-forming optical system, a positional deviation detecting device for detecting an imaging positional deviation on the second imaging element, a correcting device for correcting a position of the image forming lens on the basis of an item of position data of the second image forming lens that corresponds to data about the position, detected by the position detecting device, of the first image forming lens, which item of position data is obtained from such a relationship between the position of the first image forming lens and the position of the second image forming lens that the imaging positional deviation on the second imaging element disappears when the image on the first imaging element is focused on, and a second data creating device for creating focusing data for focusing the image on the first imaging element upon the object. The autofocus apparatus still further comprises a selecting portion for selecting at least one of the first focusing estimating portion and the second focusing estimating portion, and a moving device for moving the focus adjusting lens on the basis of the focusing data created by the focusing estimating device selected by the selecting portion.

According to the present invention, there are provided the plurality of focusing estimating devices for creating the focusing data for focusing the image formed on the predetermined plane through the photographing optical system upon the object. The selecting device selects at least one of these focusing estimating devices. The focus adjusting lens is moved based on the focusing data created by the selected focusing estimating device. Hence, according to the present invention, for instance, the crest climbing type focusing estimating device and the image deviation type focusing estimating device, which have been described in the prior art, are provided as the focusing estimating devices. To start with, the selecting device is set so that the image on the predetermined plane is roughly focused on by use of the image deviation type focusing estimating device, and thereafter the image on the predetermined plane is finely focused on by use of the focusing data of the crest climbing type focusing estimating device. It is therefore possible to effect the focusing quickly with the high precision.

Furthermore, according to the present invention, there are provided the position detecting device for detecting the position data of the image forming lens, and the correcting device for correcting the focusing data to be corrected, which data is created by the focusing estimating device, on the basis of the position data of the image forming lens that has been detected by the position detecting device. Therefore, for example, as one of the plurality of focusing estimating devices, as in the case of the image deviation type focusing estimating device explained in the prior art, the light beams are diverged from the photographing optical system for forming the image on the imaging surface of the camera body and form an image in a different position from the imaging surface, and whether or not the image on the imaging surface is focused on is estimated by use of the above image. Even in the case of using this method, the position data of the image forming lens is detected, and the deviation in the optical positional relationship between the imaging surface of the camera body and the surface formed with the image for estimating the focusing, is obtained from the above position data. Then, with the thus obtained deviation serving as the correction value, the focusing data of the corresponding focusing estimating device is corrected, thereby making it possible to prevent the decline in the focusing accuracy when using the relevant focusing estimating device.

BRIEF DESCRIPTION OF THE DRAWINGS

Other objects and advantages of the present invention will become apparent during the following discussion in conjunction with the accompanying drawings, in which:

FIG. 51 is an explanatory diagram showing a relationship between a level of a high frequency component of a picture signal and a focus adjusting lens.

DESCRIPTION OF THE PREFERRED EMBODIMENTS

One embodiment of the present invention will hereinafter be described with reference to the drawings.

Figure 10:
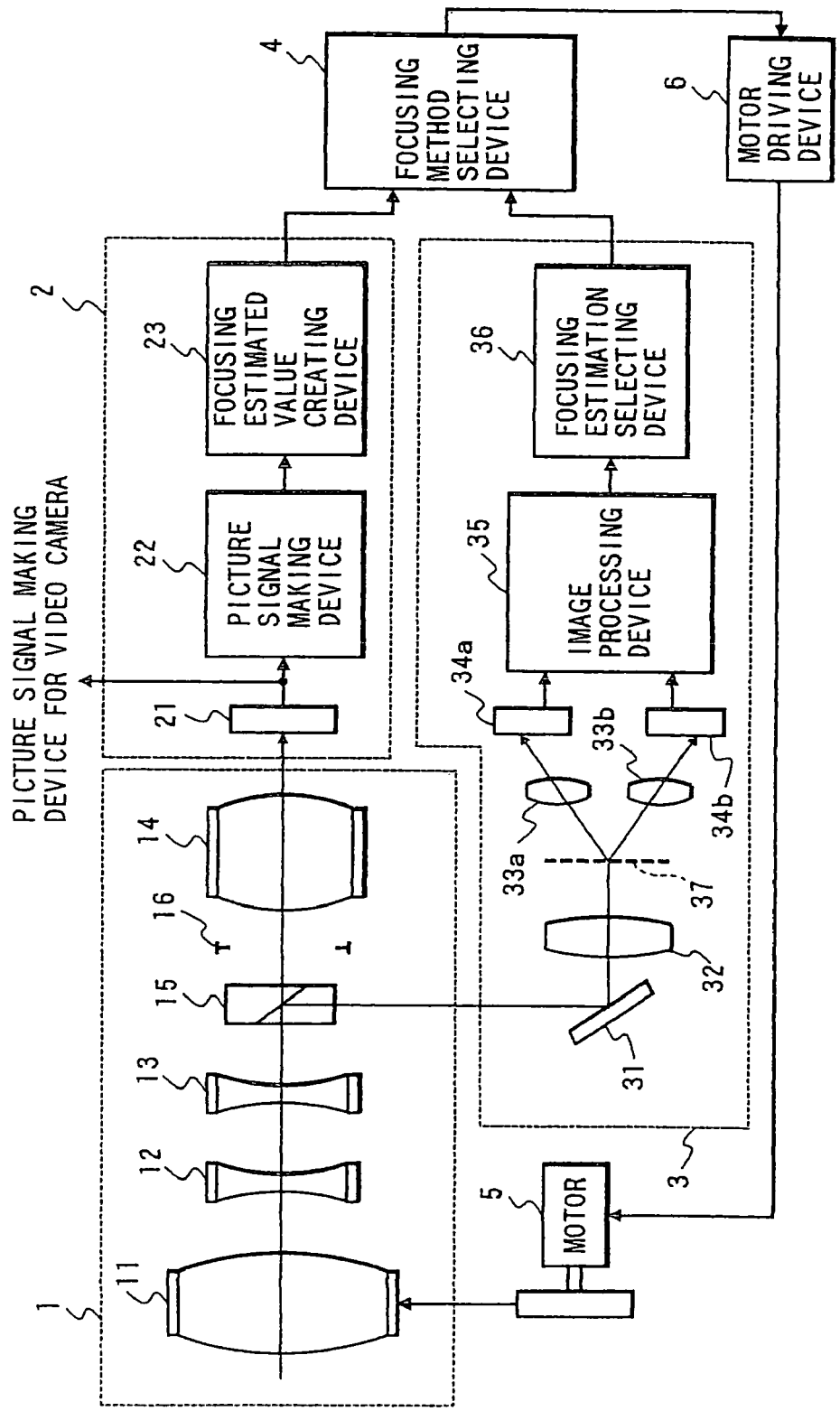
FIG. 10 is a schematic block diagram illustrating an autofocus apparatus in a first embodiment of the present invention.

FIG. 10 is a schematic block diagram illustrating an autofocus apparatus in one embodiment of the present invention.

The autofocus apparatus in this embodiment includes, as illustrated in FIG. 10, a photographing optical system 1, a first focus estimating part 2, a second focusing estimating part 3, a focusing method selecting device 4, a motor 5, and a motor driving device 6.

The photographing optical system 1 is constructed of four lens units such as a focus adjusting lens 11, a variable magnification lens 12, a correcting lens 13, and an image forming lens 14. This construction is typical of a zoom lens for a TV camera. In the photographing optical system 1 used in this embodiment, an optical element (e.g., a beam splitter) 15 for splitting light beams and a stop 16 are interposed in between the correcting lens 13 and the image forming lens 14. Note that the optical element 15 is disposed anterior to the stop 16 so that the light beams can be transmitted to the second focusing estimating part 3 irrespective of an aperture quantity of an aperture stop of the photographing optical system 1 in this embodiment.

The first focusing estimating part 2 estimates focusing by a so-called crest climbing method. The first focusing estimating part 2 includes an imaging element 21 for picking up an image formed by the image forming lens 14 of the photographing optical system 1 and converting it into an electric signal, and a picture signal making device 22 for generating a picture signal corresponding to the electric signal transmitted from the imaging element 21. The first focusing estimating part 2 also includes a focusing estimated value creating device 23 for creating an item of data (a first focusing estimated value) for focusing the image formed on the imaging element 21 on the basis of the picture signal given from the picture signal making device 22. Note that the electric signal outputted from the imaging element 21 is, as shown in FIG. 10, also used for generating a picture signal of a video camera.

Figure 1:
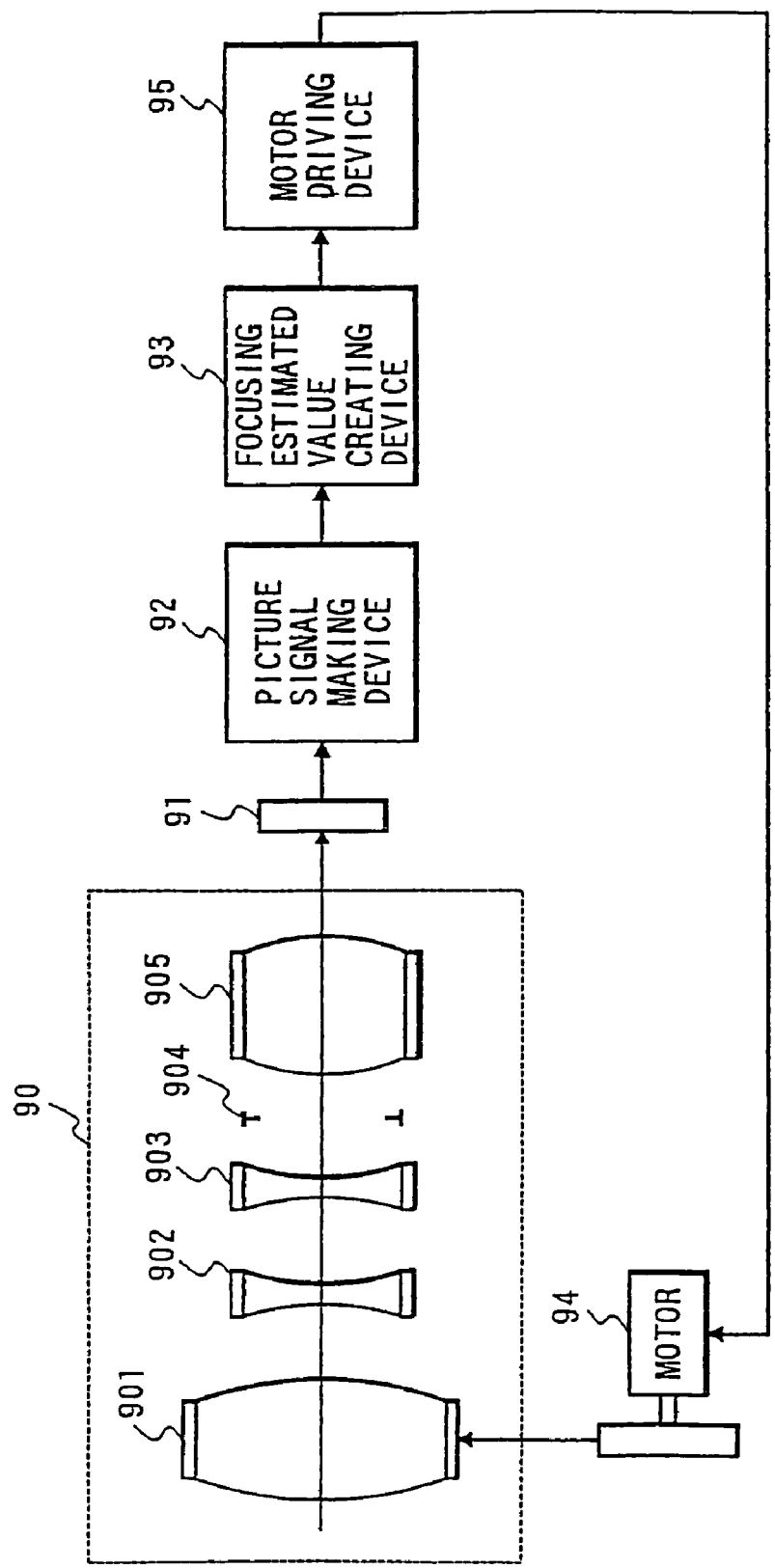
FIG. 1 is a schematic block diagram illustrating a crest climbing type autofocus apparatus.
Figure 2:
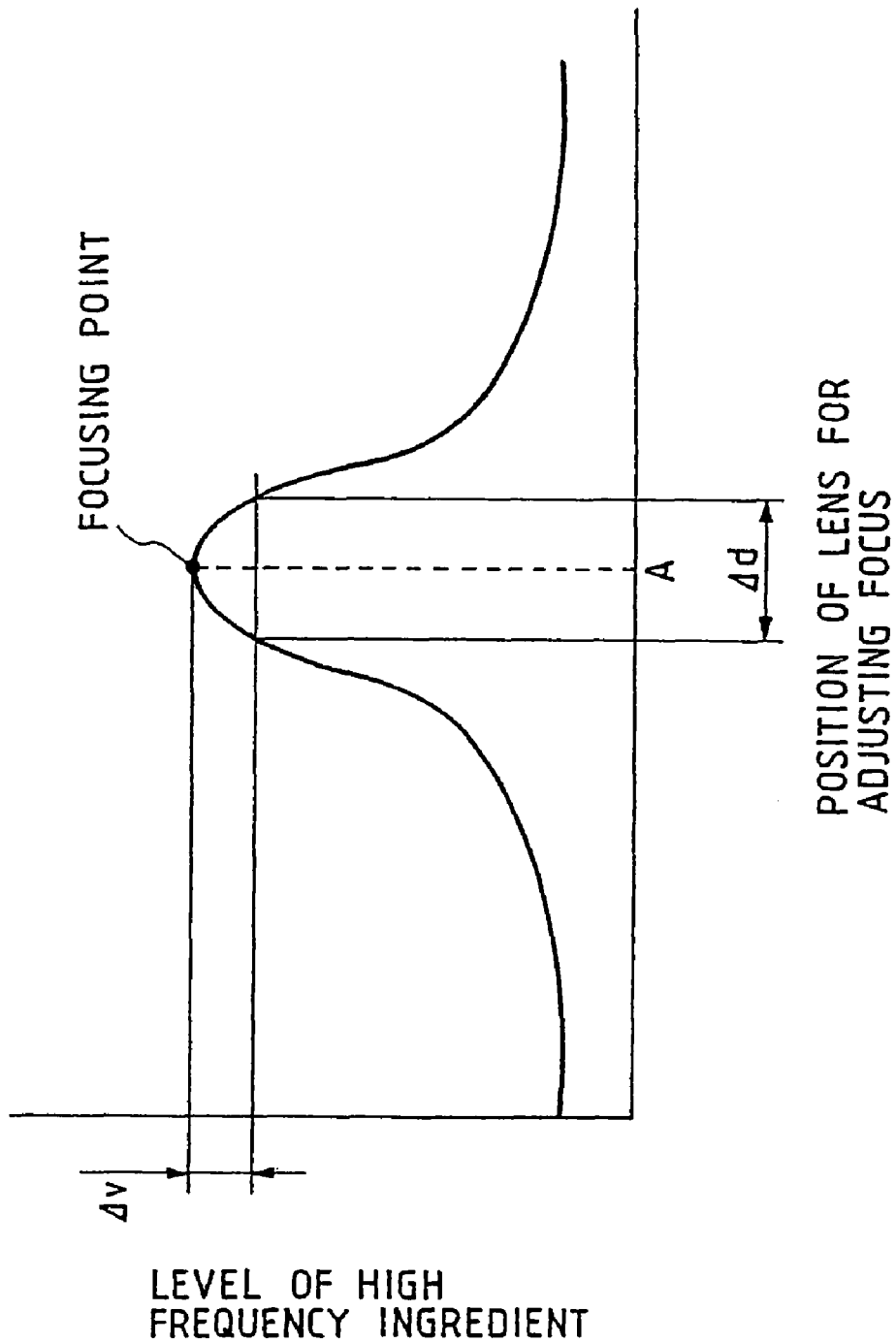
FIG. 2 is an explanatory diagram showing a relationship between a level of a high frequency of a picture signal and a position of a focus adjusting lens.

Next, a first focusing estimated value created by the focusing estimated value creating device 23 will be explained. As described in the prior art, the picture signal is, it can be assumed, formed by synthesizing sine waves of a plurality of frequencies. Then, it is well known that a level of high frequency component of the picture signal, as illustrated in FIG. 2, rises more steeply according as a degree of sharpness of the image formed on the imaging element 21 increases, i.e., the focus adjusting lens 11 moves closer to a focusing point A, and this level reaches a peak when the image on the imaging element 21 is focused on. Subsequently, the focusing estimated value creating device 23 selects a proper high frequency component in consideration of an S/N ratio of the picture signal as well as of an imaging performance of the photographing optical system 1, out of the picture signal obtained by the picture signal making device 22. Then, the focusing estimated value creating device 23 creates a focusing estimated value by monitoring a level of this frequency component at a predetermined sampling interval. For example, when the level of the selected frequency component rises, it is estimated that the focus adjusting lens 11 is moving in such a direction as to approach a focusing point. Further, when the level of the selected frequency component lowers, it is estimated that the focus adjusting lens 11 is moving in such a direction as to get away from the focusing point. Then, when the level of the selected frequency component exists within a predetermined range (shown by, e.g., ΔV in FIG. 2) from the peak value, it is estimated that the image on the imaging element 21 is focused on.

The second focusing estimating part 3 estimates focusing by a so-called image deviation method. The second focusing estimating part 3 comprises a mirror 31 for reflecting the light beam split by the optical element 15, toward a predetermined direction, and an image forming lens 32 for forming light beams incident via the mirror 31 into a conjugate image. The second focusing estimating part 3 further comprises image re-forming lenses 33a, 33b for forming some of the light beams image formed by the image forming lens 32, again into images, line sensors 34a, 34b for respectively picking up the images formed by the image re-forming lenses 33a, 33b and converting them into electric signals, an image processing device 35, and a focusing estimation selecting device 36.

The image forming lens 32 is disposed so that the light beams incident via the mirror 31 are image-formed on a predetermined focal surface 37 when the image on the imaging element 21 is focused on. The image re-forming lenses 33a, 33b are disposed in positions substantially symmetric with respect to the optical axis of the image forming lens 32. More specifically, the image re-forming lenses 33a, 33b are so disposed as to individually re-form the images of the light beams passing through portions having different pupils in the optical system consisting of the focus adjusting lens 11, the variable magnification lens 12, the correcting lens 13 and the image forming lens 32, among the light beams for forming the image formed by the image forming lens 32. The line sensors 34a, 34b are disposed in the positions substantially symmetric with respect to the optical axis of the image forming lens 32 and on a predetermined focal surface of the image re-forming lenses 33a, 33b corresponding to each other. The image processing device 35 executes the image processing based on the electric signals transmitted respectively from the line sensors 34a, 34b. The focusing estimated value creating device 36 creates an item of data (a second focusing estimated value) for focusing the image formed on the imaging element 21 on the basis of the signal transmitted from the image processing device 35.

Next, the second focusing estimated value created by the focusing estimated value creating device 36 will be explained. As stated in the prior art, when the light beams traveling through the image forming lens 32 are focused on the predetermined focal surface 37, some of the light beams are again formed on the line sensors 34a, 34b by the image re-forming lenses 33a, 33b. Hence, if focused on the predetermined focal surface 37, the images picked up by the two line sensors 33a, 33b are formed in substantially coincident positions on the line sensors. On the other hand, when the light beams passing through the image forming lens 32 are focused on anterior to the predetermined focal surface 37 (which is a so-called rear focus state), there must be a deviation between the images picked up by the two line sensors 34a, 34b. Also, when the light beams passing through the image forming lens 32 are focused on posterior to the predetermined focal surface 37 (which is a so-called front focus state), there must be a deviation in a direction opposite to the one in the rear focus state between the images picked up by the two line sensors 34a, 34b. Then, the focusing estimated value creating device 36 detects a deviation quantity and a deviating direction between the images picked up by the line sensors 34a, 34b, and, based on the data thereof, creates a moving direction and a moving quantity, or a defocus quantity and a defocus direction (a second focusing estimated value) of the focus adjusting lens 11, which are needed for focusing on the predetermined focal surface 37. Note that the second focusing estimated value is created at the interval of a predetermined time in consideration of a processing speed, etc. of the image processing device 35.

The focusing method selecting device 4 selects at least one of the first focusing estimated value created by the first focusing estimating part 2 and the second focusing estimated value created by the second focusing estimating part 3. In accordance with this embodiment, referring first to the second focusing estimated value, if the required-for-focusing moving quantity of the focus adjusting lens 11 is larger than a threshold value, the second focusing estimated value is set to be selected. Whereas if smaller than the threshold value, the first focusing estimated value is set to be selected. Note that this threshold value may also be set arbitrarily by a photographer and so forth through inputting from outside.

The motor driving device 6 drives the motor 5 on the basis of the focusing estimated value selected by the focusing method selecting device 4. Based on a command given from the motor driving device 6, the motor 5 moves the focus adjusting lens 11 forward and backward in the optical-axis direction of the photographing optical system 1.

Incidentally, the focusing estimated value creating devices 23, 36 and the focusing method selecting device 4 are integrally constructed of, e.g., a CPU (Central Processing Unit), etc.

Next, an operation of the autofocus apparatus in this embodiment will be described.

To start with, upon an incidence of the light beams upon the photographing optical system 1 from an object, the first focusing estimating part 2 creates the first focusing estimated value on the basis of the light beams obtained via the image forming lens 14 in the photographing optical system 1. Further, the second focusing estimating part 3 creates the second focusing estimated value based on the light beams split by the optical element 15 in the photographing optical system 1.

Next, the focusing method selecting device 3, referring to the second focusing estimated value, judges whether or not the required-for-focusing moving quantity or defocus quantity of the focus adjusting lens 11 is larger than the threshold value. Then, if the required-for-focusing moving quantity or defocus quantity of the focus adjusting lens 11 is larger than the threshold value, the second focusing estimated value is selected. Whereas if smaller than the threshold value, the first focusing estimated value is selected.

Next, the motor driving device 6 drives the motor based on the focusing estimated value selected by the focusing method selecting device 4. For instance, if the second focusing estimated value is selected by the focusing method selecting device 4, the motor driving device 6 drives the motor 5 to move the focus driving lens 11 in the moving direction with the moving quantity that are indicated by the selected second focusing estimated value. Further, for example, if the first focusing estimated value is selected by the focusing method selecting device 4, and when estimating that the focus adjusting lens 11 is moving in such a direction as to approach the focusing point, the motor driving device 6 drives the motor 5 to keep a rotating direction of the motor 5 as it is. Moreover, when estimating that the focus adjusting lens 11 is moving in such a direction as to get away from the focusing point, the motor driving device 6 drives the motor 5 to reverse the rotating direction of the motor 5.

The motor driving device 6 continues to drive the motor 5 till it is estimated that the first focusing estimated value is selected by the focusing method selecting device 4 and a content of the first focusing estimated value indicates an in-focus state. The image on the imaging element 21 is thereby focused on.

In accordance with the first embodiment of the present invention, the first focusing estimating part 2 creates the first focusing estimated value by use of the so-called crest climbing method, and the second focusing estimating part 3 creates the second focusing estimated value by use of the so-called image deviation method. Further, the focusing method selecting device 4 selects the second focusing estimated value when the second focusing estimated value is larger than the threshold value, and selects the first focusing estimated value when smaller than the threshold value. Then, the motor driving device 6, based on the focusing estimated value selected by the focusing method selecting device 4, drives the motor 5 to move the focus adjusting lens 11. With this operation, to begin with, the image on the imaging element 21 is roughly focused on by use of the second focusing estimated value, and thereafter the image on the imaging element 21 is finely focused on by use of the first focusing estimated value. Accordingly, in accordance with the first embodiment, the image on the imaging element 21 can be focused on quickly with a high accuracy. Further, the high accuracy is not required of the second focusing estimating part 3 using the image deviation method, and hence the costs can be restrained from rising.

Moreover, in the first embodiment of the present invention, a focal length of the optical system for forming images for detecting the image deviation on the line sensors 34a, 34b in the second focusing estimating part 3, is a synthetic focal length of the focus adjusting lens 11, the variable magnification lens 12, the correcting lens 13 and the image forming lens 32. On the other hand, a focal length of the optical system for forming an image for the picture signal on the imaging element 21, is a synthetic focal length of the focus adjusting lens 11, the variable magnification lens 12, the correcting lens 13 and the image forming lens 14. Therefore, the focal lengths of the optical system for forming the images for detecting the image deviation and of the optical system for forming the image for the picture signal, are varied by changing configurations of the image forming lenses 14 and 32, videlicet, the sizes of the images formed respectively by the individual optical systems can be changed. For instance, the image forming lens 32 is constructed to enlarge the images for detecting the image deviation by increasing the focal length of the optical system for forming the images for detecting the image deviation, whereby pixel pitches of the lines sensors 34a, 34b become finer relatively to the above images. Hence, it is feasible to focus even a minute object. Further, for example, the image forming lens 32 is constructed to diminish the images for detecting the image deviation by shortening the focal length of the optical system for forming the images for detecting the image deviation, whereby sizes of these images become smaller relatively to the line sensors 34a, 34b. Therefore, it is possible to detect a larger quantity of image deviation. Even if the focus adjusting lens is positioned far from the focusing point (which is a so-called largely defocused state), the focusing point can be thereby quickly detected. Also, the apparatus can be downsized.

Figure 11:
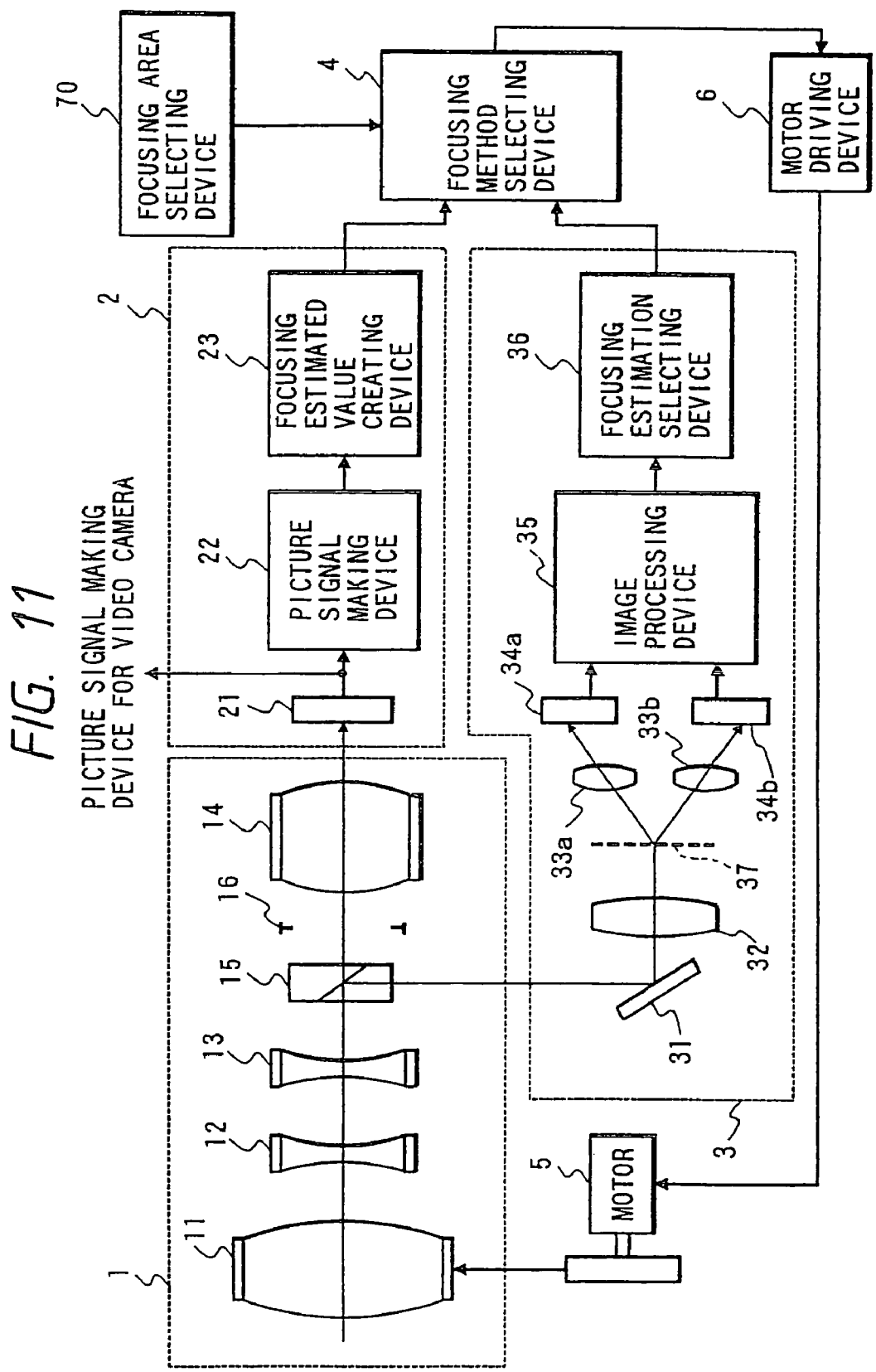
FIG. 11 is a diagram showing a modified example of the first embodiment of the present invention.

By the way, in the image deviation type autofocus apparatus used for a generally commercially available still camera, etc., the image deviation is detected by use of an image in the vicinity of the center among the images formed by the photographing optical system. Accordingly, in this image deviation type autofocus apparatus, the focusing can be attained only in the vicinity of the center of an area (hereinafter also referred to as a photographic area) to be photographed by the photographing optical system. It is because the sizes of the line sensor and of the image re-forming lens employed for detecting the image deviation are restricted due to problems in terms of a size of the camera body and costs thereof, etc. Contrastingly in the crest climbing type autofocus apparatus used for the video camera, the focusing is effected by use of the images on the imaging element, and therefore a focus area can be changed comparatively easily. Herein, the focus area is an area where the data for focusing is created within the photographic area. In this embodiment, the focus area corresponds to the area where the data for focusing the image on the relevant area on a corresponding object in the area on the imaging element 21. Hence, when the general image deviation type autofocus apparatus is employed for the second focusing estimating part 3, as illustrated in FIG. 11, it is preferable that a focus area selecting device 70 for selecting a position of the focus area be provided. Then, in the focusing method selecting device 4, only when the focus area selecting device 70 selects the center of the photographic area as a focus area, at least one of the first focusing estimated value and the second focusing estimated value is selected in the procedures stated in this embodiment, and it is preferable that only the first focusing estimated value be selected when a portion other than the center in the photographic area is selected as the focus area by the focus area selecting device 70. With this operation, it is feasible to focus the image corresponding to the object existing in the plurality of areas within the photographic area, among the images on the first imaging element 21.

Figure 3:
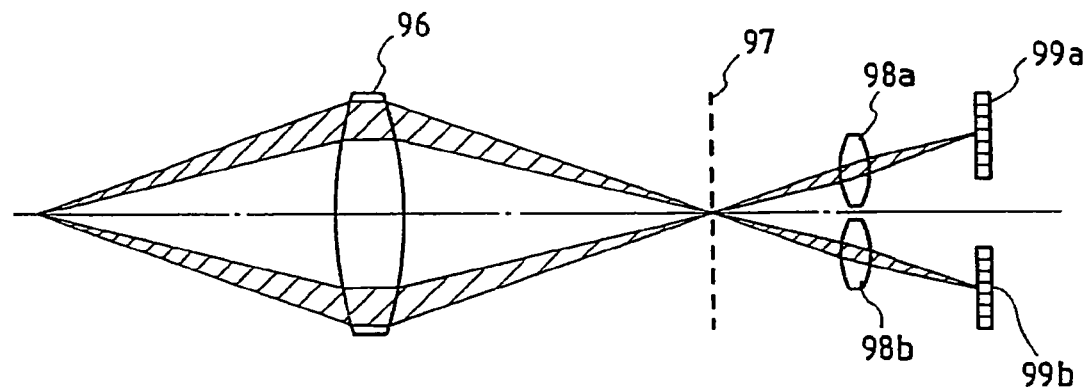
FIG. 3 is an explanatory diagram of a principle of an image deviation type autofocus apparatus, showing a light path when in a focused state.
Figure 4:
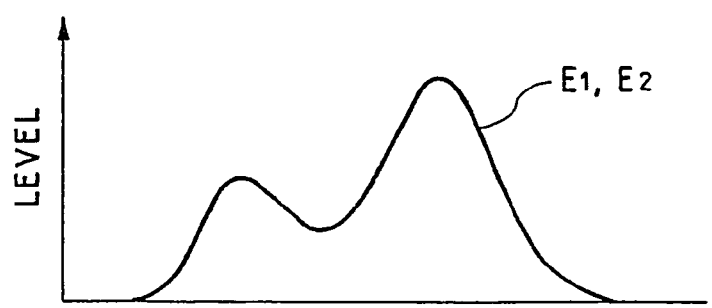
FIG. 4 is an explanatory diagram showing positions of images to be picked up by two line sensors $99a$, $99b$ in FIG. 3.
Figure 5:
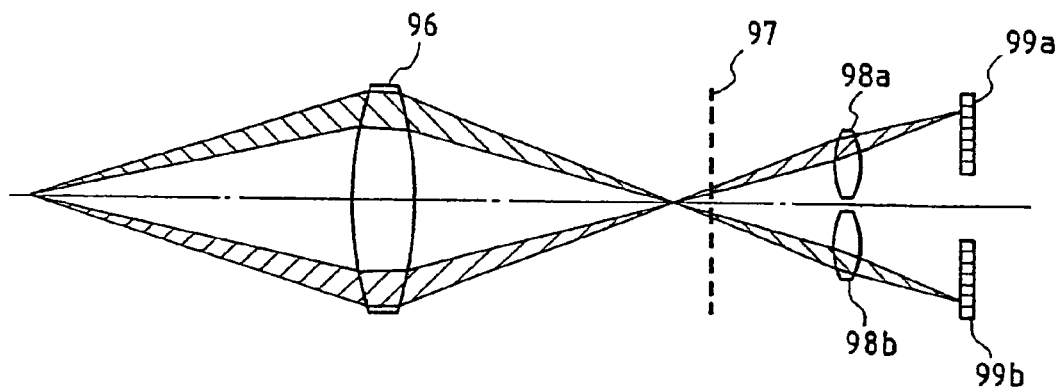
FIG. 5 is an explanatory diagram of the principle of the image deviation type autofocus apparatus, showing the light path when in a defocused state.
Figure 6:
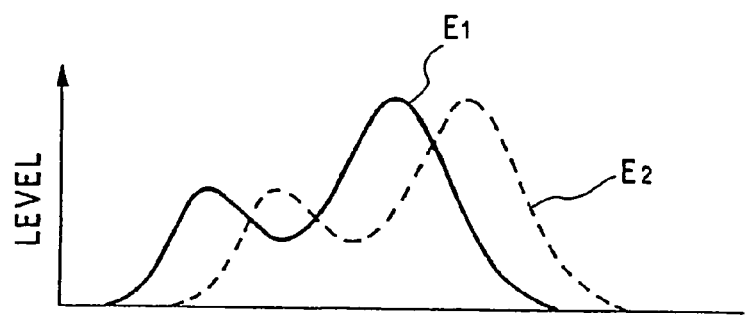
FIG. 6 is an explanatory diagram illustrating the images picked up by the two line sensors $99a$, $99b$ in FIG. 5.
Figure 7:
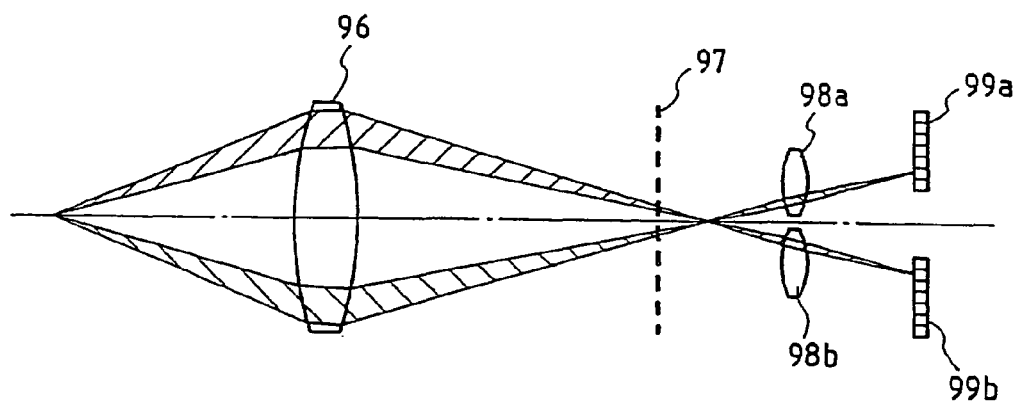
FIG. 7 is an explanatory diagram of the principle of the image deviation type autofocus apparatus, showing the light path when in the defocused state.
Figure 8:
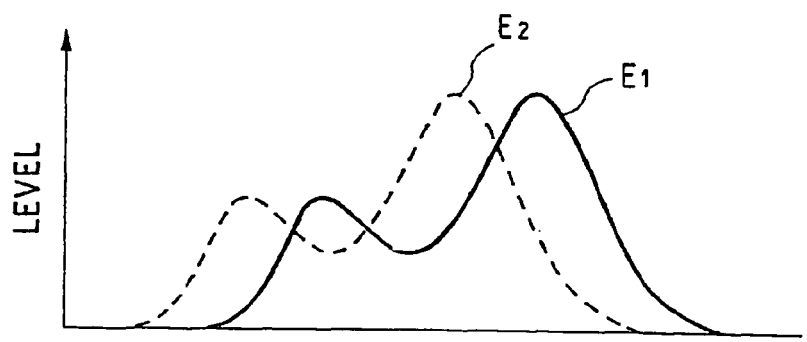
FIG. 8 is an explanatory diagram illustrating the positions of the images picked up by the two line sensors $99a$, $99b$ in FIG. 7.

Further, in recent years, there have been developed some of the image deviation type autofocus apparatuses, which are capable of setting the focus area in the plurality of portions within the photographic area. This may correspond to, e.g., a multi-area focus detecting apparatus disclosed in Japanese Patent Laid-Open Application No. 6-308379. In those apparatuses, four or more (even-numbered) pieces of line sensors and image re-forming lenses are provided in the image deviation type autofocus apparatus illustrated in FIG. 3 in the statement of the prior art, and images of a plurality of portions are taken out of the images formed by the image forming optical system, thereby detecting a deviation of each of the images. If the above autofocus apparatus is used for the second focusing estimating part 3, it is possible to employ the crest climbing type and the image deviation type in combination to focus the image corresponding to the object existing in the relevant portion with respect to the plurality of portions within the photographic area.

Note that the focusing method selecting device 4 in the first embodiment of the present invention has been explained so far by way of the device for selecting the first focusing estimated value when the second focusing estimated value created by the second focusing estimating part 3 is smaller than the threshold value, and selecting the second focusing estimated value when larger than the threshold value. The present invention is not, however, limited to this. The focusing method selecting device may, if, for example, any one of the first and second focusing estimated values is useless, select the other estimated value. Herein, "being useless" implies such a case that the image on the imaging element 21 can not be focused on with that estimated value. It is because there must be a case where the focusing point can not be detected depending on the object on account of the fact that the crest climbing type and the image deviation type have their principles absolutely different from each other.

In the first focusing estimating part 2 adopting the crest climbing method, the focusing point is detected with reference to the level of the high frequency component of the picture signal. Therefore, if the object is, e.g., dark, an S/N ratio of the picture signal declines enough not to perform the focusing with a high precision. Further, when the object is on the movement, it might happen that the peak of the high frequency component level can not be detected however long the time may elapse. In such a case, the focusing method selecting apparatus judges that the first focusing estimated value is useless and therefore selects the second focusing estimated value. On the other hand, in the second focusing estimating part 3 adopting the image deviation method, the focusing point is detected based on a deviating direction and a deviation quantity between the images picked up respectively by the line sensors 34a, 34b, and hence, if the object has a streak pattern, it might happen that a plurality of image deviation quantities are detected. In such a case, the focusing method selecting device judges that the second focusing estimated value is useless, and therefore selects the first focusing estimated value. Thus, if any one of the first and second focusing estimated values is useless, the other estimated value is selected, thereby ensuring the focusing on the object.

Next, a second embodiment of the present invention will be described with reference to the drawings.

Figure 12:
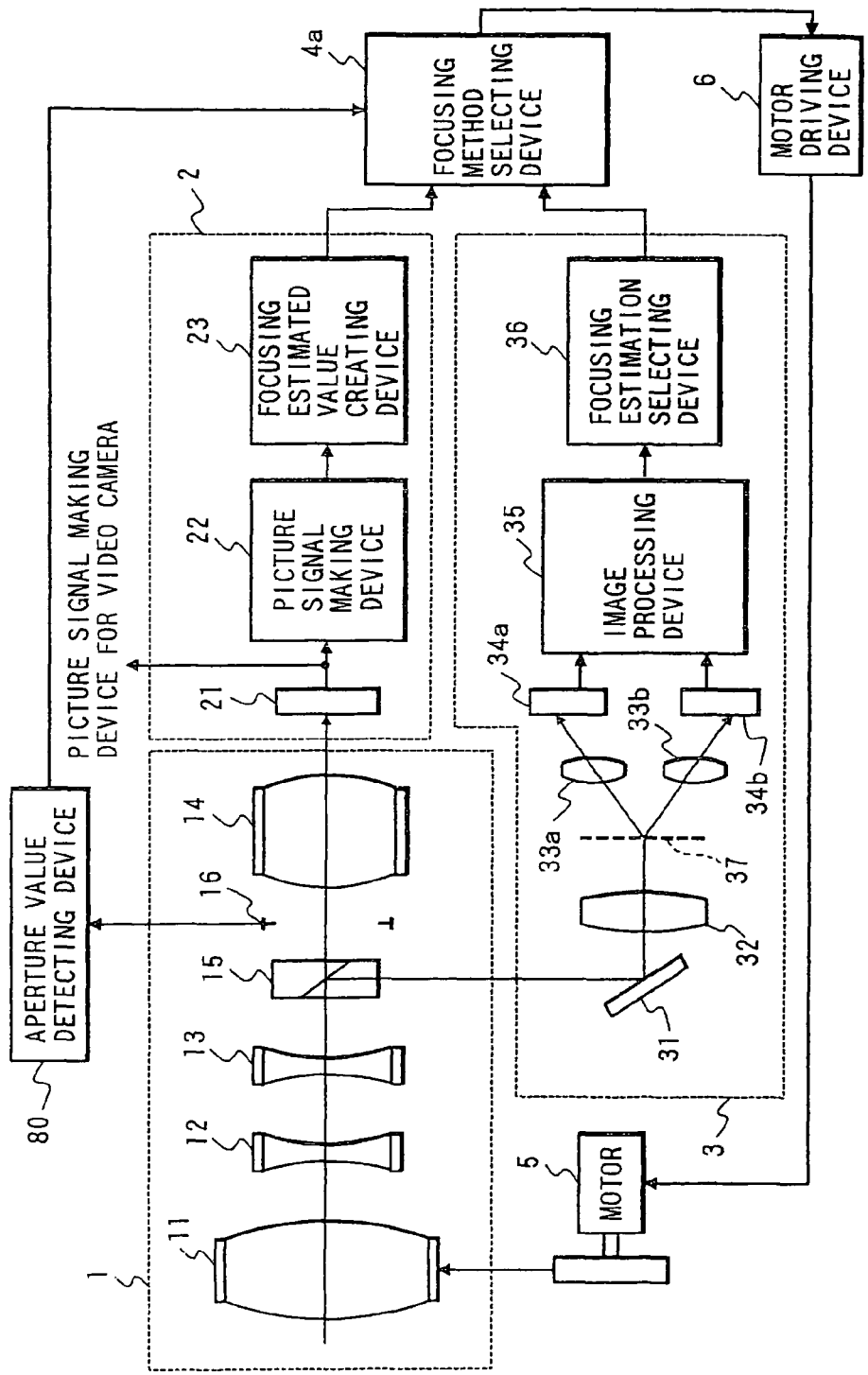
FIG. 12 is a schematic block diagram illustrating the autofocus apparatus in a second embodiment of the present invention.

FIG. 12 is a schematic block diagram illustrating the autofocus apparatus in the second embodiment of the present invention. Note that the elements having the same functions as those in the first embodiment shown in FIG. 10 are marked with the like or corresponding numerals in the second embodiment of the present invention, and the detailed explanations thereof are omitted.

A different point of the autofocus apparatus in the second embodiment shown in FIG. 12 from the first embodiment shown in FIG. 10, is that a focusing method selecting device 4a is employed in place of the focusing method selecting device 4, and that an aperture value detecting device 80 for detecting an aperture value of the stop 16 of the photographing optical system 1. Other configurations are basically the same as those in the first embodiment.

A difference of the focusing method selecting device 4a from the focusing method selecting device 4 used in the first embodiment, is that when the aperture value sent from the aperture value detecting device 80 is under a predetermined threshold value, the second focusing estimated value is selected irrespective of whether or not the required-for-focusing moving quantity, obtained from the second focusing estimated value, of the focus adjusting lens 11 is larger than the threshold value. The following is an elucidation of the reason why the aperture value is referred to for selecting the focusing method. When the stop 16 of the photographing optical system 1 is stopped down, a depth of field becomes larger, and, with this larger depth of field, a crest of the high frequency component level of the picture signal obtained by the imaging element 21 becomes gentle. This implies an enlargement of a range Δd of the position of the focus adjusting lens 11 versus a level range ΔV in which to be judged as an in-focus state in FIG. 2. On the other hand, the stop does not transmit the light beams used for the second focusing estimating part 3, and therefore the required-for-focusing moving quantity, obtained from the second focusing estimated value, of the focus adjusting lens 11 undergoes no influence by the stop. Accordingly, it might be considered that the focusing accuracy in the first focusing estimating part 3 adopting the crest climbing method is inferior to the focusing accuracy in the second focusing estimating part 3 adopting the image deviation method, depending on the aperture value (a degree of stop-down). Then, the focusing method selecting device 4a in the second embodiment selects the second focusing estimated value when the aperture value is under the predetermined threshold value regardless of the required-for-focusing moving quantity, obtained from the second focusing estimated value, of the focus adjusting lens 11. Others are the same as those in the focusing method selecting device 4 employed in the first embodiment.

In accordance with the second embodiment of the present invention, the aperture value of the photographing optical system 1 is referred to for selecting the focusing method, and hence, upon the stop-down of the stop 16, if the focusing accuracy in the first focusing estimating part 2 adopting the crest climbing method is inferior to the focusing accuracy in the second focusing estimating part 3 adopting the image deviation method, the second focusing estimated value can be selected. The optimal focusing method in terms of the focusing accuracy and the focusing speed can be thereby selected.

Incidentally, the second embodiment has been explained so far by way of the one requiring the reference to the aperture value of the photographing optical system 1 on the occasion of the selection of the focusing method. The present invention is not, however, confined to this, and there may be referred to other factors exerting influences upon the depth of field.

Figure 13:
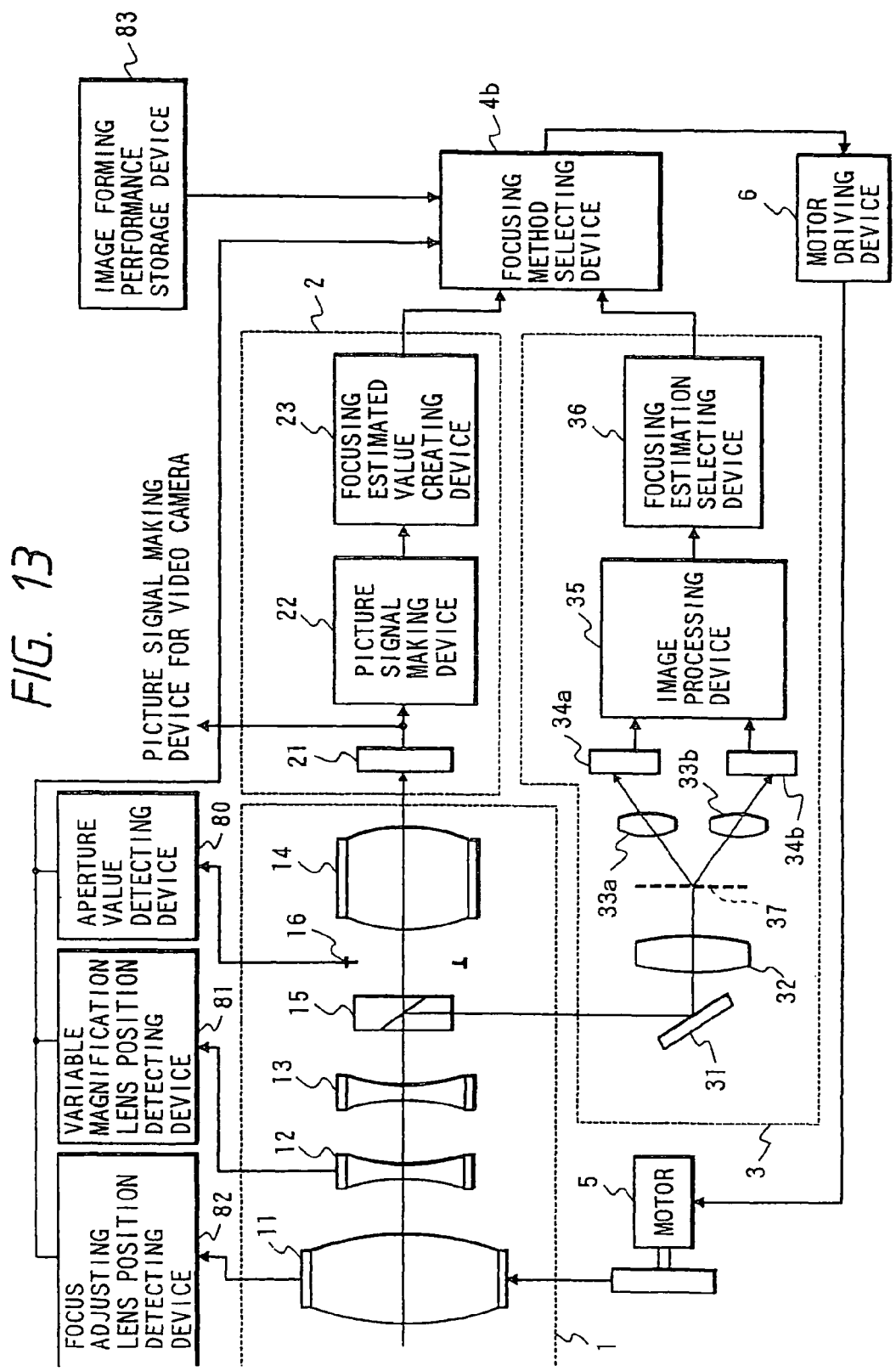
FIG. 13 is a diagram showing a modified example of the second embodiment of the present invention.

FIG. 13 is a diagram showing a modification of the second embodiment. In the autofocus apparatus illustrated in FIG. 13, positions of the focus adjusting lens 11 and of the variable magnification lens 12 are also referred to in addition to the aperture value of the stop 16. This is a consideration that there exists an optical system with a depth of field, i.e., an image forming performance largely changed depending on the position of the variable magnification lens 12 as well as on the position of the focus adjusting lens 11. A focusing method selecting device 4b refers to an aperture value of the stop 16 that is transmitted from an aperture value detecting device 8, a position of the variable magnification lens 12 that is transmitted from a variable magnification lens position detecting device 81, and a position of the focus adjusting lens 11 that is transmitted from a focus adjusting lens position detecting device 82. The focusing method selecting device 4b then reads an image forming performance corresponding to those values from an image forming performance storage device 83. Subsequently, when judging from the thus read image forming performance that the focusing accuracy in the first focusing estimating part 2 adopting the crest climbing method is inferior to the focusing accuracy in the second focusing estimating part 3 adopting the image deviation method, the second focusing estimated value is selected irrespective of the required-for-focusing moving quantity, obtained from the second focusing estimated value, of the focus adjusting lens 11.

Figure 14:
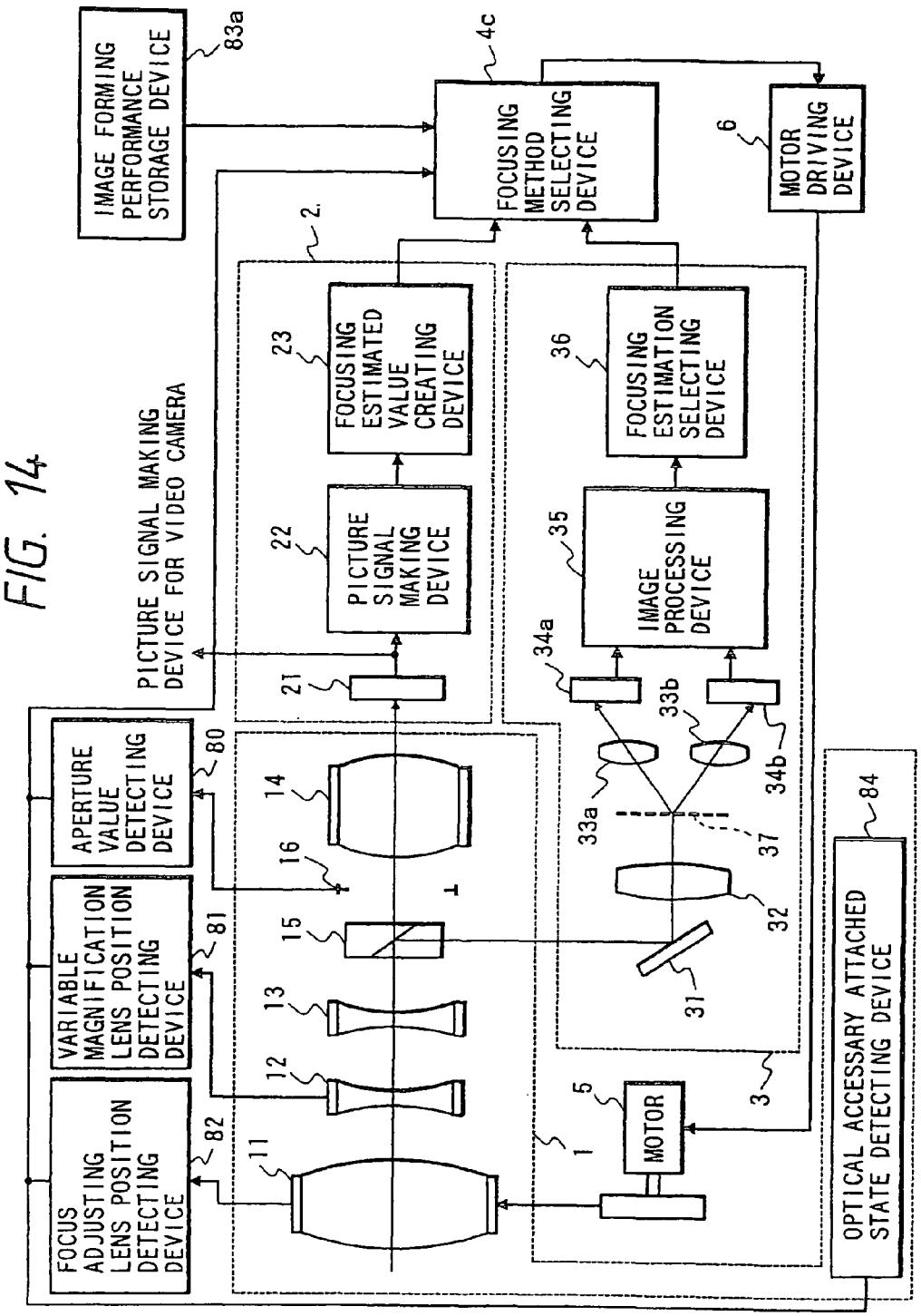
FIG. 14 is a diagram showing a modified example of the second embodiment of the present invention.

FIG. 14 is a diagram showing another modification of the second embodiment. In the autofocus apparatus illustrated in FIG. 14, there is further referred to kinds of attached optical accessaries. Herein, the optical accessaries include converters such as a tele-converter and a wide converter, attachments such as a wide attachment and a fish-eye attachment, filters, close-up lenses, and extenders, which are attached to the photographing optical system 1. Even when those optical attachments are attached thereto, the depth of field, viz., the image forming performance largely varies depending upon the kinds thereof as the case may be. Then, the focusing method selecting device 4c refers to existence and non-existence and kinds of the optical accessaries, which are transmitted from an optical accessary attached state detecting device 84 in addition to the aperture value of the stop 16, and the positions of the variable magnification lens 12 and of the focus adjusting lens 11, and reads the image forming performance corresponding to these values from the image forming performance storage device 83a. Then, the estimated value is selected by the same method as that of the focusing method selecting device 4b of the autofocus apparatus shown in FIG. 13. Note that the kinds of the optical accessaries can be determined by providing the optical accessaries with identification data.

Next, a third embodiment of the present invention will be discussed with reference to the drawings.

Figure 15:
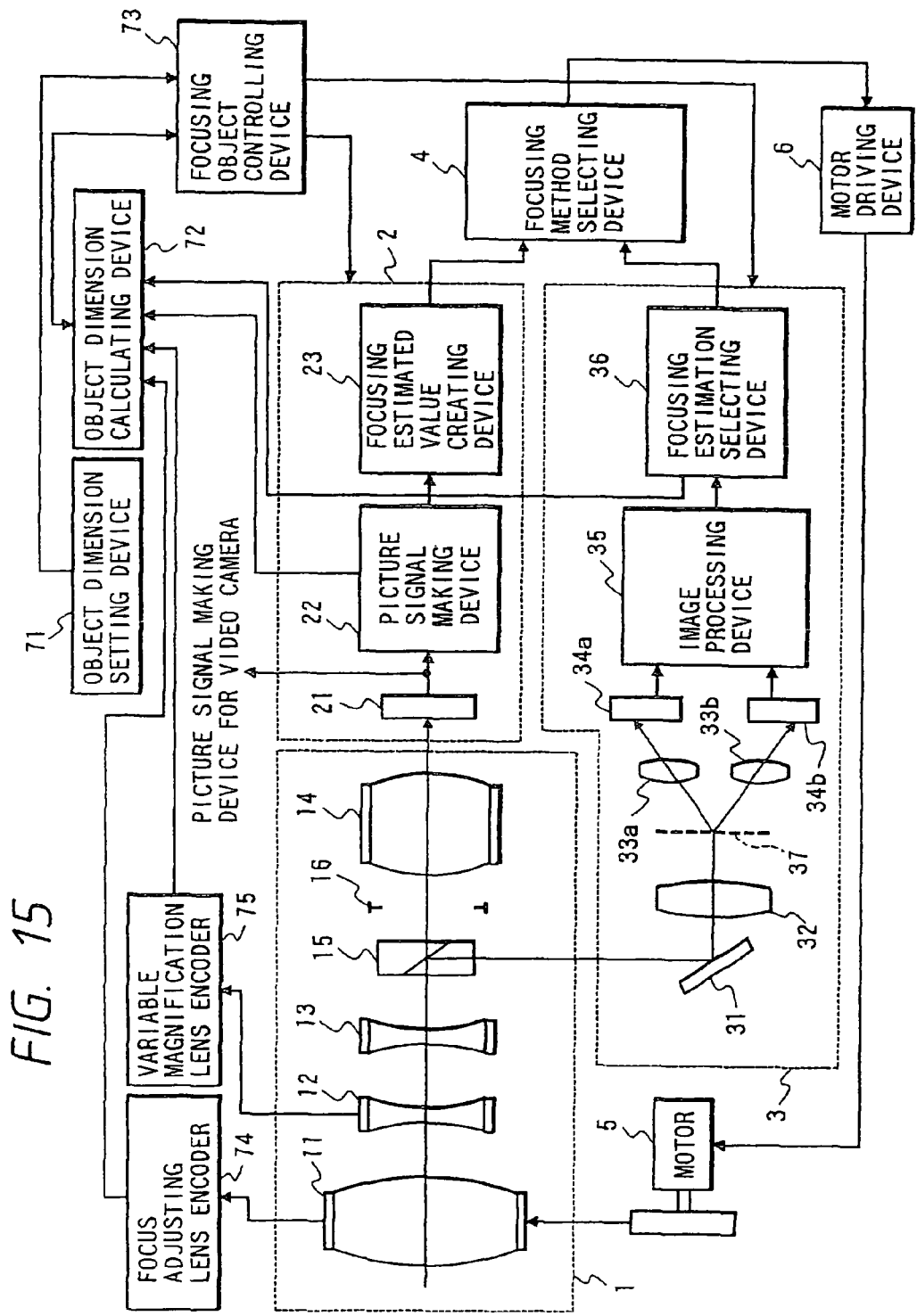
FIG. 15 is a schematic block diagram illustrating the autofocus apparatus in a third embodiment of the present invention.
Figure 16:
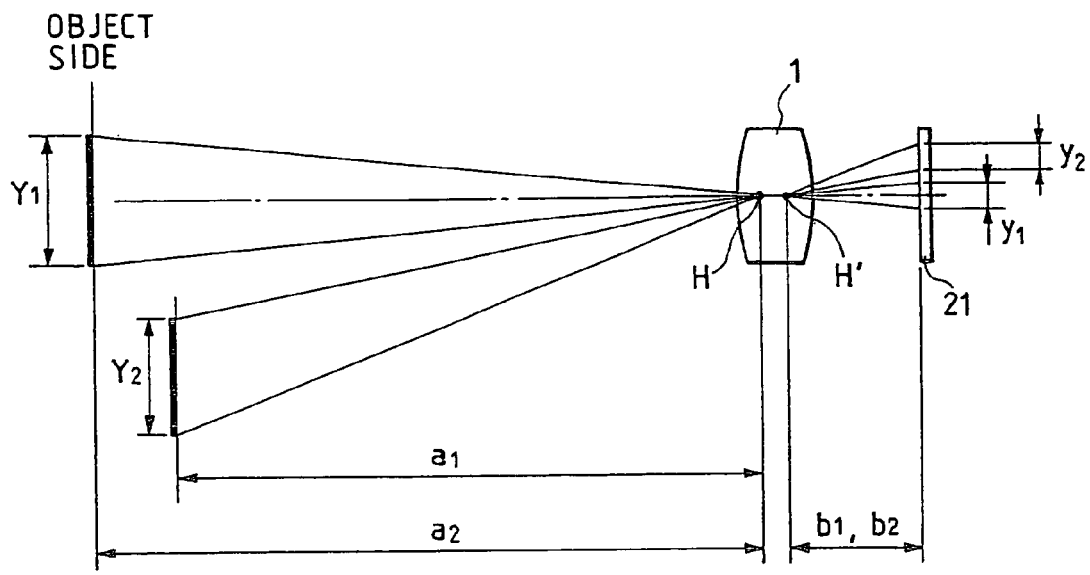
FIG. 16 is an explanatory diagram showing a relationship between a focal length of a photographing optical system, a distance from the photographing optical system to an object, a dimension of the object on an imaging element, and a real dimension of the object.
Figure 17:
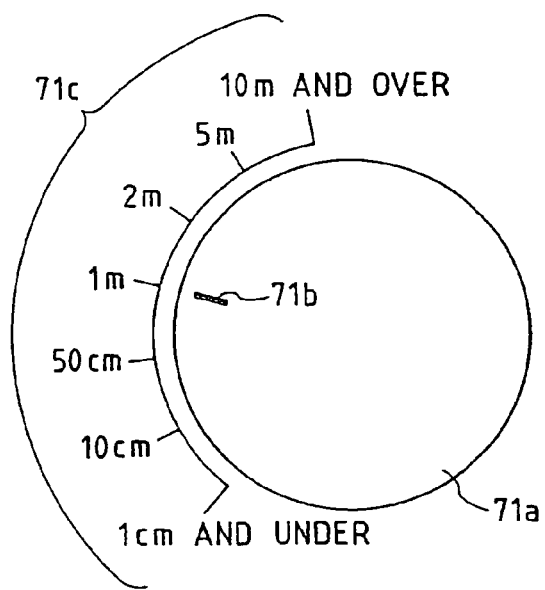
FIG. 17 is a diagram showing one example of an object dimension setting device used in the third embodiment.

FIG. 15 is a schematic block diagram illustrating the autofocus apparatus in the third embodiment of the present invention. FIG. 16 is an explanatory diagram showing a relationship between a focal length of the photographing optical system, a distance from the photographing optical system to the object, a dimension of the object on the imaging element, and a real dimension of the object. FIG. 17 is a diagram showing one example of an object dimension setting device used in the third embodiment. Note that the elements having the same functions as those in the first embodiment shown in FIG. 10 are marked with the like or corresponding numerals in the third embodiment of the present invention, and the detailed explanations thereof are omitted.

A different point of the autofocus apparatus in the third embodiment illustrated in FIG. 15 from the first embodiment shown in FIG. 10, is that there are provided an object dimension setting device 71, an object dimension calculating device 72, a focusing object controlling device 73, a focus adjusting lens encoder 74 for detecting a position of the focus adjusting lens 11, and a variable magnification lens encoder 75 for detecting a position of the variable magnification lens 12. Other configurations are basically the same as those in the first embodiment.

The object dimension setting device 71 sets a dimension (e.g., lengthwise size×crosswise size) of the object to be focused on (focusing object) with inputting by the photographer or the like. In the embodiment illustrated in FIG. 17, a pointer 71b on a knob 71a consisting of a rotary type variable resistor is set to an arbitrary value of a scale 71c, thus setting this value to a dimension of the focusing object. Herein, the value of the scale 71c represents a crosswise size of the focusing object. The object dimension setting device 71 outputs, to the focusing object controlling device 73, a resistance value of the knob 71a, i.e., a signal corresponding to the value of the scale 71c which value is pointed by the pointer 71b on the knob 71a. Note that a slide type variable resistor and a multi-stage switch or an encoder, etc. may also be employed as a substitute for the knob 71a consisting of the rotary type variable resistor in FIG. 17. Further, this dimension may be displayed on a finder of the video camera or recorded in a record picture so that the photographer is able to grasp the dimension of the focusing object which has been set by himself or herself.

The object dimension calculating device 72 calculates the real dimension of the object on the basis of a distance from an image-side principal point of the photographing optical system 1, a distance from an object-side principal point of the photographing optical system 1, and a dimension of the object on the imaging element 21. Referring to FIG. 16, the real dimensions $Y_1$ and $Y_2$ of the objects $Z_1$, $Z_2$ are expressed by the following formulae:

$$Y_1 = a_1 \times y_1 \div b_1$$

$$Y_2 = a_2 \times y_2 \div b_2$$

where $b_1$, $b_2$ are the distances from the image side principal point H' of the photographing optical system 1 to the image surface, $a_1$, $a_2$ are the distances from the object-side principal point H of the photographing optical system 1 to the objects $Z_1$, $Z_2$, and $y_1$, $y_2$ are the dimensions of the objects $Z_1$, $Z_2$ on the imaging element 21.

In the photographing optical system 1 in the third embodiment, the distances $b_1$, $b_2$ from the image side principal point H' of the photographing optical system 1 to the image surface are obtained based on data about a position of the variable magnification lens 12 which position is detected by the variable magnification lens encoder 75.

Further, the distances $a_1$, $a_2$ from the photographing optical system 1 to the objects $Z_1$, $Z_2$ are calculated based on a deviating direction and a deviation quantity (a second focusing estimated value) in terms of imaging positions between the images picked up respectively by the line sensors 33a, 33b in the second focusing estimating part 3, and on data about a position of the focus adjusting lens 11 which position is detected by the focus adjusting lens encoder 74. Note that if the object on the imaging element 21 is in a state approximate to the in-focus state, the distance from the object-side principal point of the photographing optical system can be obtained based on the position of the focus adjusting lens 11. The third embodiment is, however, constructed such that the distance from the photographing optical system 1 to the object can be obtained even in a defocused state of the object on the imaging element 21 by use of the second focusing estimated value created by the image deviation method and the positional data of the focus adjusting lens 11.

Moreover, the dimensions of the objects $Z_1$, $Z_2$ on the imaging element 21 can be obtained by executing proper image processing on the image data of the imaging element 21. For instance, the dimensions of the objects $Z_1$, $Z_2$ on the imaging element 21 can be acquired by emphasizing the object out by using color signals of the image data and binarizing the image or by executing a process such as detecting an outline and so forth. Furthermore, if the object on the imaging element 21 is in the state approximate to the in-focus state, the dimension of the object on the imaging element 21 can be obtained by recognizing that a portion, with a large variation in contrast, of the picture signal generated by the picture signal making device 22 is defined as a peripheral portion of the object.

The focusing object controlling device 73 compares the object real dimension calculated by the object dimension calculating device 72 with the object dimension set by the object dimension setting device 71. Then, if the two dimensions are substantially the same, the first and second focusing estimating parts 2 and 3 are controlled to focus on the object. That is, the first and second focusing estimating parts 2 and 3 are controlled to create the first and second estimated values with respect to the object. Whereas if the above two dimensions are not substantially the same, the first and second focusing estimating parts 2, 3 are controlled to focus on an object exclusive of the object concerned among the images on the imaging element 21. That is, the first and second focusing estimating parts 2, 3 are controlled to create the first and second focusing estimated values with respect to the object other than the object concerned. Note that this focusing object controlling device 73 is constructed of, e.g., a CPU (Central Processing Unit) or the like integrally with the focusing estimated value creating devices 23, 36 and the focusing method selecting device 4.

Next, an operation of the third embodiment will be described. The object dimension setting device 71 sets the dimension of the focusing object and transmits data about this dimension to the focusing object controlling device 73. On the other hand, the object dimension calculating device 72 calculates the object real dimension to be considered as the first and second estimated values created by the first and second focusing estimating parts 2 and 3, and transmits data about this dimension to the focusing object controlling device 73.

The focusing object controlling device 73 compares the object real dimension calculated by the object dimension calculating device 72 with the object dimension set by the object dimension setting device 71. Then, if the two dimensions are substantially the same, the object concerned is judged to be the focusing object, and the first and second focusing estimating parts 2 and 3 are controlled to successively create the first and second focusing estimated values with respect to the object concerned. Whereas if not substantially the same, the object concerned is judged not to be the focusing object, and the first and second focusing estimating parts 2 and 3 are controlled to create the first and second focusing estimated values with respect to an object other than the object concerned. Then, the above comparison is repeated till the focusing object is detected from the images on the imaging element 21. Note that other operations in the third embodiment are fundamentally the same as those in the first embodiment.

In accordance with the third embodiment of the present invention, the focusing on the object is carried out only when the object real dimension calculated by the object dimension calculating device 72 is substantially coincident with the dimension set by the object dimension setting device 71. The autofocusing operation can be thereby performed with respect to only the object having the dimension substantially coincident with the dimension of the focusing object. It is therefore feasible to prevent the focusing on an unexpected object and an object traversing in front of the object concerned.

Moreover, the photographer is capable of varying the dimension of the focusing object corresponding to a condition when photographed by use of the object dimension setting device 71 by which the photographer can set the dimension of the focusing object.

Note that the focusing object is judged by making use of the crosswise dimension of the object in the third embodiment, but the present invention is not limited to this. According to the present invention, the focusing object can be judged by making use of dimensions in the perpendicular and oblique directions. In this case, the range of the object to be photographed can be further widened.

Also, in the third embodiment, the object dimension setting device 71 has been discussed so far as the one by which the photographer is capable of inputting the dimension of the focusing object. The present invention is not, however, confined to this. For instance, it may be practiced that objects (human being, vehicle, etc.) generally exhibiting a high possibility of being focused may be expressed in graphics like symbols and characters, and the photographer arbitrarily selects any one of these graphics, thereby setting the dimension of the focusing object. For example, when the human being is selected, the dimension of the focusing object is set to 50 cm that can be considered as a standard body breadth of the human being. In this case, the graphics representing the human being, wire netting and vehicle are displayed on the finder of the video camera, and are selectable by a switch provided in another position different from the finder and a touch panel provided on the finder.

Further, in accordance with the third embodiment, the focusing object controlling device 73 has been explained so far as the one constructed to focus the object concerned only when the object real dimension calculated by the object dimension calculating device 72 is substantially the same as the dimension set by the object dimension setting device 71, the present invention is not, however, limited to this. For instance, if the object real dimension calculated by the object dimension calculating device 72 is substantially the same as the dimension set by the object dimension setting device 71, the focusing on the object concerned may not be performed. With this arrangement, the focusing on a specified object (e.g., wire netting or the like) is not allowed. Further, for example, the photographer is able to make a selection about whether the focusing is effected with the dimension set by the object dimension setting device, and, whether to focus on the object concerned may be judged based on a selected content.

Figure 18:
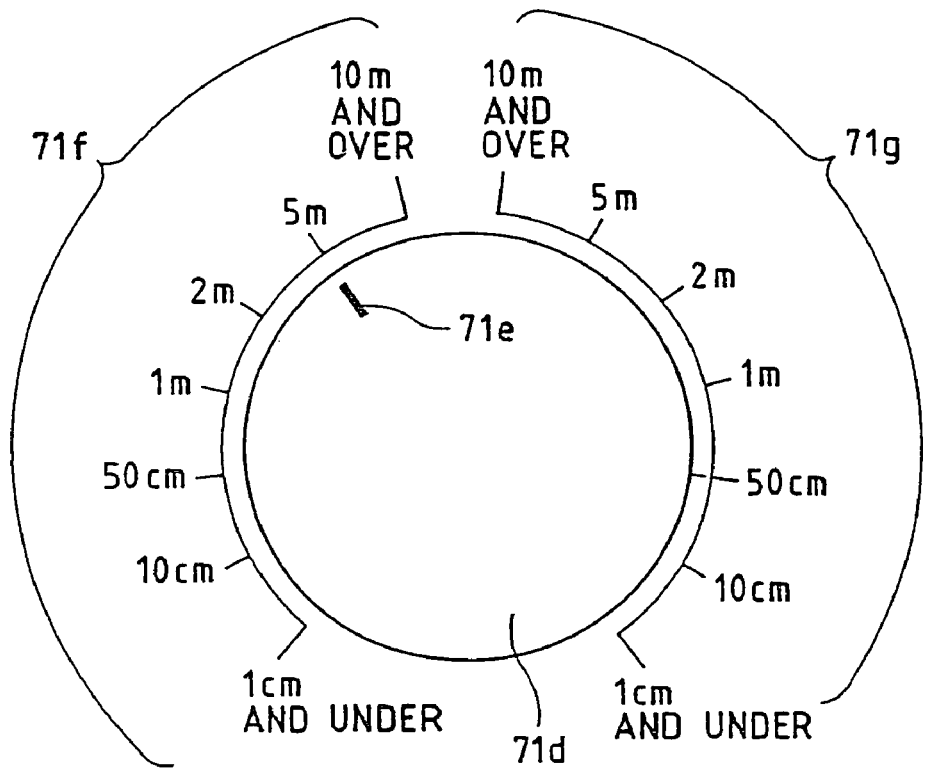
FIG. 18 is a diagram showing one example of the object dimension setting device used in the third embodiment.

In this case, the object dimension setting device is preferably capable of selecting the focusing object and non-focusing objects (which must not be focused on) as illustrated in FIG. 18. In the embodiment shown in FIG. 18, a pointer 71e of a rotary type variable resistor 71d is set to an arbitrary value of a focusing scale 71f or a non-focusing scale 71g, thus setting this value to a dimension of the focusing object or the non-focusing object. Herein, each of the values of the scales 71f, 71g represents a crosswise size of the object. This object dimension setting device outputs, to the focusing object controlling device, resistance values of the variable resistor 71, viz., signals corresponding to a scale type (the focusing scale 71f or the non-focusing scale 71g) pointed by the pointer 71e of the variable resistor 71d and to a value of the scale.

Further, in accordance with the third embodiment, there has been described the way how the lens position is measured by the encoders 74, 75 for obtaining the positional data of the variable magnification lens 12 and of the focus adjusting lens 11. However, if open roof control is executed by use of a stepping motor as a driving source for each lens, it is possible to grasp the lens position at all times without any encoder.

Figure 19:
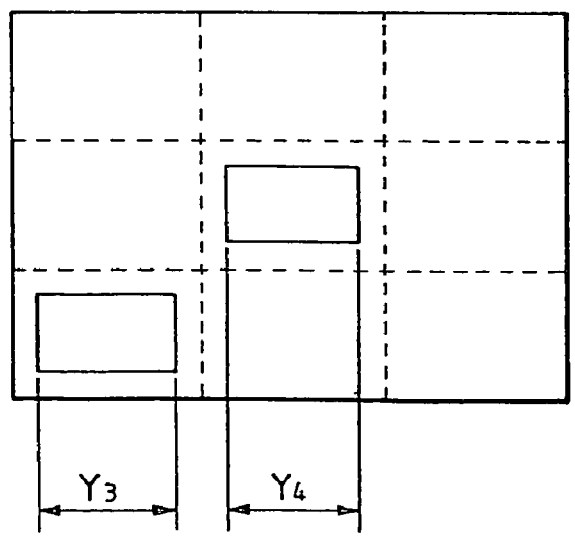
FIG. 19 is an explanatory diagram showing a case where a plurality of distance measuring portions of a second focusing estimating portion are provided.

Moreover, as explained in the first embodiment, there are developed some of even the image deviation type autofocus apparatuses, which are capable of setting the focus area in a plurality of portions within the photographic area. If that kind of autofocus apparatus is used for the second focusing estimating part 3 in the third embodiment, the crest climbing method and the image deviation method are used in combination for focusing the image corresponding to the object that exists in the portion concerned in the plurality of portions within the photographic area. Also, the real dimension of the object can be thereby measured. This makes it feasible to focus on any one of the objects by letting the photographer select the focus area (e.g., the central portion of the photographic area) when, for example, as illustrated in FIG. 19, objects $Y_3$, $Y_4$ each having substantially the same dimension appear on the photographic area.

Note that the focusing method selecting device 4 and the focus estimated value creating device 23 of the first estimating part 2 are omitted, and the picture signal transmitted from the picture signal making device 22 of the first estimating part 2 may be used exclusively for measuring the dimension of the object on the imaging element 21 in the third embodiment. In this case, the image on the imaging element 21 is focused on the corresponding object on the basis of the second focusing estimated value created by the second focusing estimating part 3.

Next, a fourth embodiment of the present invention will be discussed with reference to the drawings.

Figure 20:
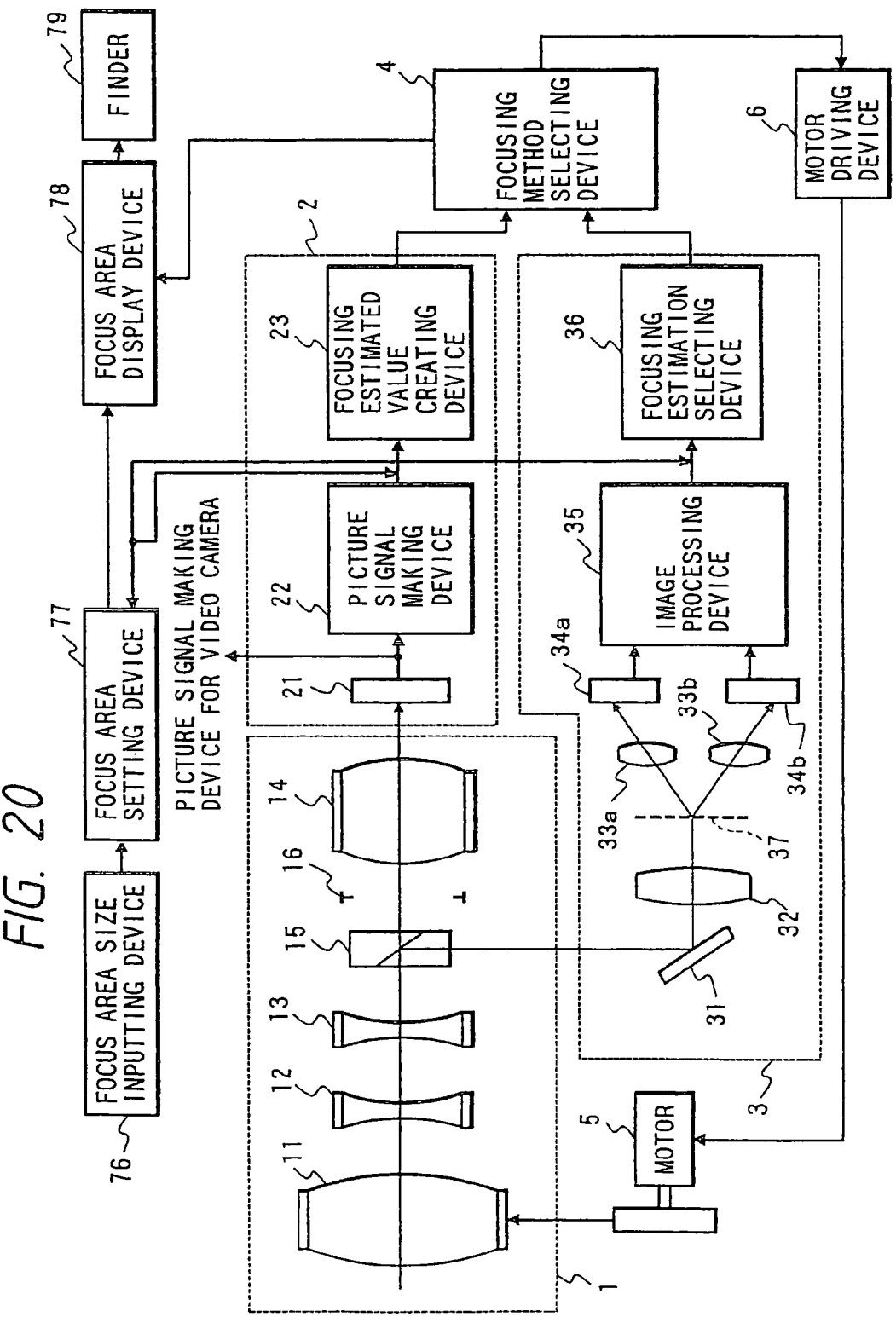
FIG. 20 is a schematic block diagram illustrating the autofocus apparatus in a fourth embodiment of the present invention.
Figure 21:
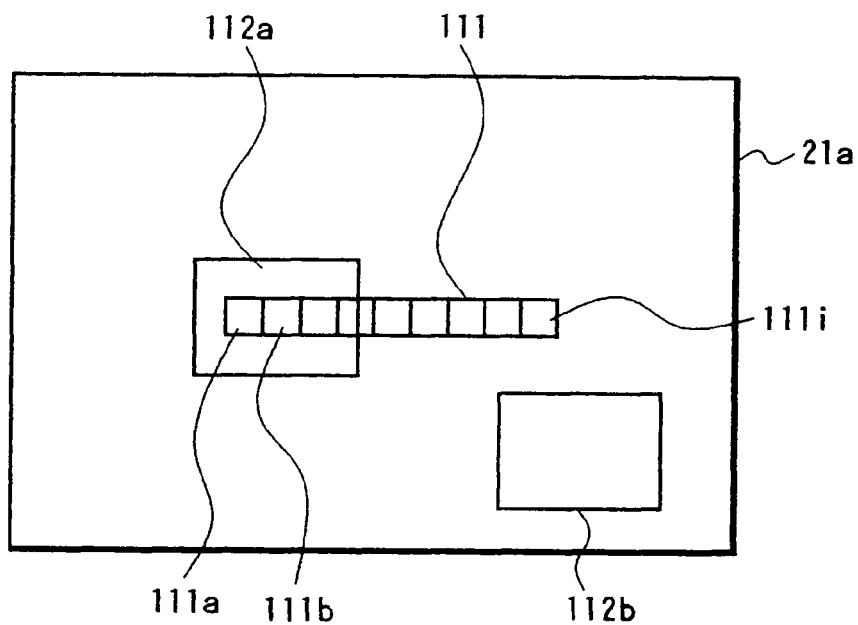
FIG. 21 is an explanatory diagram showing a focus area of a first focusing estimating portion and a focus area of the second focusing estimating portion.
Figure 22:
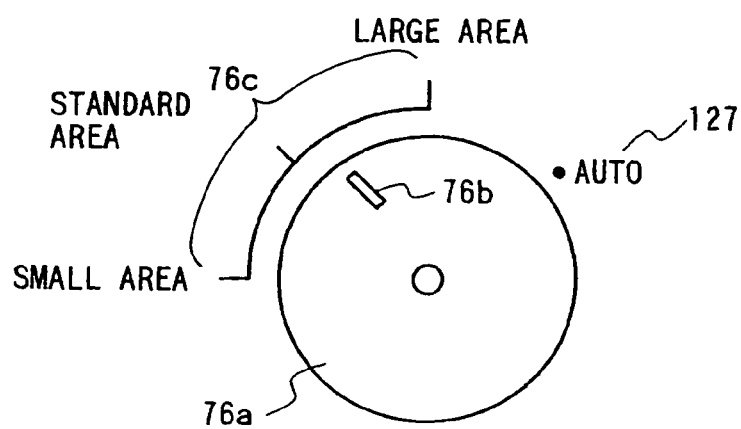
FIG. 22 is a diagram showing one example of a focus area inputting device used in the fourth embodiment.
Figure 23:
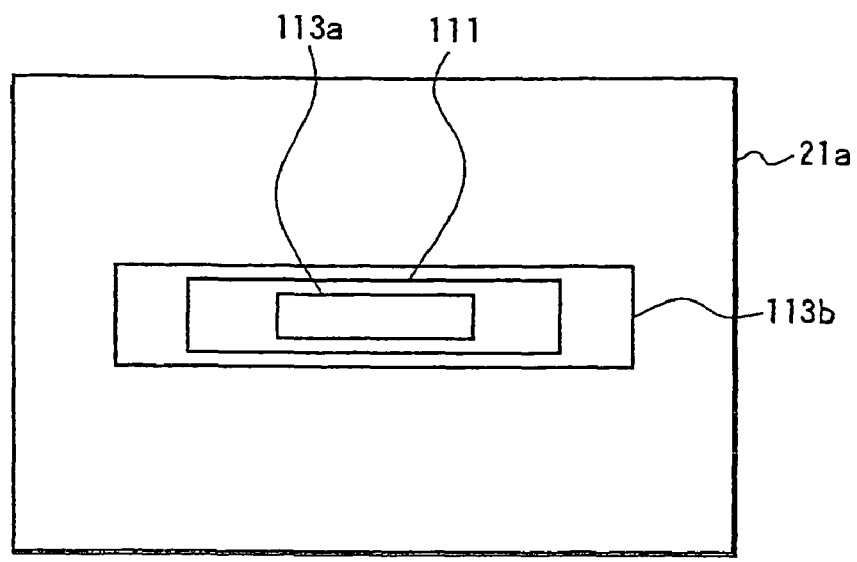
FIG. 23 is an explanatory diagram showing how a focus area setting device operates.

FIG. 20 is a schematic block diagram illustrating the autofocus apparatus in a fourth embodiment of the present invention. FIG. 21 is an explanatory diagram showing a focus area of the first focusing estimating part and a focus area of the second focusing estimating part. FIG. 22 is a diagram showing one example of a focus area inputting device used in the fourth embodiment. FIG. 23 is an explanatory diagram showing an operation of a focus area setting device. Note that the elements having the same functions as those in the first embodiment shown in FIG. 10 are marked with the like or corresponding numerals in the fourth embodiment of the present invention, and the detailed explanations thereof are omitted.

A different point of the autofocus apparatus in the fourth embodiment illustrated in FIG. 20 from the first embodiment shown in FIG. 10, is that there are provided a focus area size inputting device 76, a focus area setting device 77 and a focus area display device 78. Other configurations are basically the same as those in the first embodiment.

The first focusing estimating part 2 using the crest climbing method creates the first focusing estimated value based on the picture signal obtained by the imaging element 21. Therefore, as illustrated in FIG. 21, the first focusing estimated value is creased based on the picture signals by fetching the picture signals on the imaging element 21, these signals corresponding to arbitrary areas in the photographic area 21*a* photographed by the photographing optical system 1, e.g., areas 112*a* and 112*b*. That is, the first focusing estimating part 2 is capable of arbitrarily varying the focus area. On the other hand, the focus area of the second focusing estimating part 3 using the image deviation method is set in predetermined area depending on sizes of the image forming lens 32, the line sensors 34*a*, 34*b* and the image re-forming lenses 33*a*, 33*b*. Accordingly, the focus area of the second focusing estimating part 3 is not variable. In the autofocus apparatus in the fourth embodiment, the focus area of the second focusing estimating part 3 is, as illustrated in FIG. 21, set in a vicinity-of-center 111 of the photographic area 21*a*. Further, the image processing device 35 executes predetermined image processing, thereby subdividing the focus area 111 into a plurality of unit areas 111*a*-111*i*. Then, an image deviation is detected in each of the unit areas 111*a*-111*i*.

The focus area size inputting device 76 is designed so that the photographer inputs data about the focus area of the first focusing estimating part 2. In an example shown in FIG. 22, a pointer 76*b* of a knob 76*a* consisting of a rotary type variable resistor is set to an arbitrary position of a scale 76*c*, thus designating a size of the focus area. For example, when the pointer 76*b* is set to "standard" of the scale 76*c*, the focus area of the first focusing estimating part 2 becomes substantially the same as the size of the focus area of the second focusing estimating part 3. Further, when the pointer 76*b* of the scale 76*c* is set on a "smaller area" side than the "standard area" position of the scale 76*c*, the focus area of the first focusing estimating part 2 becomes smaller than the focus area of the second focusing estimating part 3. Moreover, when the pointer 76*b* of the scale 76*c* is set on a "larger area" side than the "standard" position of the scale 76*c*, the focus area of the first focusing estimating part 2 is larger than the focus area of the second focusing estimating part 3. Note that a size ratio of the focus area is set variable corresponding to a rotational quantity of the knob 76*a* on the basis of the "standard area" position of the scale 76*c*. Further, when the pointer 76*b* is set to "AUTO" 76*d*, the focus area of the first focusing estimating part 2 is varied in accordance with a size of the object.

The focus area size inputting device 76 outputs, to a focus area setting device 77, a resistance value of the knob 76*a*, i.e., a signal corresponding to a position pointed by the pointer 76*b* of the knob 76*a*. Note that a knob constructed of a slide type variable resistor and a multi-stage switch or an encoder may substitute for the knob 71*a* consisting of the rotary type variable resistor in FIG. 22. Further, an operating portion may be displayed on the finder 79 of the video camera, and this operating portion may be selectable by a switch provided in a different position from the finder 79 or by a touch panel disposed on the finder 79. Moreover, the "AUTO" switch may be separately provided, and the "AUTO" function may be switched ON and OFF by depressing the knob.

The focus area setting device 77 sets the focus area of the first focusing estimating part 2 on the basis of the signal transmitted from the focus area size inputting device 76. For instance, when the "standard area" is inputted to the focus area size inputting device 76, as shown in FIG. 23, the focus area of the first focusing estimating part 2 is set in substantially the same size and in the same position as those of the focus area 111 of the second focusing estimating part 3. Further, when the "larger area" is inputted to the focus area size inputting device 76, the focus area of the focusing estimating part 2 is set to an area 113*b* larger than the focus area 111 as well as in substantially the same position as the focus area 111 of the second focusing estimating part 3. Furthermore, when the "smaller area" is inputted to the focus area size inputting device 76, the focus area of the focusing estimating part 2 is set to an area 113*a* smaller than the focus area 111 as well as in substantially the same position as the focus area 111 of the second focusing estimating part 3.

Figure 24:
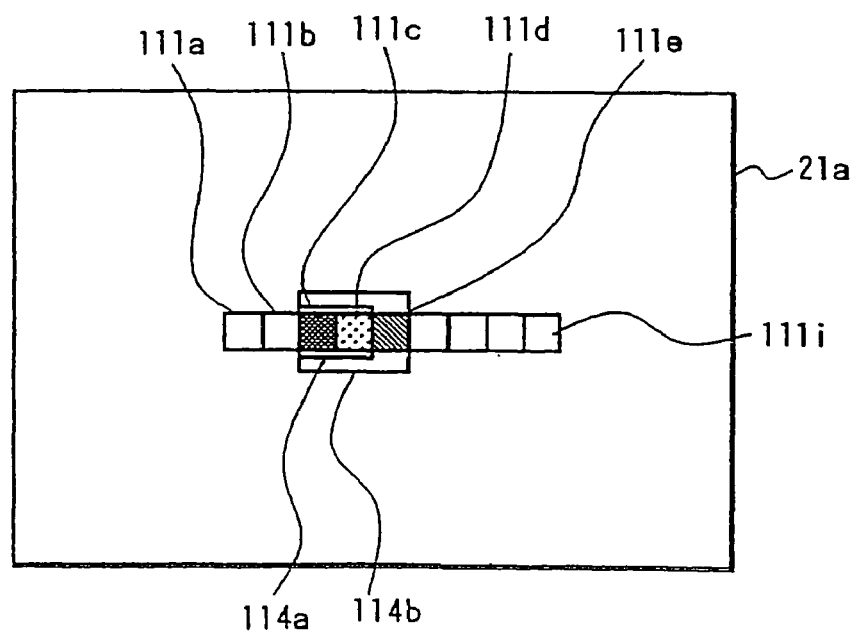
FIG. 24 is an explanatory diagram showing how the focus area setting device operates.

Further, when the "AUTO" is inputted to the focus area size inputting device 76, the focus area of the first focusing estimating part 2 is set in the following procedures. To start with, the focus area setting device 77, as shown in FIG. 24, obtains a distance from the photographing optical system 1 to the object for every object photographed in each of the unit areas 111*a*-111*i* on the basis of an image deviation quantity detected in each of the unit areas 111*a*-111*i* of the focus area 111 of the second focusing estimating part 3. Next, the focus area setting device 77 detects the unit areas adjacent to each other and having substantially the same distance from the photographing optical system 1 to the object, from the unit areas 111*a*-111*i*. It can be assumed that the identical object is photographed in the unit areas adjacent to each other and having substantially the same distance from the photographing optical system to the object. Hence, it can be judged that a size of the object corresponds to a region surrounded by these unit areas. Next, the focus area setting device 77 sets an area including the detected unit areas by way of the focus area of the first focusing estimating part 2. For example, referring to FIG. 24, when the unit areas 111*c*, 111*d* are detected, an area 114*a* is set as the focus area of the first focusing estimating part 2. Also, when the unit areas 111*c*-111*e* are detected, an area 114*b* is set as the focus area of the first focusing estimating part 2.

Moreover, the focus area setting device 77 issues a command to the first focusing estimating part 2 to create the first focusing estimated value based on the thus set focus area. This focus area setting device 77 is so constructed of, e.g., the CPU (Central Processing Unit), etc. as to be integral with the focusing estimated value creating devices 23, 36 and the focusing method selecting device 4.

The focus area display device 78, when the focusing method selecting device 4 selects the first focusing estimated value, displays the focus area of the first focusing estimating part 2 on the finder 79 of the video camera, and, when selecting the second focusing estimated value, displays the focus area of the second focusing estimating part 3 thereon. Incidentally, those areas may be displayed on a monitor screen or the like as well as on the finder 79 together.

In the fourth embodiment of the present invention, the size of the focus area of the first focusing estimating part 2 may be made variable with respect to the size of the focus area of the second focusing estimating part 3. Therefore, the focus area making use of advantages of the crest climbing method and of the image deviation method, can be set.

For instance, when the focus area of the first focusing estimating part 2 is set smaller than the focus area of the second focusing estimating part 3, a hitherto-undetectable minute object can be focused on in the second focusing estimating part 3. Further, the first estimating part 2 takes a charge of correspondence to the minute object, and consequently the accuracy can be decreased by increasing the resolutions of the line sensors 34*a*, 34*b* of the second focusing estimating part 3. A rise in the costs can be thereby restrained.

Moreover, in accordance with the fourth embodiment of the present invention, one of the focus areas of the first and second focusing estimating parts 2 and which area is selected by the focusing method selecting device 4, is displayed on the finder 79, and hence the photographer is able to always confirm the focus area.

Figure 25:
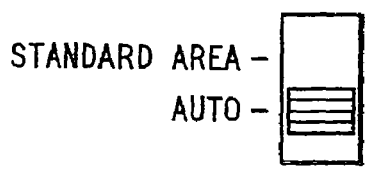
FIG. 25 is a diagram showing one example of the focus area inputting device used in the fourth embodiment.
Figure 26:
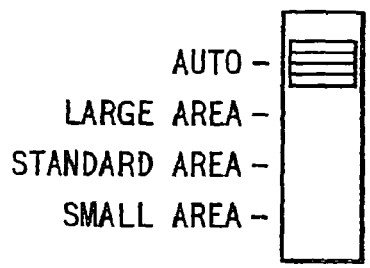
FIG. 26 is a diagram showing one example of the focus area inputting device used in the fourth embodiment.

Note that the focus area size inputting device 76 has been explained so far as the one capable of inputting both of the manual adjustment and the auto control in the fourth embodiment of the present invention, but the present invention is not confined to this. For instance, as illustrated in FIG. 25, only two kinds of items "standard area" and "AUTO" with an omission of the manual adjustment may be switched over by a switch, or reversely, with an omission of "AUTO", the setting is done by only the manual knob. Also, as shown in FIG. 26, four sorts of items "standard area", "large area", "small area" and "AUTO" may be switched over by the switch.

Figure 27:
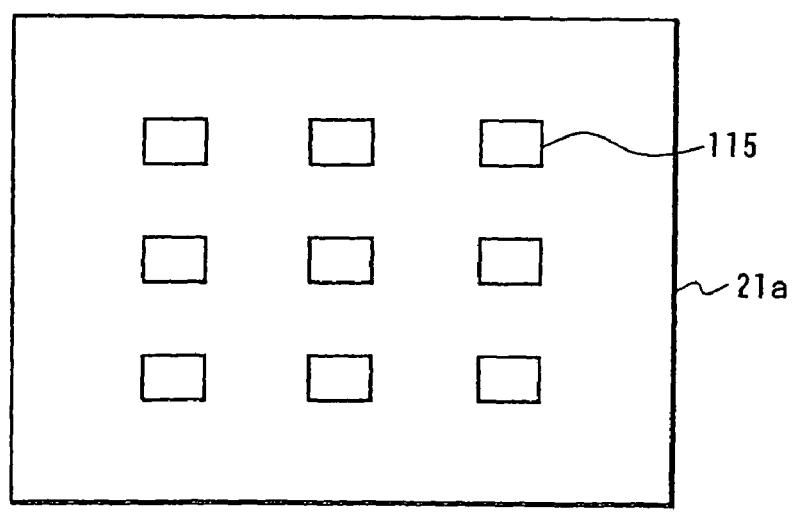
FIG. 27 is an explanatory diagram showing a case where a plurality of focus areas of the second focusing estimating portion are provided.

Further, as discussed in the first embodiment, some of even the image deviation type autofocus apparatuses have been developed so as to be capable of setting the plurality of portions within the photographic area as the focus area. If the autofocus apparatus of this kind is used for the second focusing estimating part 3 in the fourth embodiment, as illustrated in FIG. 27, even the image deviation type apparatus is capable of setting the focus area over the plurality of areas 115. Therefore, the focus area size inputting device 76 is set to "AUTO", whereby the distance from the photographing optical system 1 to the object can be obtained for every object photographed within the focus areas 115 on the basis of the image deviation quantity in each of the focus areas 115. A size of the object can be thereby determined, and hence, the focus area of the first focusing estimating part 2 can be set corresponding to the size of the object.

Note that when the autofocus apparatus in each of the first through fourth embodiments is applied to the video camera, etc., it is a general construction that a lens barrel incorporates the photographing optical system 1 and the motor 5, and a camera body incorporates other constructive elements. The present invention is not, however, limited to this construction.

Next, a fifth embodiment of the present invention will be discussed with reference to the drawings.

Figure 28:
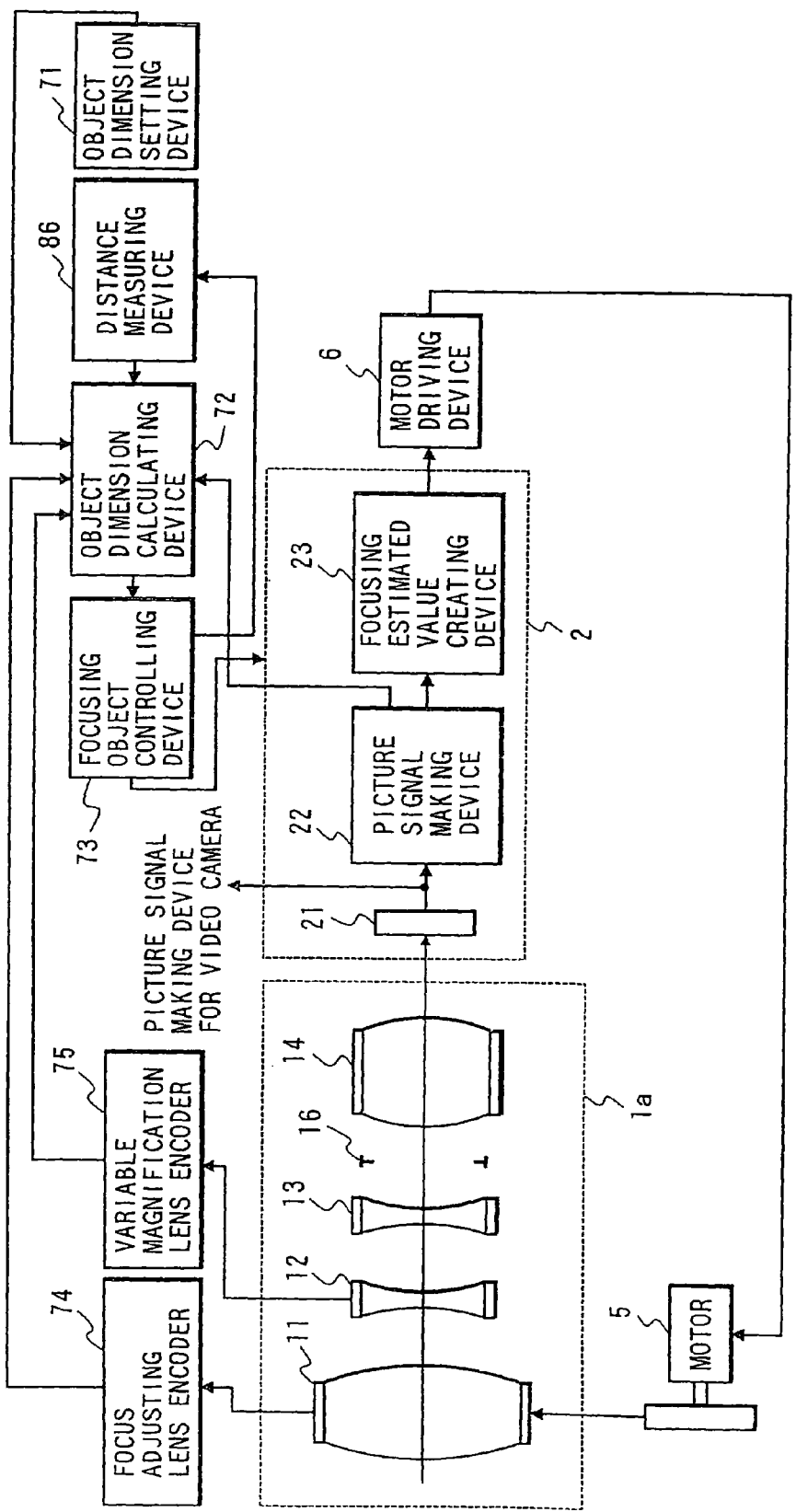
FIG. 28 is a schematic block diagram illustrating the autofocus apparatus in a fifth embodiment of the present invention.

FIG. 28 is a schematic block diagram illustrating the autofocus apparatus in the fifth embodiment of the present invention. Note that the elements having the same functions as those in the first embodiment shown in FIG. 10 or the third embodiment shown in FIG. 15 are marked with the like or corresponding numerals in the fifth embodiment of the present invention, and the detailed explanations thereof are omitted.

The autofocus apparatus in the fifth embodiment, as illustrated in FIG. 28, includes a photographing optical system 1a, the first focusing estimating part 2, the motor 5, the motor driving device 6, the object dimension setting device 71, the object dimension calculating device 72, the focusing object controlling device 73, the focus adjusting lens encoder 74, the variable magnification lens encoder 75, and a distance measuring device 86. Herein the first focusing estimating part 2, the motor 5 and the motor driving device 6 are identical with those used in the first embodiment. Further, the object dimension setting device 71, the object dimension calculating device 72, the focusing object controlling device 73, the focus adjusting lens encoder 74, and the variable magnification lens encoder 75 are identical with those employed in the third embodiment.

A different point of the photographing optical system 1a from the photographing optical system 1 used in the first embodiment is that the optical element 15 for splitting the light beam is removed therefrom.

Others are the same as those in the photographing optical system 1. The distance measuring device 86 measures a distance from the photographing optical system 1a to the object that corresponds to the first focusing estimated value created by the first focusing estimating part 2. A distance measuring method that can be considered may be a method involving the use of infrared rays.

In accordance with the fifth embodiment of the present invention, a real dimension of the object can be measured by providing the distance measuring device 86 for measuring the distance from the photographing optical system 1a in the autofocus apparatus constructed to perform the focusing by use of only the crest climbing method. Further, in the distance measuring device 86, the accuracy for calculating the dimension of the object may suffice, and there is no necessity for making a high-accuracy measurement. It is therefore feasible to perform the autofocus operation for only the object having substantially the same dimension as the dimension set by the object dimension setting device 71, or executing the autofocus operation for only the object having a dimension exclusive of the dimension set by the object dimension setting device 71. Accordingly, it is possible to prevent the focusing on an unexpected object and an object traversing in front of the object concerned.

The present invention is not confined to the respective embodiments discussed above but may be modified in many ways within the gist thereof. Further, the autofocus apparatus in each of the embodiment stated above can be used for not only the video camera but also other cameras such as an electronic still camera, etc.

A sixth embodiment of the present invention will hereinafter be described with reference to the drawings.

Figure 29:
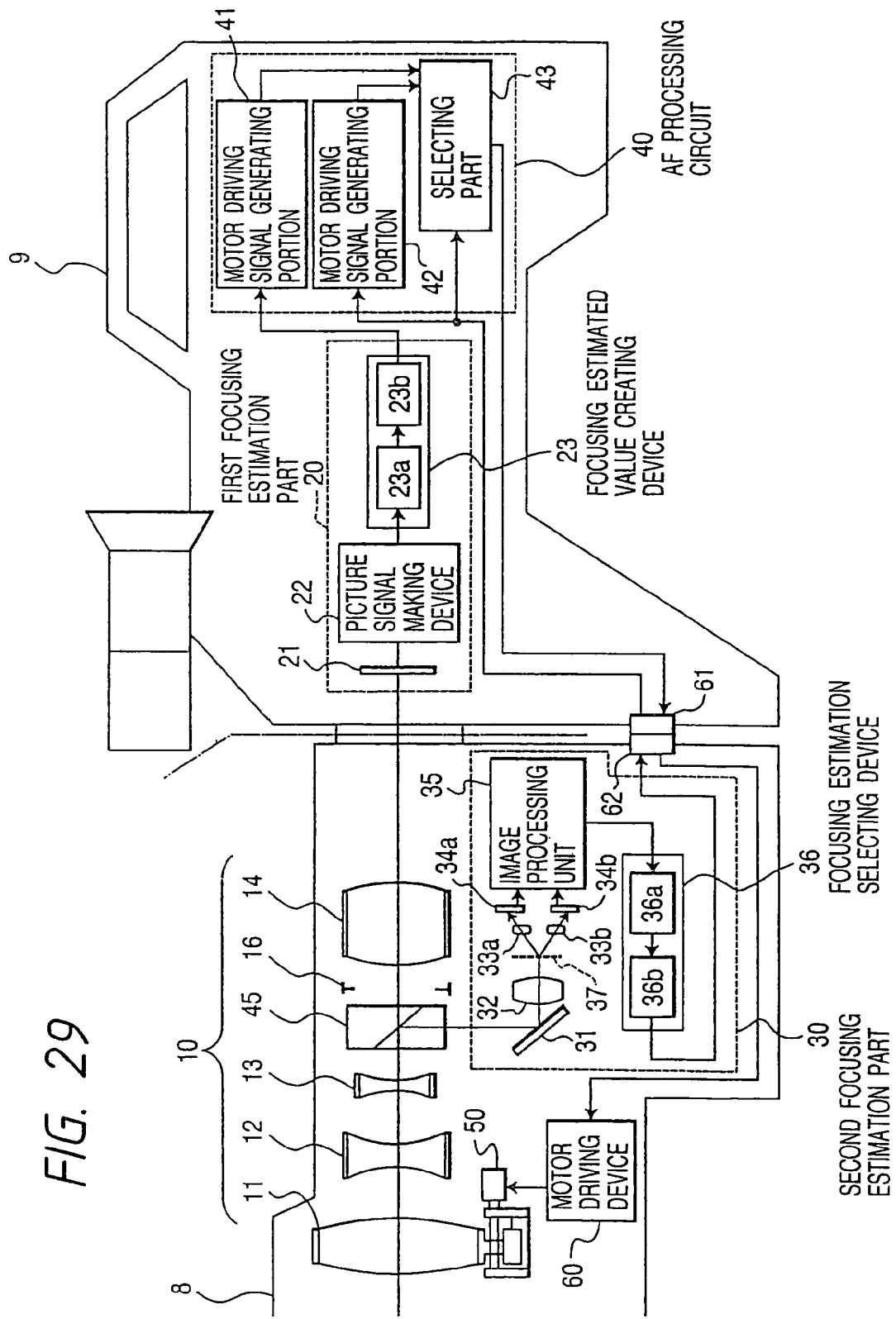
FIG. 29 is a schematic block diagram illustrating a TV camera in a sixth embodiment of the present invention.
Figure 30:
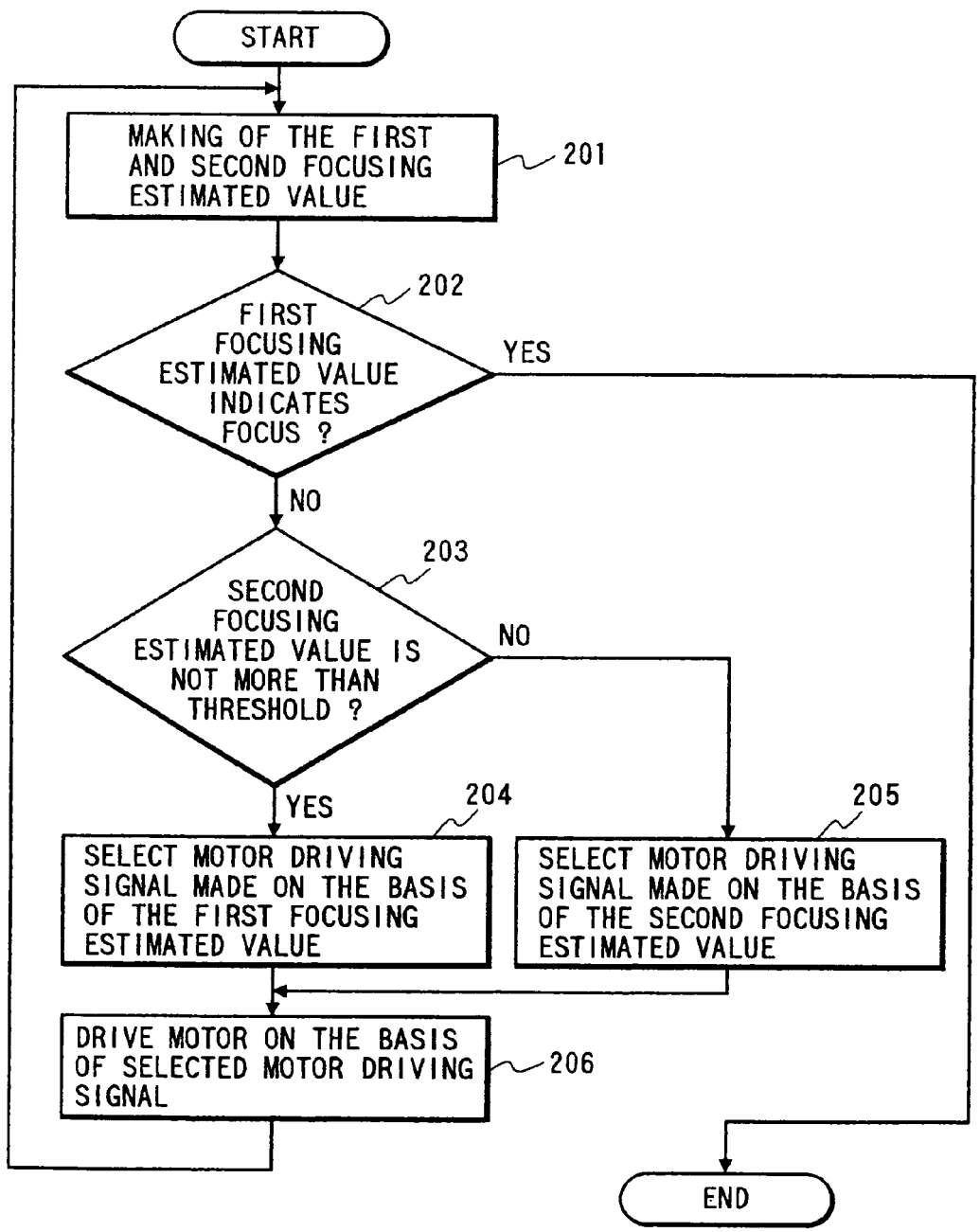
FIG. 30 is an explanatory flowchart showing how the TV camera shown in FIG. 29 performs an autofocus operation.

FIG. 29 is a schematic block diagram showing a TV camera in the sixth embodiment of the present invention. FIG. 30 is an explanatory flowchart showing an autofocus operation of the TV camera illustrated in FIG. 29.

The TV camera in the sixth embodiment comprises, as shown in FIG. 29, a camera body 9 and a lens barrel 8 attached to the camera body 9. The lens barrel 8 is so constructed as to be attachable to the camera body 9, and the user is able to replace the lens barrel 8 to be attached to the camera body according to the application.

The camera body 9 includes a first focusing estimating part 20, an AF processing circuit 40, and a connector 61. Further, the lens barrel 8 includes a photographing optical system 10, a second focusing estimating part 30, a motor 50, a motor driving circuit 60, and a connector 62. Note that the connectors 61, 62 are, when the lens barrel 8 is attached to the camera body 9, so constructed as to be electrically connected to each other.

The photographing optical system 10 of the lens barrel 8 is constructed of four lens units such as a focus adjusting lens 11, a variable magnification lens 12, a correcting lens 13 and an image forming lens 14. This construction is typical of the lens barrel for the TV camera. In the photographing optical system 10 used in the sixth embodiment, a beam splitting element (e.g., a beam splitter) 45 for splitting light beams and a stop 16 are interposed in between the correcting lens 13 and the image forming lens 14. Note that the optical element 45 is disposed anterior to the stop 16 so that the light beams can be transmitted to the second focusing estimating part 30 irrespective of an aperture quantity of an aperture stop of the photographing optical system 10 in the sixth embodiment.

The first focusing estimating part 20 estimates focusing by a so-called crest climbing type autofocus system. The first focusing estimating part 20 includes, the imaging element 21 for picking up an image formed by the image forming lens 14 of the photographing optical system 10 and converting it into an electric signal, and the picture signal making device 22 for generating a picture signal corresponding to the electric signal transmitted from the imaging element 21. The first focusing estimating part 20 also includes the focusing estimated value creating device 23 for creating an item of focusing data (termed also a first focusing estimated value) for focusing the image on the imaging element 21 on the basis of the picture signal given from the picture signal making device 22. The focusing estimated value creating device 23 has a level detecting portion 23*a* for detecting a level of a proper frequency component from the picture signal generated by the picture signal making device 22, and an estimated value creating portion 23*b* for creating the first focusing estimated value by examining the level detected by the level detecting portion 23*a*.

Next, the first focusing estimated value created by the focusing estimated value creating device 23 will be explained. As described in the prior art, the picture signal is, it can be assumed, formed by synthesizing sine waves of a plurality of frequencies. Then, it is empirically known that a level of high frequency component of the picture signal, as illustrated in FIG. 2, rises more steeply according as a degree of sharpness of the image formed on the imaging element 21 increases, i.e., the focus adjusting lens 11 moves closer to a focusing point A, and this level reaches a peak when the image on the imaging element 21 is focused on. Subsequently, the focusing estimated value creating device 23 selects a proper high frequency component in consideration of an S/N ratio of the picture signal as well as of an imaging performance of the photographing optical system 10, out of the picture signal obtained by the picture signal making device 22. Then, the focusing estimated value creating device 23 creates a focusing estimated value by monitoring a level of this frequency component at a predetermined sampling interval. For example, when the level of the selected frequency component rises, it is estimated that the focus adjusting lens 11 is moving in such a direction as to approach a focusing point. Further, when the level of the selected frequency component lowers, it is estimated that the focus adjusting lens 11 is moving in such a direction as to get away from the focusing point. Then, when the level of the selected frequency component exists within a predetermined range (shown by, e.g., $\Delta V$ in FIG. 2) from the peak value, it is estimated that the image on the imaging element 21 is focused on.

The second focusing estimating part 30 estimates focusing by using an autofocus system known as the image deviation method. The second focusing estimating part 30 comprises the mirror 31 for reflecting the light beam split by the beam splitting element 45, toward a predetermined direction, and the image forming lens 32 for forming light beams incident via the mirror 31 into a conjugate image. The second focusing estimating part 30 further comprises the image re-forming lenses 33*a*, 33*b* for forming some of the light beams image formed by the image forming lens 32, again into images, the line sensors 34*a*, 34*b* for respectively picking up the images formed by the image re-forming lenses 33*a*, 33*b* and converting them into electric signals, the image processing device 35, and the focusing estimated value creating device 36.

The image forming lens 32 is disposed so that the light beams incident via the mirror 31 are image-formed on the predetermined focal surface 37 when the image on the imaging element 21 is focused on. The image re-forming lenses 33*a*, 33*b* are disposed in positions substantially symmetric with respect to the optical axis of the image forming lens 32. The line sensors 34*a*, 34*b* are disposed in the positions substantially symmetric with respect to the optical axis of the image forming lens 32 and on a predetermined focal surface of the image re-forming lenses 33*a*, 33*b* corresponding to each other. The image processing device 35 executes the image processing based on the electric signals transmitted respectively from the line sensors 34*a*, 34*b*. The focusing estimated value creating device 36 creates an item of data (also called a second focusing estimated value) for focusing the image formed on the imaging element 21 on the basis of the signal transmitted from the image processing device 35. The focusing estimated value creating device 36 includes a positional deviation detecting portion 36*a* for detecting an imaging positional deviation (a deviating direction and a deviation quantity) between the image on the imaging element 34*a* and the image on the imaging element 34*b* on the basis of the signal transmitted from the image processing device 35, and an estimated value creating portion 36*b* for creating a second focusing estimated value based on the imaging positional deviation detected by the positional deviation detecting portion 36*a*.

Figure 31:
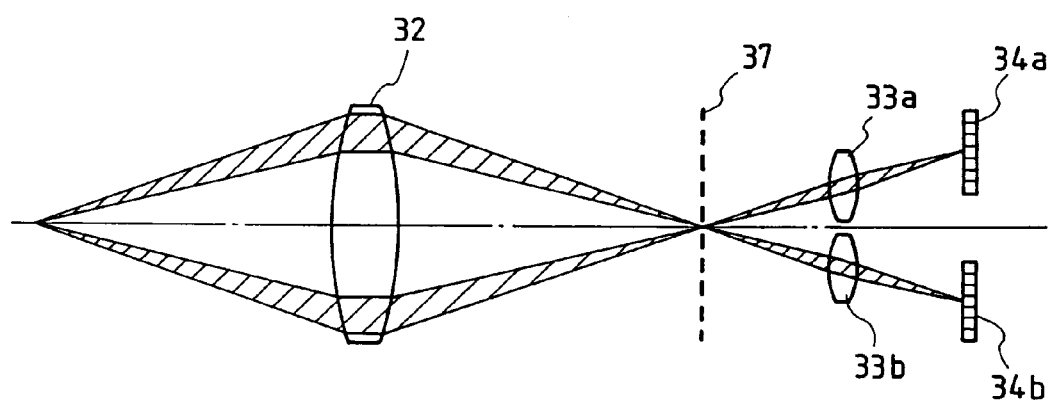
FIG. 31 is an explanatory diagram of a principle of an image deviation type autofocus system, showing the light path when in a focused state.
Figure 33:
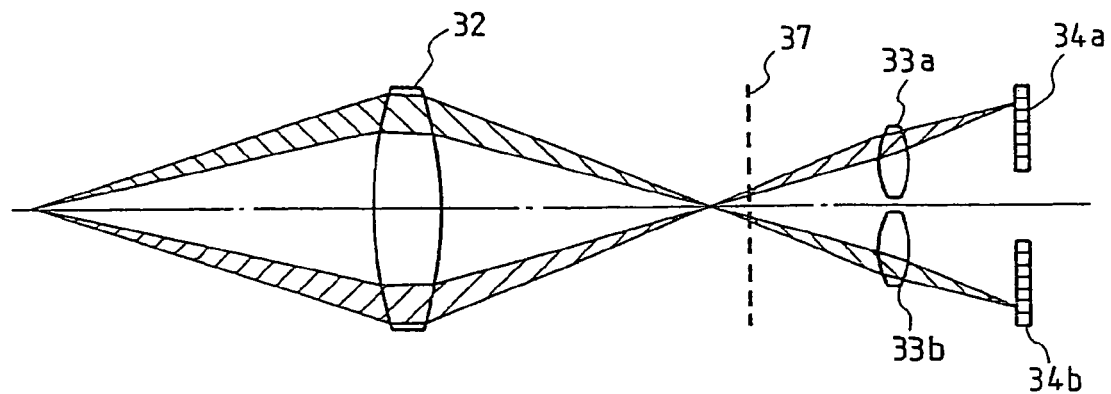
FIG. 33 is an explanatory diagram of the principle of the image deviation type autofocus system, showing the light path when in a defocused state.
Figure 34:
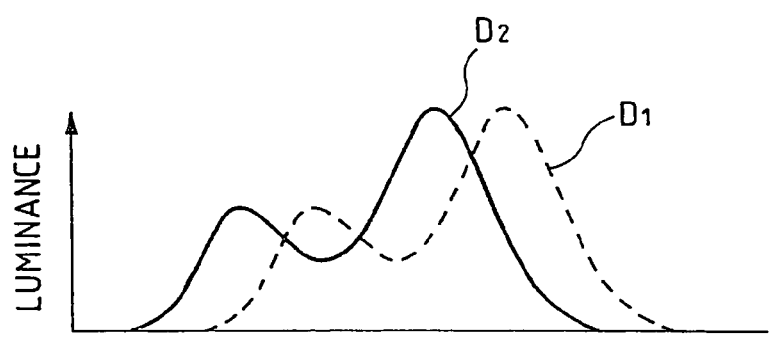
FIG. 34 is an explanatory diagram illustrating the positions of the images picked up by the two line sensors in FIG. 33.
Figure 35:
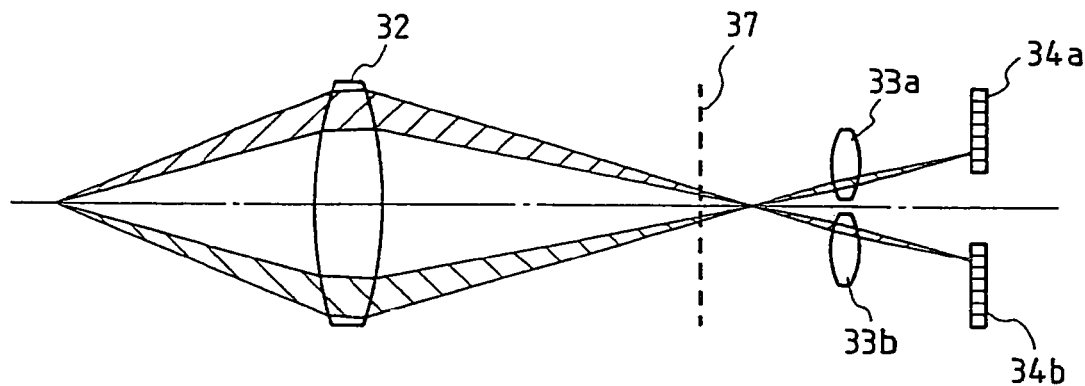
FIG. 35 is an explanatory diagram of the principle of the image deviation type autofocus system, showing the light path when in a defocused state.
Figure 36:
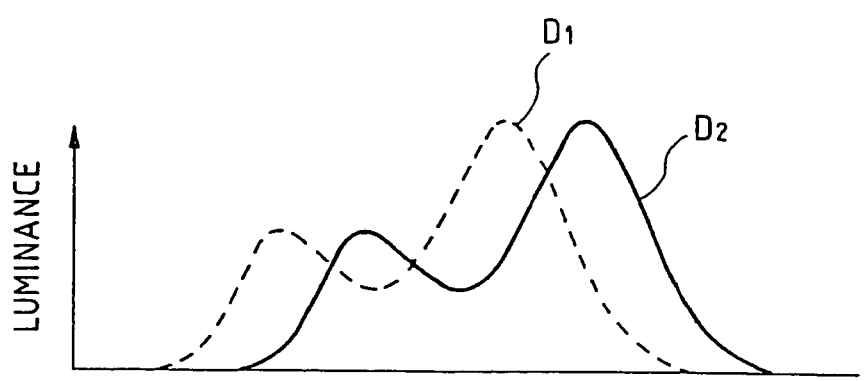
FIG. 36 is an explanatory diagram showing the positions of the images picked up by the two line sensors in FIG. 35.

Herein, the second focusing estimated value created by the focusing estimated value creating device 36 will be explained. FIGS. 31, 33 and 35 are partially enlarged diagrams of the second focusing estimating part 30, showing the principle of the image deviation type autofocus system. Herein, FIG. 31 illustrates a light path when in a focused state. FIGS. 33 and 35 illustrate optical paths when in a defocused state.

Figure 32:
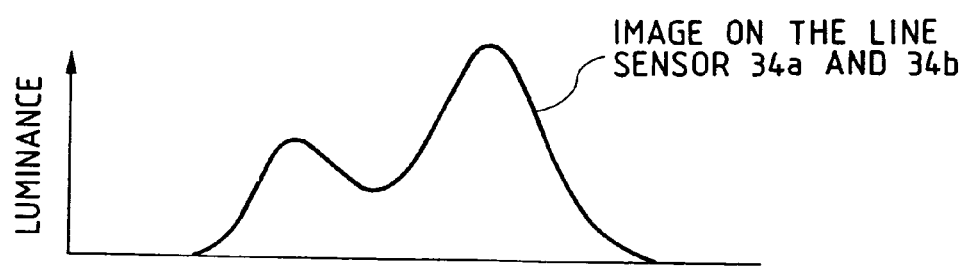
FIG. 32 is an explanatory diagram showing positions of images picked up by the two line sensors in FIG. 31.

As illustrated in FIG. 31, the light beams passing through the image forming lens 32 are focused upon the predetermined focal surface 37, some of the light beams are again image formed on the line sensors 34*a*, 34*b* by the image re-forming lenses 33*a*, 33*b*. Herein, when focused on the predetermined focal surface 37, the images picked up by the two line sensors 34*a*, 34*b* are formed in substantially coincident positions on the line sensors as shown in FIG. 32. On the other hand, as shown in FIG. 33, when the light beams passing through the image forming lens 32 are focused on anterior to the predetermined focal surface 37 (which is a so-called rear focus state), there must be a deviation between images $D_1$, $D_2$ picked up by the two line sensors 34*a*, 34*b*. Also, as illustrated in FIG. 35, when the light beams passing through the image forming lens 32 are focused on posterior to the predetermined focal surface 37 (which is a so-called a front focus state), there must be a deviation between in a direction opposite to the one in the rear focus state between the images $D_1$, $D_2$ picked up by the two line sensors 34*a*, 34*b*. Then, the focusing estimated value creating device 36 detects a deviation quantity and a deviating direction between the images $D_1$, $D_2$ picked up by the line sensors 34*a*, 34*b*, and, based on the data thereof, creates a moving direction and a moving quantity (a second focusing estimated value) of the focus adjusting lens 11, which are needed for focusing the image on the predetermined focal surface 37, i.e., the image on the imaging element 21. Note that the second focusing estimated value is created at the interval of a predetermined time in consideration of a processing speed, etc. of the image processing device 35.

Thus, in the image deviation type autofocus system, the focusing is effected based on the deviating direction and the deviation quantity between the positions of the images picked up by the pair of line sensors. This is the reason why it is called the image deviation method. According to the image deviation type autofocus system, the required-for-focusing moving direction and moving quantity of the focus adjusting lens are directed calculated based on the deviating direction and the deviation quantity between the positions of the images picked up by the pair of line sensors, and therefore the focusing can be quickly carried out. For this reason, the apparatus is employed as an autofocus apparatus mainly for a still camera.

The AF processing circuit 40 of the camera body 9 has motor driving signal generating portions 41, 42, and a selecting portion 43. The motor driving signal generating portion 41 refers to the first focusing estimated value created by the first focusing estimating part 20, and thus generates a drive signal of the motor 50. For instance, if the first focusing estimated value represents such an estimation that the focus adjusting lens 11 is moving in such a direction as to approach the focusing point, the drive signal is generated to make a rotating direction of the motor 50 remain unchanged. Further, if the first focusing estimated value represents such an estimation that the focus adjusting lens 11 is moving in such a direction as get away from the focusing point, the drive signal is generated to reverse the rotating direction of the motor 50. The motor driving signal generating portion 42 refers to the second focusing estimated value created by the second focusing estimating part 30 and transmitted via the connectors 61, 62, and thus generates the drive signal to move the focus adjusting lens 11 in the moving direction with the moving quantity, which are indicated by the estimated value concerned. The selecting portion 43 selects at least one of the drive signal generated by the motor driving signal generating portion 41 and the drive signal generated by the motor driving signal generating portion 42. In the sixth embodiment, referring to the second focusing estimated value, if the required-for-focusing moving quantity of the focus adjusting lens 11 is larger than a threshold value, the drive signal generated by the motor driving signal generating portion 42, is selected. Whereas if smaller than the threshold value, the drive signal generated by the motor driving signal generating portion 41, is selected. Note that this threshold value may be arbitrarily set by the photographer or the like with inputting from outside or by some other methods. The thus selected drive signals are transmitted via the connectors 61, 62 to the motor driving circuit 60.

The motor driving circuit 60 of the lens barrel 8 drives the motor 50 based on the drive signal selected, by the selecting portion 43. The focus adjusting lens 11 is thereby moved forward and backward in the optical-axis direction of the photographing optical system 10.

Note that the picture signal making device 22, the focusing estimated value creating device 23 and the AF processing circuit 40 of the camera body 9 are integrally constructed of, e.g., the CPU (Central Processing Unit), etc. Similarly, the image processing device 35 and the focusing estimated value creating device 36 of the lens barrel 8 are also integrally constructed of the CPU (Central Processing Unit), etc.

Next, the autofocus operation of the TV camera in the sixth embodiment will be explained with reference to FIG. 30.

At the first onset, upon an incidence of the light beams emerging from the object on the photographing optical system 10, the first focusing estimating part 20 creates the first focusing estimated value based on the light beams obtained through the image forming lens 14 in the photographing optical system 10. Further, the second focusing estimating part 30 creates the second focusing estimated value based on the light beam split by the beam splitting element 45 in the photographing optical system 10 (step 201).

Next, the selecting portion 43 of the AF processing circuit 40 judges whether or not the first focusing estimated value gives an indication of being focused (step 202). If the first focusing estimated value indicates a purport of being focused, a flow of processing shown in FIG. 30 comes to an end. Whereas if not, the processing proceeds to step 203.

In step 203, the selecting portion 43 of the AF processing circuit 40 refers to the second focusing estimated value, and judges whether or not the required-for-focusing moving quantity of the focus adjusting lens 11 is under the threshold value. If the required-for-focusing moving quantity of the focus adjusting lens 11 is under the threshold value, the drive signal generated by the motor drive signal generating portion 41 is selected based on the first focusing estimated value (step 204). While on the other hand, if over the threshold value, the drive signal generated by the motor driving signal generating portion 42 is selected based on the second focusing estimated value (step 205).

Next, the motor driving device 60 drives the motor on the basis of the drive signal selected by the selecting portion 43 (step 206).

The processing flow shown in FIG. 30 is repeatedly executed till the first focusing estimated value comes to have a content of being focused. The image on the imaging element 21 is thereby focused on.

In the sixth embodiment, the first focusing estimated value is created by the first focusing estimating part 20 involving the use of the crest climbing type autofocus system capable of focalizing with a high precision. Then, the second focusing estimated value is created by the second focusing estimating part 30 involving the use of the image deviation type autofocus system capable of quick focalizing. Further, the AF processing circuit 40, if the second focusing estimated value created by the second focusing estimating part 30 is over the threshold value, selects the second focusing estimated value, and, whereas if under the threshold value, selects the first focusing estimated value. Then, the drive signal for the motor 50 is generated based on the thus selected focusing estimated value. With this processing, to begin with, the image on the imaging element 21 is roughly focused on by making use of the second focusing estimated value. Thereafter, the image on the imaging element 21 is finely focused on by use of the first focusing estimated value. Accordingly, in the sixth embodiment, it is feasible to focus the image on the imaging element 21 quickly with the high accuracy. Further, the high precision is not demanded of the second focusing estimating part 30 employing the image deviation method, and consequently an increase in costs can be restrained.

Moreover, in the sixth embodiment, the first focusing estimating part 20 is provided on the side of the camera body 1, while the second focusing estimating part 20 is provided on the side of the lens barrel. Herein, the first focusing estimating part 20 creates the focusing estimated value for focusing the image on the imaging element 21 on the basis of the image on the imaging element 21, and can be therefore used in common irrespective of the structure of the photographing optical system 10. On the other hand, the second focusing estimating part 30 creates the focusing estimated value for focusing the image on the imaging element 21 by use of the image to be formed in a different position from the surface on the imaging element 21, and might therefore need to change the structure (especially, a layout of the image forming lens 32 and the image re-forming lenses 33a, 33b) if the structure of the photographing optical system 10 varies. As discussed above, in accordance with the sixth embodiment, the camera body 1 is provided with the first focusing estimating part 20 capable of being used in common, regardless of the structure of the photographing optical system 10, i.e., even when replacing the lens barrel. Then, the lens barrel 2 is provided with the second focusing estimating part 30 peculiar to the photographing optical system 10, thereby making it possible to prevent the rise in costs for the lens barrel as well as to downsize the lens barrel.

Moreover, in the sixth embodiment, the focal length of the optical system for forming the images for detecting the image deviation on the line sensors 34a, 34b, is a synthetic focal length of the focus adjusting lens 11, the variable magnification lens 12, the correcting lens 13 and the image forming lens 32. On the other hand, the focal length of the optical system for forming the image for the picture signal on the imaging element 21, is a synthetic focal length of the focus adjusting lens 11, the variable magnification lens 12, the correcting lens 13 and the image forming lens 14. Accordingly, the focal lengths of the optical system for forming the images for detecting the image deviation and of the optical system for forming the image for the picture signal, are varied by changing the configurations of the image forming lenses 14, 32. Videlicet, the sizes of the images formed by the respective optical systems can be varied. For example, the image forming lens 32 is constructed to enlarge the image for detecting the image deviation by elongating the focal length of the optical system for forming the images for detecting the image deviation, thereby obtaining a finer pixel pitch of the line sensors 34a, 34b relative to the above image. Hence, it is feasible to focus on even a minute object. Further, for instance, the image forming lens 32 is constructed to diminish the image for detecting the image deviation by shortening the focal length of the optical system for forming the image for detecting the image deviation, whereby a size of this image decreases relatively to the line sensors 34a, 34b. Therefore, a detectable image deviation quantity increases. Such being the case, even when the focus adjusting lens is positioned far from the focusing point (a so-called largely defocused state), the focusing point can be quickly detected. Further, the lens barrel can be downsized.

Note that the selecting portion 43 of the AF processing circuit 40 is permitted to judge whether or not the lens barrel 8 should include the second focusing estimating part. This judgement may be made based on whether or not the signal indicating the second focusing estimated value is transmitted from the lens barrel via the connectors 61, 62. Also, the connector 62 of the lens barrel 8 may be provided with a contact point for distinguishing an existence or non-existence of the second focusing estimating part, and the selecting portion 43 may make a judgement about this contact point. If the lens barrel 2 does not include the second focusing estimating part, the drive signal generated by the driving signal generating portion 41 is selected based on the first focusing estimated value, whereby the lens barrel corresponding to the hitherto-used crest climbing type autofocus system can be also employed. Moreover, if the lens barrel 8 has the second focusing estimating part, the focusing data created by the second focusing estimating part incorporated into the lens barrel 8 can be effectively availed.

Next, a seventh embodiment of the present invention will be explained with reference to the drawings.

Figure 37:
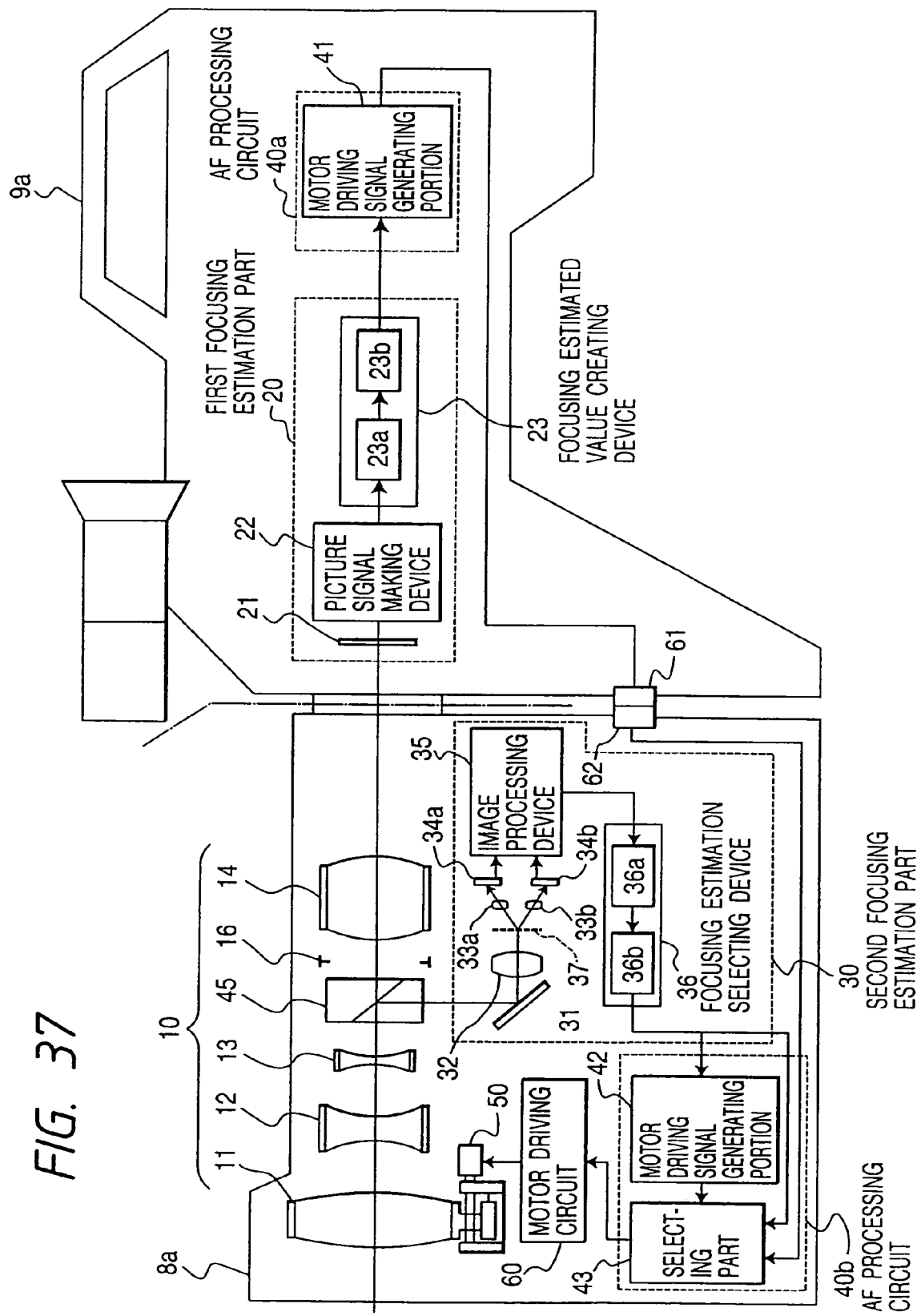
FIG. 37 is a schematic block diagram illustrating the TV camera in a seventh embodiment of the present invention.

FIG. 37 is a schematic block diagram of the TV camera in the seventh embodiment of the present invention. Note that the elements having the same functions as those in the sixth embodiment shown in FIG. 29 are marked with the like or corresponding numerals in the seventh embodiment of the present invention, and the detailed explanations thereof are omitted.

A different point of the TV camera in the seventh embodiment from that in the sixth embodiment shown in FIG. 29 is that the camera body 1a is, as illustrated in FIG. 37, provided with an AF processing circuit 40a instead of the AF processing circuit 40, and that the lens barrel 8 is provided with an AF processing circuit 40b. The AF processing circuit 40a includes the motor driving signal generating portion 41. The AF processing circuit 40b includes the motor driving signal generating portion 42 and the selecting portion 43.

Figure 9:
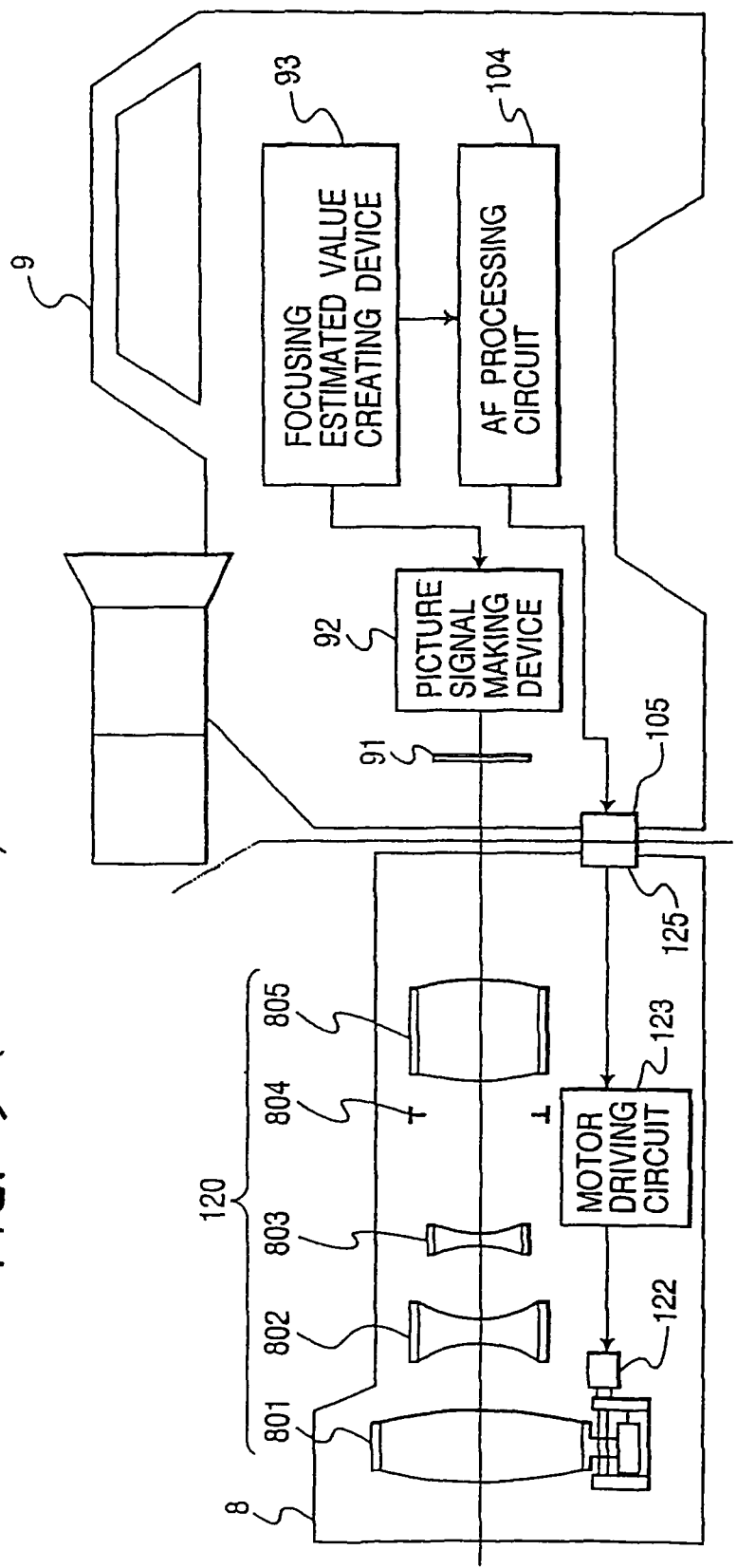
FIG. 9 is a schematic block diagram of a video camera to which a prior art crest climbing type autofocus apparatus is applied.

In the seventh embodiment, the lens barrel 8 incorporates the AF processing circuit 40b consisting of the motor driving signal generating portion 42 for generating the motor driving signal on the basis of the second focusing estimated value, and the selecting portion 43 for selecting at least one of the drive signal generated by the motor driving signal generating portion 41 and the drive signal generated by the motor driving signal generating portion 42. With this construction, there can be used the camera body 9a corresponding to the hitherto-employed crest climbing type autofocus system as illustrated in FIG. 9. That is, in accordance with the seventh embodiment, even when using the camera body corresponding to the hitherto-used crest climbing type autofocus system, the image on the imaging element 21 can be focused on quickly with the high precision. Other effects are the same as those in the first embodiment.

Note that the selecting portion 43 of the AF processing circuit 40b is permitted to judge whether or not the camera body 9a includes the first focusing estimating part. This judgement may be made based on whether or not the motor driving signal is transmitted from the camera body 9a via the connectors 61, 62. Further, the connector 61 of the camera body may be provided with a contact point for distinguishing an existence or non-existence of the first focusing estimating part, and the selecting portion 43 may make a judgement about this contact point. If the camera body 9a does not have the first focusing estimating part, the drive signal generated by the driving signal generating portion 42 is selected based on the second focusing estimated value, whereby the autofocus function can be actualized even when the camera body not corresponding to the autofocus is attached to the lens barrel 8a. Moreover, in the case of the lens barrel 8a being fitted with the camera body corresponding to the autofocus, the autofocus function of the camera body can be effectively availed.

Next, an eighth embodiment of the present invention will be described with reference to the drawings.

Figure 38:
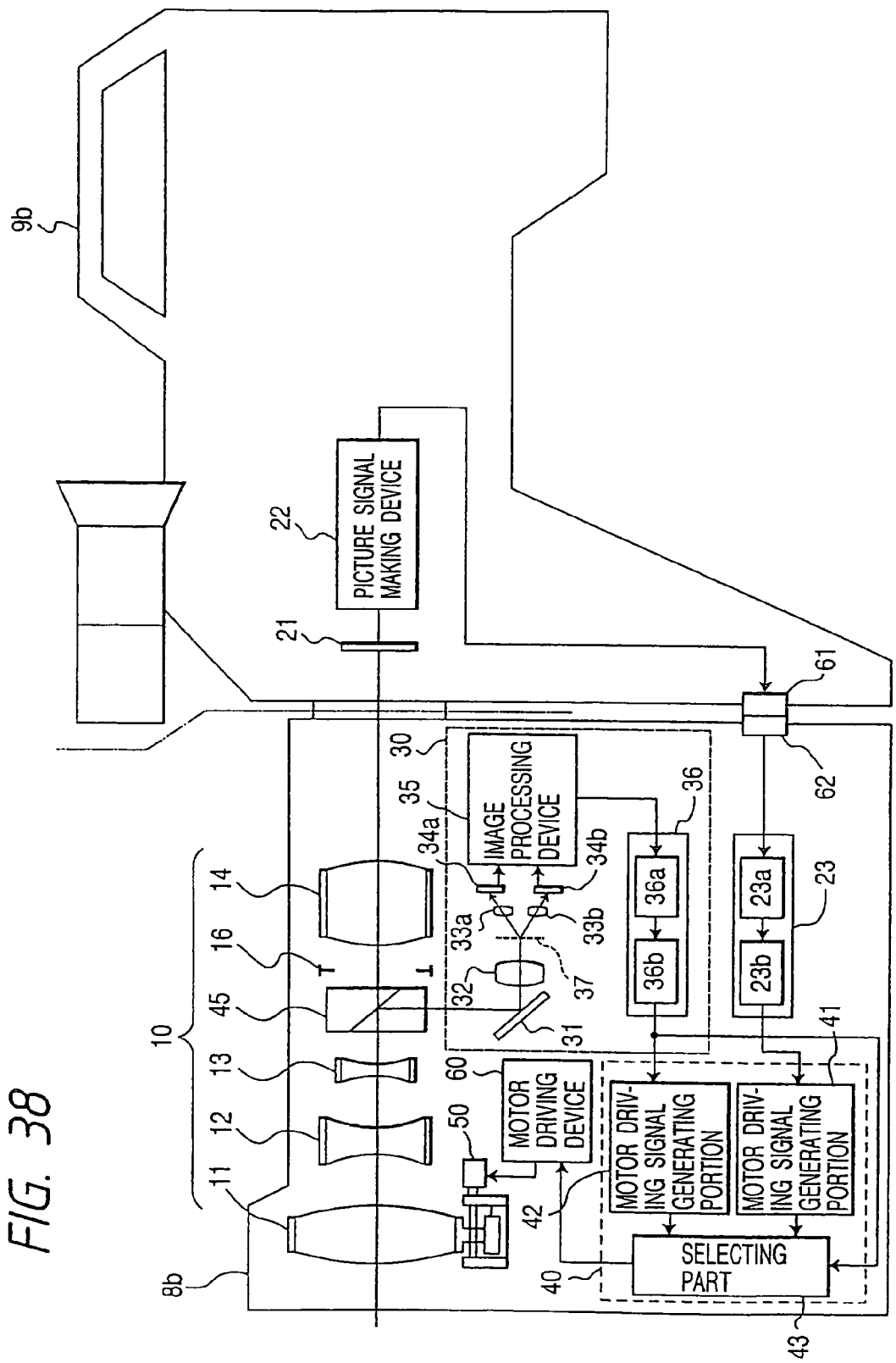
FIG. 38 is a schematic block diagram illustrating the TV camera in an eighth embodiment of the present invention.

FIG. 38 is a schematic block diagram of the TV camera in the eighth embodiment of the present invention. Note that the elements having the same functions as those in the sixth embodiment shown in FIG. 29 are marked with the like or corresponding numerals in the eighth embodiment, and the detailed explanations thereof are omitted.

A different point of the TV camera in the eighth embodiment from that in the sixth embodiment shown in FIG. 29 is that the lens barrel 8b is, as illustrated in FIG. 38, provided with the AF processing circuit 40 and the focusing estimated value creating device 23 of the first focusing estimating part.

In the eighth embodiment, the lens barrel 8b incorporates the focusing estimated value creating device 23, the second focusing estimating part 30 and the Af processing circuit 40. With this construction, even when the camera body not corresponding to the autofocus is attached to the lens barrel 8b, the image on the imaging element 21 can be focused on quickly with the high accuracy by using the two sorts of image deviation type and crest climbing type autofocus systems.

Note that the picture signal making device 22 may be disposed on the side of the lens barrel 8b in the eighth embodiment.

Next, a ninth embodiment of the present invention will be described with reference to the drawings.

Figure 39:
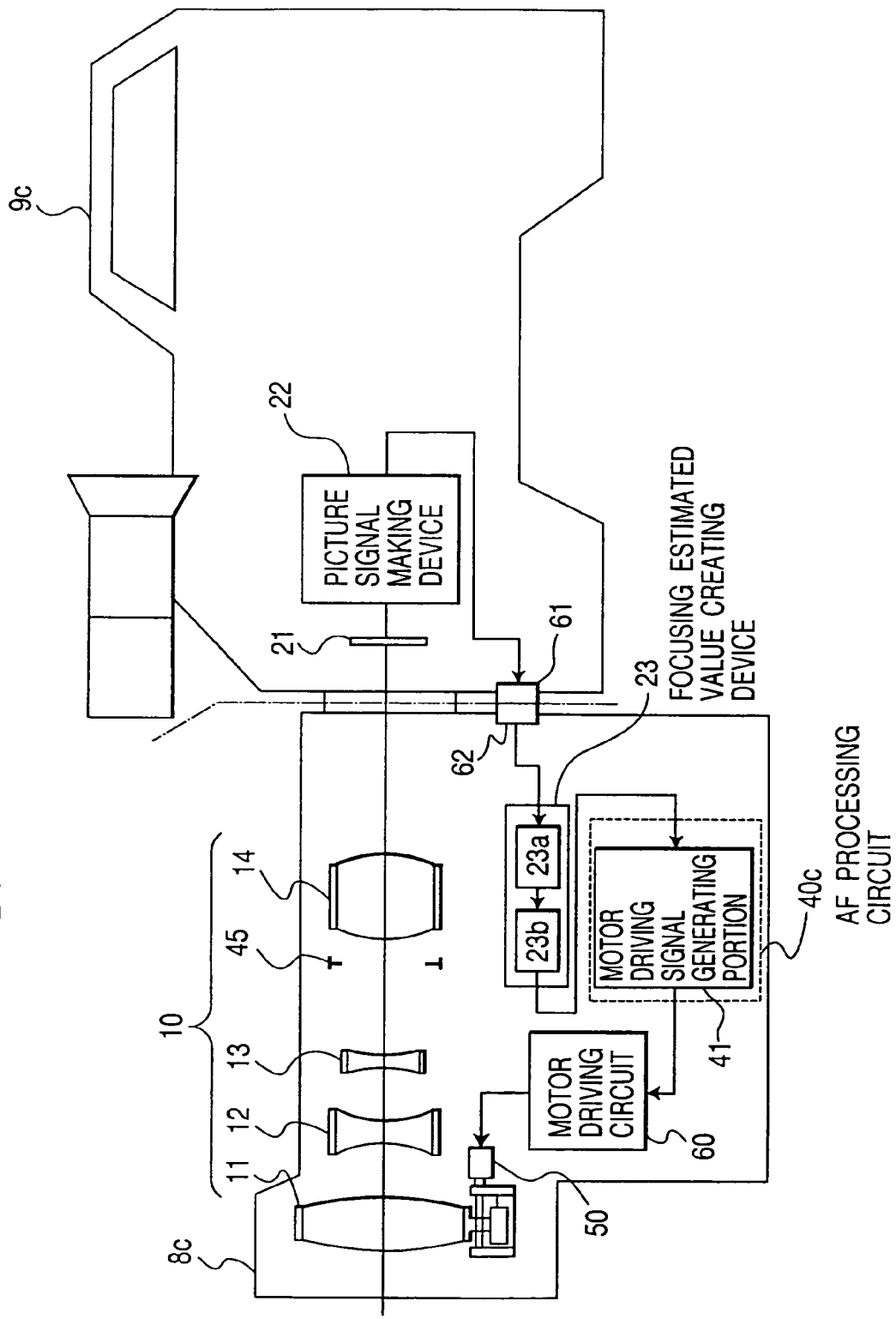
FIG. 39 is a schematic block diagram illustrating the TV camera in a ninth embodiment of the present invention.

FIG. 39 is a schematic block diagram of the TV camera in the ninth embodiment of the present invention. Note that the elements having the same functions as those in the sixth embodiment shown in FIG. 29 are marked with the like or corresponding numerals in the ninth embodiment, and the detailed explanations thereof are omitted.

The TV camera in the ninth embodiment includes, as illustrated in FIG. 39, a camera body 9c and a lens barrel 8c attached to the camera body 9c. The camera body 9c has the imaging element 21, the picture signal making device 22 and the connector 61. Further, the lens barrel 8c has the photographing optical system 10, the focusing estimated value creating device 23, the processing circuit 40c, the motor 50, the motor driving circuit 60 and the connector 62. The AF processing circuit 40c has the drive signal generating portion 41 for generating the drive signal for the motor 50 by referring to the focusing estimated value created by the focusing estimated value creating device 23.

In accordance with the ninth embodiment, the lens barrel 8c incorporates the crest climbing type autofocus function to create the focusing estimated value on the basis of the image on the imaging element 21 in the camera body 9c. With this construction, even when the camera body not corresponding to the autofocus is attached to the lens barrel, the image on the imaging element 21 can be focused on with the high precision by employing the crest climbing type autofocus system.

Next, a tenth embodiment of the present invention will be discussed with reference to the drawings.

Figure 40:
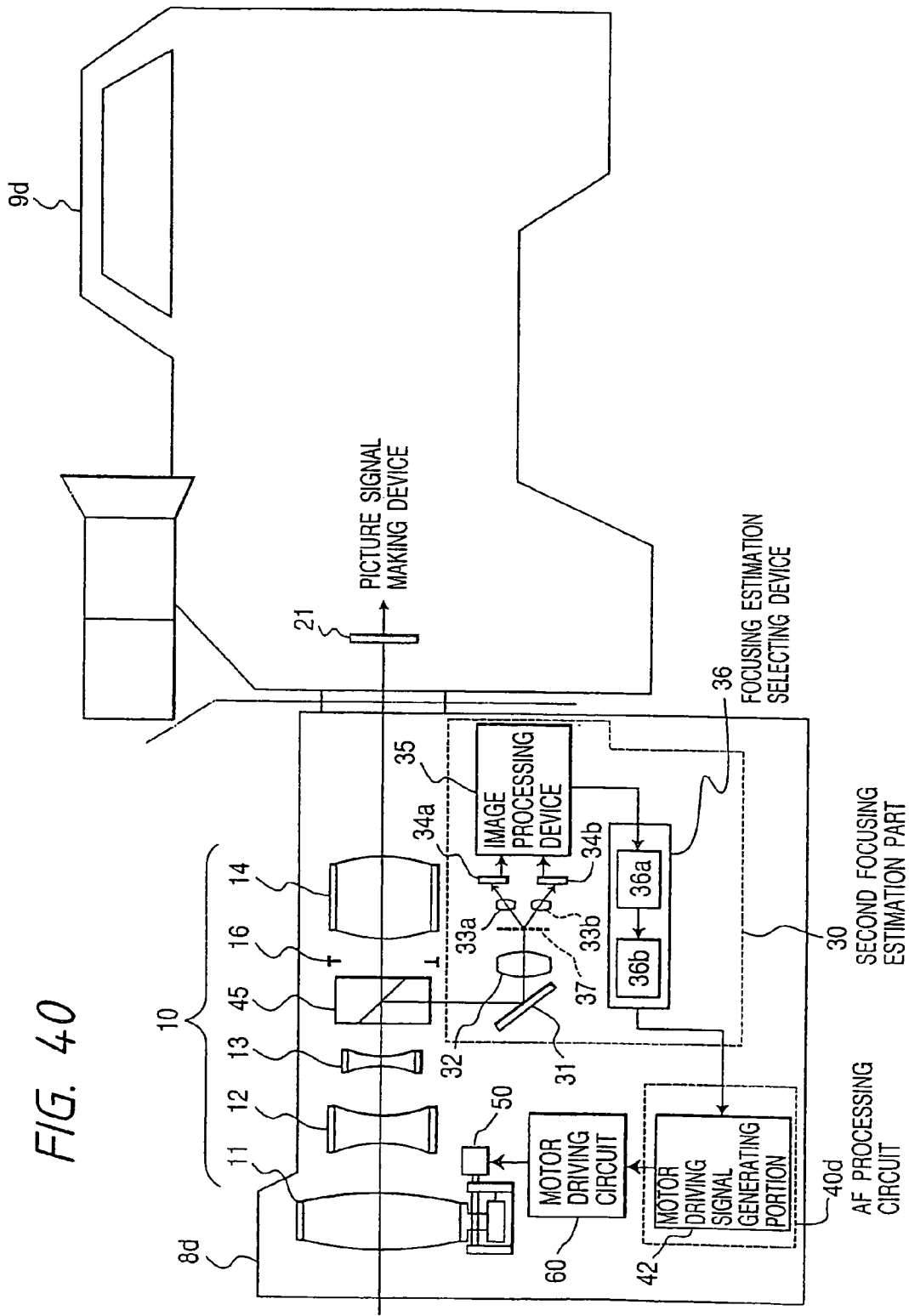
FIG. 40 is a schematic block diagram illustrating the TV camera in a tenth embodiment of the present invention.

FIG. 40 is a schematic diagram of the TV camera in the tenth embodiment of the present invention. Note that the elements having the same functions as those in the sixth embodiment shown in FIG. 29 are marked with the like or corresponding numerals in the tenth embodiment, and the detailed explanations thereof are omitted.

The TV camera in the tenth embodiment includes, as illustrated in FIG. 40, a camera body 9d and a lens barrel 8d attached to the camera body 9d. The camera body 9d has the imaging element 21. Further, the lens barrel 8d has the photographing optical system 10, the second focusing estimating part 30, an Af processing circuit 40d, the motor 50, and the motor driving circuit 60. The AF processing circuit 40d has the drive signal generating portion 42 for generating the drive signal for the motor 50 by referring to the focusing estimated value created by the second focusing estimating part 30.

In accordance with the tenth embodiment, the lens barrel 8d incorporates the image deviation type autofocus function to directly calculate the required-for-focusing moving direction and moving quantity of the focus adjusting lens 11. With this construction, even when the camera body not corresponding to the autofocus is attached to the lens barrel, the image on the imaging element 21 can be focused on quickly by employing the image deviation type autofocus system.

The present invention is not limited to the respective embodiment discussed above but may be modified in a variety of forms within the scope of the gist thereof. for instance, the focusing estimated value creating device 23 for creating the focusing estimated value (the first focusing estimated value) based on the crest climbing method has been explained so far by way of the one for creating the first focusing estimated value on the basis of the picture signal generated by the picture signal making device 22. The first focusing estimated value may be, however, created based on the electric signal outputted from the imaging element 21. Also, a predetermined process for creating the first focusing estimated value is executed upon the electric signal outputted from the imaging element 21, and the first focusing estimated value may be created based on the signal undergoing this process.

Further, the AF processing circuit 43 has been described so far by way of the one for selecting at least one of the drive signal generated by the motor driving signal generating portion 41 and the drive signal generated by the motor drive signal generating portion 42. The present invention is not, however, confined to this. The selecting portion may be constructed to select at least one of the first and second focusing estimated values. In this case, the motor driving signal generated based on the thus selected focusing estimated value may be transmitted to the motor driving circuit 60.

Further, the present invention may be applied to not only the TV camera but also other video cameras and electronic still cameras, etc.

An eleventh embodiment of the present invention will hereinafter be described with reference to the drawings.

Figure 41:
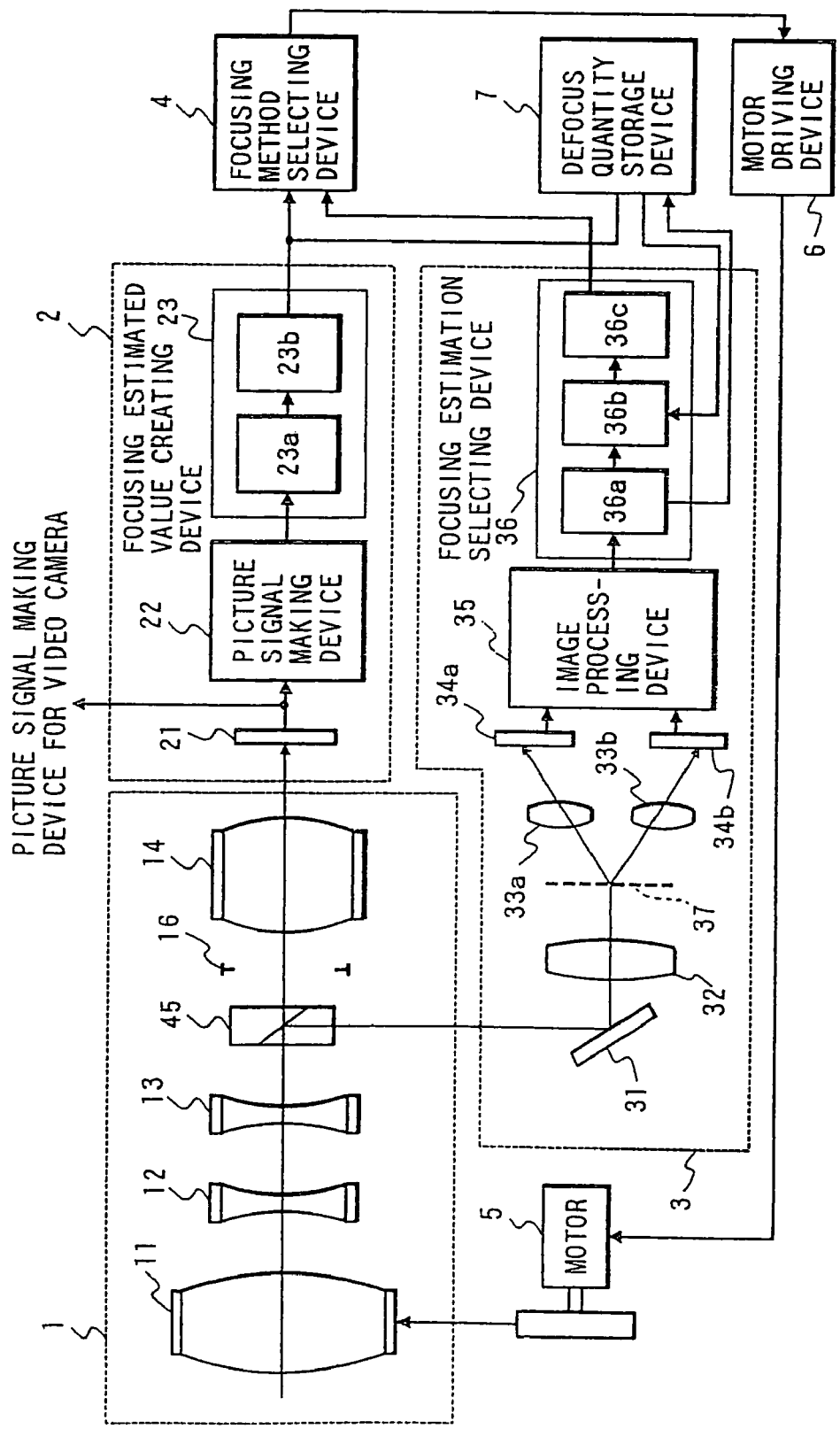
FIG. 41 is a schematic block diagram illustrating the TV camera in an eleventh embodiment of the present invention.
Figure 42:
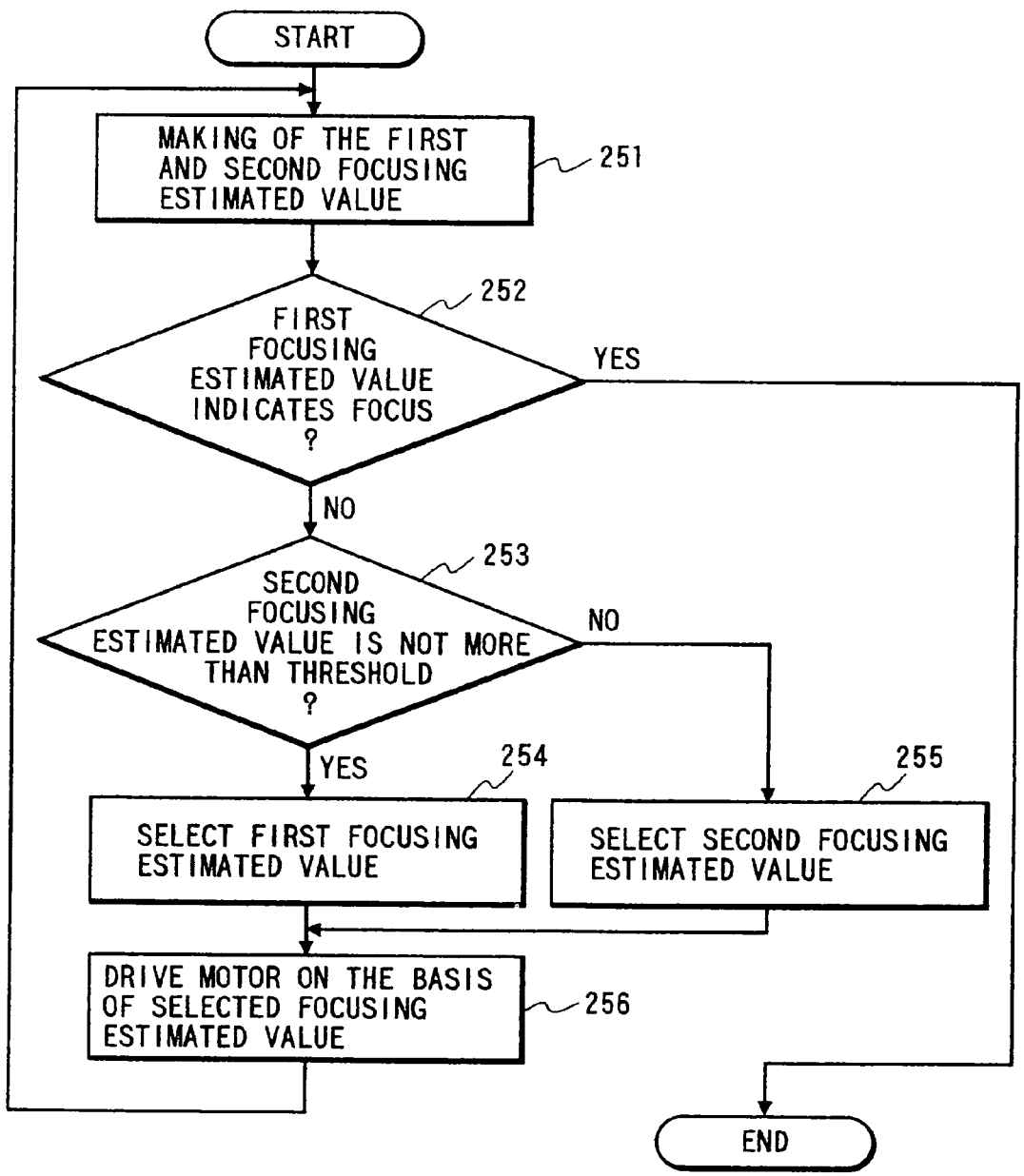
FIG. 42 is an explanatory flowchart showing the operation of the autofocus apparatus illustrated in FIG. 41.
Figure 43:
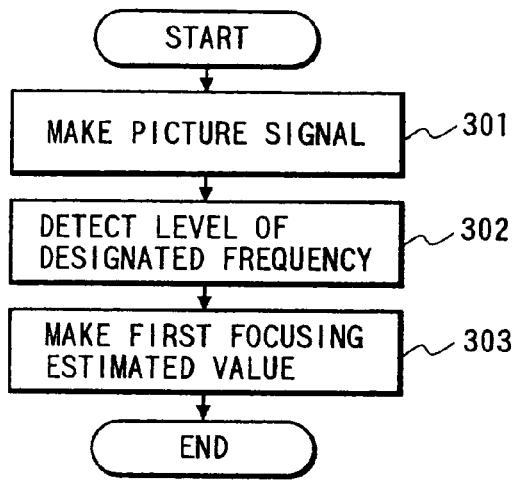
FIG. 43 is an explanatory flowchart showing an operation of the first focusing estimating portion illustrated in FIG. 41.
Figure 44:
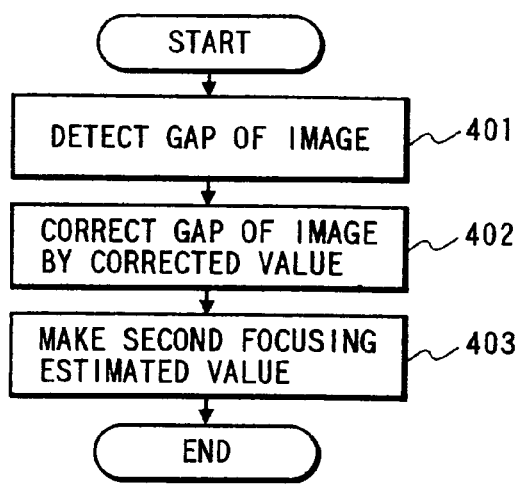
FIG. 44 is an explanatory flowchart showing an operation of the second focusing estimating portion illustrated in FIG. 41.
Figure 45:
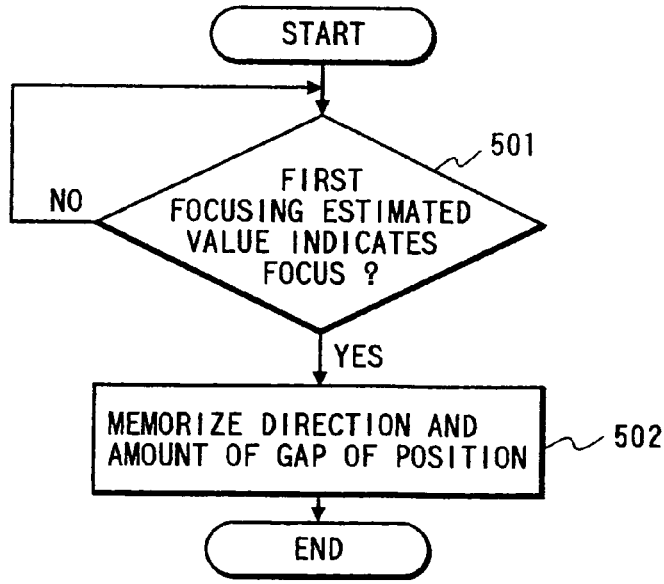
FIG. 45 is an explanatory flowchart showing an operation of a defocus storage device shown in FIG. 41.

FIG. 41 is a schematic block diagram showing the autofocus apparatus in the eleventh embodiment of the present invention. FIG. 42 is an explanatory flowchart showing an operation of the autofocus apparatus illustrated in FIG. 41. FIG. 43 is an explanatory flowchart showing an operation of the first focusing estimating part shown in FIG. 41. FIG. 44 is an explanatory flowchart showing an operation of the second focusing estimating part depicted in FIG. 41. FIG. 45 is an explanatory flowchart showing an operation of a defocus storage device shown in FIG. 41.

The autofocus apparatus in the eleventh embodiment includes, as illustrated in FIG. 41, the photographing optical system 1, the first focusing estimating part 2, the second focusing estimating part 3, the focusing method selecting device 4, the motor 5, the motor driving device 6, and a defocus storage device 7. Note that when the autofocus apparatus in the eleventh embodiment is applied to the video camera, etc., it is a general construction that the lens barrel incorporates the photographing optical system 1 and the motor 5, while the camera body incorporates other constructive elements. The present invention is not, however, limited to this construction.

The photographing optical system 1 is constructed of four lens units such as the focus adjusting lens 11, the variable magnification lens 12, the correcting lens 13 and the image forming lens 14. This construction is typical of the lens barrel for the TV camera. In the photographing optical system 1 used in the eleventh embodiment, the optical element (e.g., the beam splitter) 45 for splitting light beams and the stop 16 are interposed in between the correcting lens 13 and the image forming lens 14. Note that the optical element 45 is disposed anterior to the stop 16 so that the light beams can be transmitted to the second focusing estimating part 3 irrespective of an aperture quantity of an aperture stop of the photographing optical system 1 in the eleventh embodiment.

The first focusing estimating part 2 estimates the focusing by the so-called crest climbing method. The first focusing estimating part 2 includes the imaging element 21 for picking up an image formed by the image forming lens 14 of the photographing optical system 1 and converting it into an electric signal, and a picture signal making device 22 for generating a picture signal corresponding to the electric signal transmitted from the imaging element 21. The first focusing estimating part 2 also includes the focusing estimated value creating device 23 for creating the data (the first focusing estimated value) for focusing the image on the imaging element 21 on the basis of the picture signal given from the picture signal making device 22. The focusing estimated value creating device 23 has the level detecting portion 23a for detecting a level of a proper frequency component from the picture signal generated by the picture signal making device 22, and the estimated value creating portion 23b for creating the first focusing estimated value by examining the level detected by the level detecting portion 23a. Note that the electric signal outputted from the imaging element 21 is used for generating the picture signal of the video camera as illustrated in FIG. 41.

The second focusing estimating part 3 estimates the focusing by the so-called image deviation method. The second focusing estimating part 3 comprises the mirror 31 for reflecting the light beam split by the optical element 45, toward a predetermined direction, and the image forming lens 32 for forming the light beams incident via the mirror 31 into a conjugate image. The second focusing estimating part 3 further comprises the image re-forming lenses 33a, 33b for forming some of the light beams image formed by the image forming lens 32, again into images, the line sensors 34a, 34b for respectively picking up the images formed by the image re-forming lenses 33a, 33b and converting them into electric signals, the image processing device 35, and the focusing estimated value creating device 36.

The image re-forming lenses 33a, 33b are disposed in positions substantially symmetric with respect to the optical axis of the image forming lens 32. More specifically, the image reforming lenses 33a, 33b are so disposed as to individually re-form the images of the light beams passing through portions having different pupils in the optical system consisting of the focus adjusting lens 11, the variable magnification lens 12, the correcting lens 13 and the image forming lens 32, among the light beams for forming the image formed by the image forming lens 32. The line sensors 34a, 34b are disposed in the positions substantially symmetric with respect to the optical axis of the image forming lens 32 and on a predetermined focal surface of the image re-forming lenses 33a, 33b corresponding to each other. The image processing device 35 executes the image processing based on the electric signals transmitted respectively from the line sensors 34a, 34b. The focusing estimated value creating device 36 creates the data (hereinafter termed also the second focusing estimated value) for focusing the image on the imaging element 21 on the basis of the signal transmitted from the image processing device 35. The focusing estimated value creating device 36 includes the positional deviation detecting portion 36a for detecting an imaging positional deviation (a deviating direction and a deviation quantity) between the image on the imaging element 34a and the image on the imaging element 34b on the basis of the signal transmitted from the image processing device 35. The focusing estimated value creating device 36 also comprises a correcting portion 36b for correcting the imaging positional deviation detected by the positional deviation detecting portion 36a, with a correction value stored in a defocus quantity storage device 7 which will be mentioned alter on, and an estimated value creating portion 36c for creating the second focusing estimated value based on the imaging positional deviation corrected by the correcting portion 36b.

The defocus quantity storage device 7 stores, as a correction value, a defocus quantity between the image on the predetermined focal surface 37 and the image on the imaging element 21. Incidentally, if a non-volatile memory is used as a storage medium of the defocus storage device 7, the defocus quantity can be retained even in such a case that the power supply of the apparatus in the eleventh embodiment is, after being switched OFF, again switched ON. Hence, the image positional deviation detected by the positional deviation detecting portion 36a can be immediately corrected with the relevant defocus quantity.

The focusing method selecting device 4 selects at least one of the first focusing estimated value created by the first focusing estimating part 2 and the second focusing estimated value created by the second focusing estimating part 3. In accordance with the eleventh embodiment, referring first to the second focusing estimated value, if the defocus quantity or the required-for-focusing moving quantity of the focus adjusting lens 11 is larger than a threshold value, the second focusing estimated value is set to be selected. Whereas if smaller than the threshold value, the first focusing estimated value is set to be selected. Note that this threshold value may also be set arbitrarily by the photographer and so forth through inputting from outside.

The motor driving device 6 drives the motor 5 on the basis of the focusing estimated value selected by the focusing method selecting device 4. Based on a command given from the motor driving device 6, the motor 5 moves the focus adjusting lens 11 forward and backward in the optical-axis direction of the photographing optical system 1.

Incidentally, the focusing estimated value creating devices 23, 36, the focusing method selecting device 4 and the defocus quantity storage device 7 are integrally constructed of, e.g., the CPU (Central Processing Unit), etc.

Next, an operation of the autofocus apparatus as a whole in the eleventh embodiment will be described referring to FIG. 42.

To start with, upon an incidence of the light beams upon the photographing optical system 1 from the object, the first focusing estimating part 2 creates the first focusing estimated value on the basis of the light beams obtained via the image forming lens 14 in the photographing optical system 1. Further, the second focusing estimating part 3 creates the second focusing estimated value based on the light beams split by the optical element 45 in the photographing optical system 1 (step 251).

Next, the focusing method selecting device 4 judges whether or not the first focusing estimated value gives an indication of being focused (step 252). If the first focusing estimated value indicates a purport of being focused, a flow of processing shown in FIG. 42 comes to an end. Whereas if not, the processing proceeds to step 253.

In step 253, the focusing method selecting device 4 refers to the second focusing estimated value, and judges whether or not the defocus quantity or the required-for-focusing moving quantity of the focus adjusting lens 11 is under the threshold value. If the required-for-focusing moving quantity of the focus adjusting lens 11 is under the threshold value, the first focusing estimated value created by the first focusing estimating part 2 is selected (step 254). Whereas if above the threshold value, the second focusing estimated value selected by the second focusing estimating part 3 is selected (step 255).

Next, the motor driving device 6 drives the motor on the basis of the focusing estimated value selected by the focusing method selecting device 4 (step 256). When the second focusing estimated value is selected by the focusing method selecting device 4, the motor driving device 6 drives the motor 5 so that the focus adjusting lens 11 is moved in the moving direction by the moving quantity, which are indicated by the selected second focusing estimated value. Further, when the first focusing estimated value is selected by the focusing method selecting device 4, it is estimated that the focus adjusting lens 11 is moving in such a direction as to approach a focusing point. At this time, the motor 5 is driven to make the rotating direction thereof remain unchanged. Moreover, when it is estimated that the focus adjusting lens 11 is moving in such a direction as to get away from the focusing point, the motor 5 is driven to reverse the rotating direction thereof.

The processing flow shown in FIG. 42 is repeatedly executed till the first focusing estimated value comes to have a content of being focused. The image on the imaging element 21 is thereby focused on.

Subsequently, an operation of the first focusing estimating part 2 in the eleventh embodiment will be explained with reference to FIG. 43.

Figure 47:
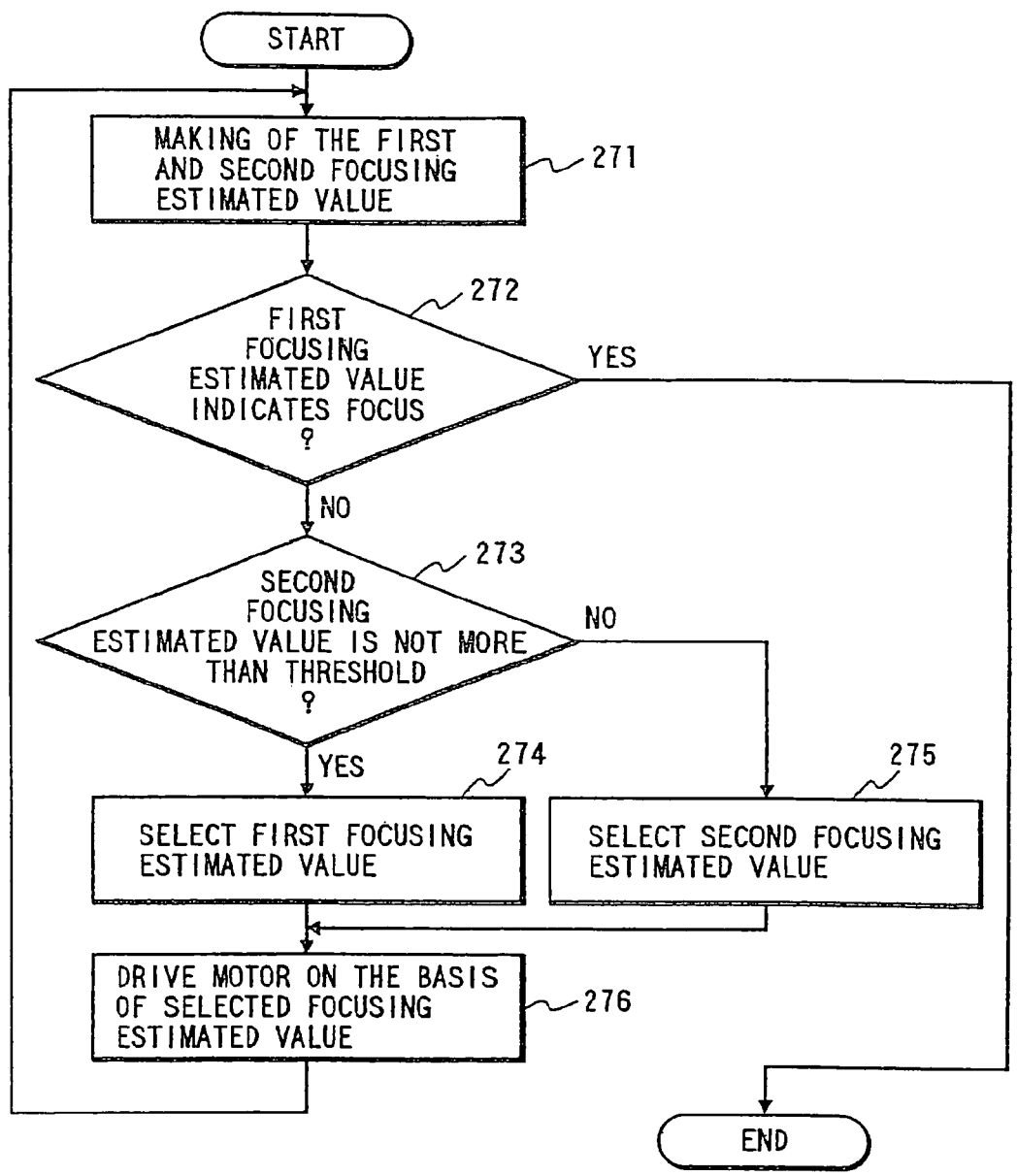
FIG. 47 is an explanatory flowchart showing the operation of the autofocus apparatus illustrated in FIG. 46.

At first, the picture signal making device 22 converts the image formed on the imaging element 21 through the photographing optical system 1 into a picture signal (step 301). As described in the prior art, the picture signal is, it can be assumed, formed by synthesizing sine waves of a plurality of frequencies. Then, it is well known that a level of high frequency component of the picture signal, as illustrated in FIG. 47, rises more steeply according to a degree of sharpness of the image formed on the imaging element 21 increases, i.e., the focus adjusting lens 11 moves closer to a focusing point A, and this level reaches a peak when the image on the imaging element 21 is focused on. Subsequently, the focusing estimated value creating device 23 causes a level detecting portion 23a to detect a proper high frequency component level at a predetermined sampling interval in consideration of an S/N ratio of the picture signal as well as of an imaging performance of the photographing optical system 1, out of the picture signal obtained by the picture signal making device 22 (step 302). Then, the focusing estimated value creating device 23 creates the focusing estimated value by monitoring a level of this frequency component (step 303). For example, when the level of the selected frequency component rises, it is estimated that the focus adjusting lens 11 is moving in such a direction as to approach a focusing point. Further, when the level of the selected frequency component lowers, it is estimated that the focus adjusting lens 11 is moving in such a direction as to get away from the focusing point. Then, when the level of the selected frequency component exists within a predetermined range (shown by, e.g., ΔV in FIG. 51) from the peak value, it is estimated that the image on the imaging element 21 is focused on.

Note that the processing flow shown in FIG. 43 is repeatedly executed at a predetermined time interval taking a processing speed, etc. in the picture signal creating device 22 into consideration.

Next, an operation of the second focusing estimating part 3 in the eleventh embodiment will be explained with reference to FIG. 44.

To start with, the positional deviation detecting portion 36a detects a deviating direction and a deviation quantity between the images picked up by the line sensors 34a, 34b on the basis of the signals transmitted from the image processing device 35 (step 401). As stated in the prior art, when the light beams traveling through the image forming lens 32 are focused on the predetermined focal surface 37, some of the light beams are again formed on the line sensors 34a, 34b by the image re-forming lenses 33a, 33b. Hence, if focused on the predetermined focal surface 37, the images picked up by the two line sensors 33a, 33b are formed in substantially coincident positions on the line sensors. On the other hand, when the light beams passing through the image forming lens 32 are focused on anterior to the predetermined focal surface 37 (which is the so-called rear focus state), there must be a deviation between the images picked up by the two line sensors 34a, 34b. Also, when the light beams passing through the image forming lens 32 are focused on posterior to the predetermined focal surface 37 (which is the so-called front focus state), there must be a deviation in a direction opposite to the one in the rear focus state between the images picked up by the two line sensors 34a, 34b. Based on the deviating direction and deviation quantity between the images picked by the line sensors 34a, 34b, it can be therefore estimated how far the image on the predetermined focal surface 37 exists away from the focusing point.

Next, the correcting portion 36b corrects the image positional deviation detected by the positional deviation detecting portion 36a, with the correction value stored in the defocus storage device 7 (step 402). Incidentally, the following is an elucidation of the reason why the image positional deviation detected by the positional deviation detecting portion 36a is corrected with the correction value stored in the defocus storage device 7.

If the predetermined focal surface 37 and the imaging element 21 of the first focusing estimating part 2 are coincident with each other in terms of their optical positions, viz., if the image on the imaging element 21 is focused on when the image on the predetermined focal surface 37 is focused on, there can be directly made an estimation as to whether or not the image on the imaging element 21 is focused on in accordance with the image deviating direction and quantity that are detected by the positional deviation detecting portion 36a. However, if the optical positions of the predetermined focal surface 37 and of the imaging element 21 deviate from each other, and if the predetermined focal surface 37 and the imaging element 21 deviate in terms of their optical positions due to, e.g., a tracking adjustment, the image on the imaging element 21 is not focused on when the image on the predetermined focal surface 37 is focused on. Therefore, the estimation as to whether or not the image on the imaging element 21 is focused on is made based on the image deviating direction and quantity that are detected by the positional deviation detecting portion 36a, the focusing accuracy declines. This being the case, the correcting portion 36b corrects the image positional deviation detected by the positional deviation detecting portion 36a, with the correction value stored in the defocus storage device 7.

Next, the estimated value creating portion 36c creates the second focusing estimated value indicating a moving direction and a moving quantity of the focus adjusting lens 11, which are needed for focusing the image on the imaging element 21, on the basis of the positional deviating direction and quantity that are corrected by the correcting portion 36b (step 403).

Note that the processing flow shown in FIG. 44 is repeatedly executed at a predetermined time interval in consideration of the processing speed, etc. in the image processing device 35.

Next, an operation of the defocus storage device 7 in the eleventh embodiment will be explained with reference to FIG. 46.

To begin with, in step 501, there is judged whether or not the first focusing estimated value created by the focusing estimated value creating device 23 indicates the purport that the image on the imaging element 21 is focused on. If the first focusing estimated value indicates this purport, the processing proceeds to step 502. Whereas if not, there must be waited till the first focusing estimated value indicates that purport. Stored as a correction value in step 502 are the deviating direction and deviation quantity between the images picked up by the line sensors 34a, 34b that are detected by the positional deviation detecting portion 36a, i.e., a defocus quantity between the image on the predetermined focal surface 37 and the image on the imaging element 21 of the focusing estimating part 2.

Note that the processing flow shown in FIG. 45 may be executed according to a command from the user or the like. For example, when the command of the user is inputted to a predetermined button, a slide switch and so on, the processing flow shown in FIG. 45 may be executed. With this operation, when under a photographic condition enough to ensure a detection accuracy of the level detecting portion 23a and of the positional deviation detecting portion 36a, the user switches ON the predetermined button or slide switch, thereby making it possible to detect the defocus quantity with a high precision between the image on the predetermined focal surface 37 and the image on the imaging element 21. The processing flow shown in FIG. 45 may also be repeatedly executed during the operation of the apparatus in the eleventh embodiment. A plurality of correction values may be thereby obtained, and, from these plurality of correction values, the defocus quantity between the image on the predetermined focal surface 37 and the image on the imaging element value can be enhanced. Moreover, the user performs the tracking adjustment or the like, and, even if the defocus quantity between the image on the predetermined focal surface 37 and the image on the imaging element 21 changes, a new defocus quantity can be automatically stored.

In accordance with the eleventh embodiment, the first focusing estimating part 2 creates the first focusing estimated value by use of the so-called crest climbing method, while the second focusing estimating part 3 creates the second focusing estimated value by employing the so-called image deviation method. Further, the focusing method selecting device 4 selects the second focusing estimated value when the second focusing estimated value created by the second focusing estimating part 3 is above the threshold value, and selects the first focusing estimated value when under the threshold value. Then, the motor driving device 6, based on the focusing estimated value selected by the focusing method selecting device 4, drives the motor 5 to move the focus adjusting lens 11. With this operation, to begin with, the image on the imaging element 21 is roughly focused on by use of the second focusing estimated value, and thereafter the image on the imaging element 21 is finely focused on by use of the first focusing estimated value. Accordingly, in the imaging element 21 can be focused on quickly with a high accuracy. Further, the high accuracy is not required of the second focusing estimating part 3 using the image deviation method, and hence the costs can be restrained from rising.

Moreover, in the eleventh embodiment, the defocus storage device 7 is stored with the defocus quantity as the correction value between the image on the predetermined focal surface 37 and the image on the imaging element 21, and the imaging positional deviation detected by the positional deviation detecting portion 36a is corrected with the relevant correction value. The second focusing estimated value is created based on the thus corrected imaging positional deviation between the images. Therefore, even if the deviation between the optical positions of the predetermined focal surface 37 and of the imaging element 21 is caused due to, e.g., the tracking adjustment with the result that the image on the imaging element 21 is not focused on when the image on the predetermined focal surface 37 is focused on, the focusing accuracy of the second focusing estimated value can be prevented from declining.

Note that the image on the imaging element 21 is focused on by use of the first focusing estimated value in the end in accordance with the eleventh embodiment, second focusing estimated value declines, the final focusing accuracy of the image on the imaging element 21 does not change. If the focusing accuracy of the second focusing estimated value declines, however, a time of focusing operation involving the use of the first focusing estimated value created by the first focusing estimating part 2 elongates correspondingly. As a result, a time needed for focusing the image on the imaging element 21 elongates. In this respect, according to the eleventh embodiment, as discussed above, the focusing accuracy of the second focusing estimated value can be prevented from declining, and therefore, even if there might be caused the deviation between the optical positions of the predetermined focal surface 37 and the imaging element 21 due to the tracking adjustment, etc., the image on the imaging element 21 can be focused on quickly with the high precision.

Furthermore, in the eleventh embodiment, a focal length of the optical system for forming the images for detecting the image deviation on the line sensors 34a, 34b, is a synthetic focal length of the focus adjusting lens 11, the variable magnification lens 12, the correcting lens 13 and the image forming lens 32. On the other hand, a focal length of the optical system for forming the image for the picture signal on the focus adjusting lens 11, the variable magnification lens 12, the correcting lens 13 and the image forming lens 14. Therefore, the focal lengths of the optical system for forming the images for detecting the image deviation and of the optical system for forming the image for the picture signal, are varied by changing the configurations of the image forming lenses 14, 32, videlicet, the sizes of the images formed by the respective optical systems can be varied. For instance, the image forming lens 32 is constructed to enlarge the images for detecting the image deviation by increasing the focal length of the optical system for forming the images for detecting the image deviation, whereby the pixel pitches of the line sensors 34a, 34b become finer relatively to the above images. Hence, it is feasible to focus even a minute object. Further, for example, the image forming lens 32 is constructed to diminish the images for detecting the image deviation by shortening the focal length of the optical system for forming the images for detecting the image deviation, whereby the sizes of these images become smaller relatively to the line sensors 34a, 34b. Therefore, it is possible to detect a larger quantity of image deviation. Even if the focus adjusting lens is positioned far from the focusing point (which is the so-called largely defocused state), the focusing point can be downsized.

The present invention is not confined to the embodiment discussed above but may be modified in a variety of forms within the scope of the gist thereof. For example, in the eleventh embodiment, the defocus storage device 7 has been thus far explained as the one for storing the positional deviation between the images on the line sensors 34a, 34b that is detected by the positional deviation detecting portion 36a as the defocus quantity between the image on the predetermined focal surface 37 and the image on the imaging element 21 of the focusing estimating part 2 when the first focusing estimating part 2 creates the first focusing estimated value indicating that the image on the imaging element 21 is focused on. The present invention is not, however, limited to this. For instance, a defocus quantity detected when manufacturing the camera to which the eleventh embodiment is applied and a defocus quantity predicted when designed, may be previously written to a ROM, etc.

Further, the eleventh embodiment has been described so far, wherein there are provided the first focusing estimating part of the crest climbing type and the second focusing estimating part of the image deviation type, the correction value is used for the focusing estimating part. The present invention is not, however, restricted to this. There may suffice the apparatus according to the present invention, which comprises the plurality of focusing estimating parts for creating the focusing estimated values for focusing the image upon the object, which image is formed on the predetermined plane by the photographing optical system, the storage device stored with the correction value for the focusing estimated value created at least one of these focusing estimating parts, and the correcting portion for correcting the focusing estimated value with the correction value, which estimated value corresponds to the correction value stored in the storage device.

Moreover, the autofocus apparatus in the eleventh embodiment can be applied to not only the video camera but also other cameras such as the electronic still camera, etc.

A twelfth embodiment of the present invention will be hereinafter discussed with reference to the drawings.

Figure 46:
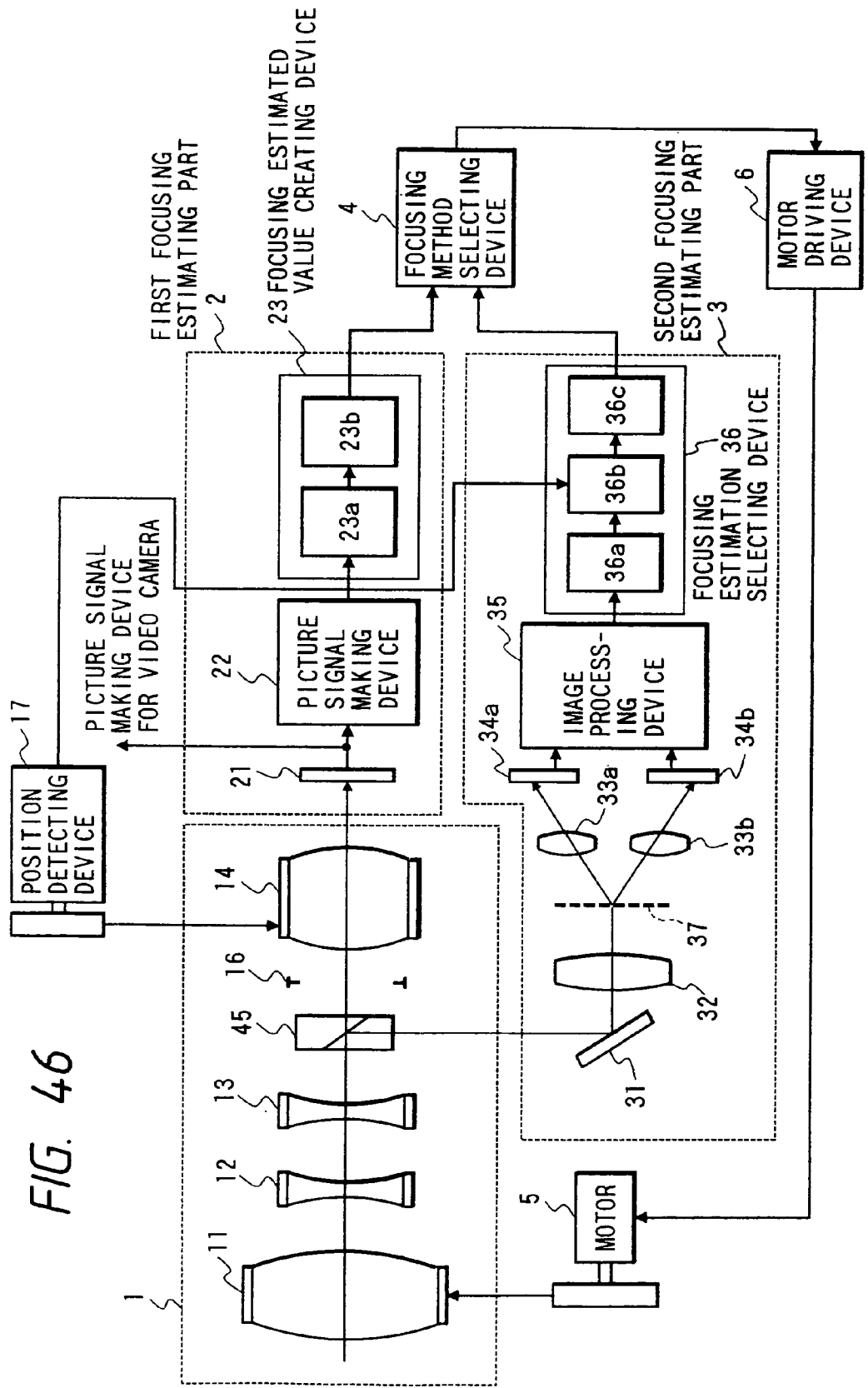
FIG. 46 is a schematic block diagram illustrating the autofocus apparatus in a twelfth embodiment of the present invention.
Figure 48:
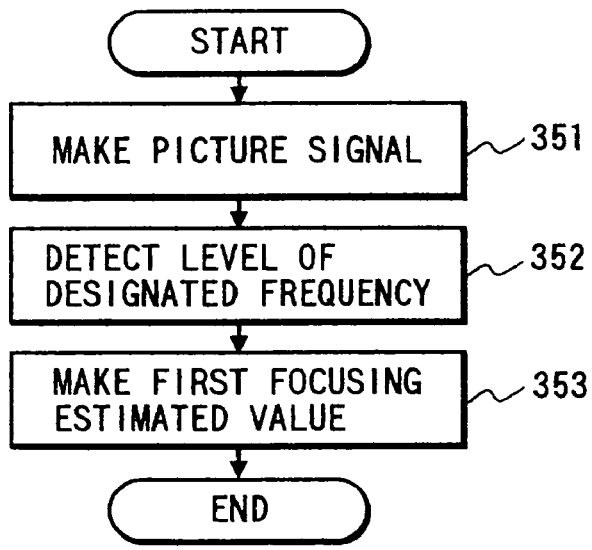
FIG. 48 is an explanatory flowchart showing the operation of the first focusing estimating portion illustrated in FIG. 46.
Figure 49:
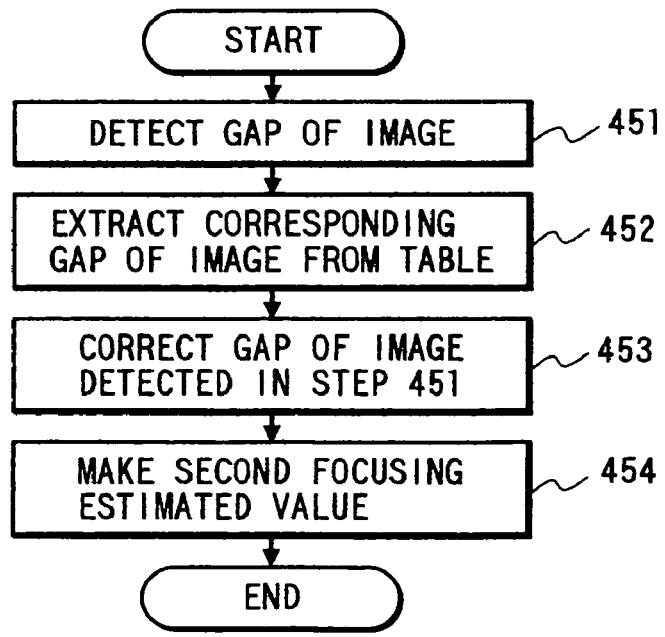
FIG. 49 is an explanatory flowchart showing the operation of the second focusing estimating portion illustrated in FIG. 46.

FIG. 46 is a schematic block diagram illustrating an autofocus apparatus in the twelfth embodiment of the present invention. FIG. 47 is an explanatory flowchart showing an operation of the autofocus apparatus illustrated in FIG. 46. FIG. 48 is an explanatory estimating part illustrated in FIG. 46. FIG. 49 is an explanatory flowchart showing an operation of the second focusing estimating part shown in FIG. 46.

The autofocus apparatus in the twelfth embodiment includes, as illustrated in FIG. 46, the photographing optical system 1, the first focus estimating part 2, the second focusing estimating part 3, the focusing method selecting device 4, the motor 5, the motor driving device 6, and a position detecting device 17. Incidentally, if the autofocus apparatus in the twelfth embodiment is applied to the video camera, etc., it is a general construction that the lens barrel incorporates the photographing optical system 1 and the motor 5, while the camera body incorporates other constructive elements. The present invention is not, however, limited to this construction.

The photographing optical system 1 is constructed of four lens units such as the focus adjusting lens 11, the variable magnification lens 12, the correcting lens 13, and the image forming lens 14. This construction is typical of the lens barrel for a TV camera. In the photographing optical system 1 used in the twelfth embodiment, the optical element (e.g., the beam splitter) 45 for splitting light beams and the stop 16 are interposed in between the correcting lens 13 and the image forming lens 14. Note that the optical the light beams can be transmitted to the second focusing estimating part 3 irrespective of an aperture quantity of an aperture stop of the photographing optical system 1 in the twelfth embodiment.

The position detecting device 17 detects an item of data for specifying a position of the image forming lens 14.

The first focusing estimating part 2 estimates focusing by the so-called crest climbing method. The first focusing estimating part 2 includes the imaging element 21 for picking up an image formed by the image forming lens 14 of the photographing optical system 1 and converting it into an electric signal, and the picture signal making device 22 for generating a picture signal corresponding to the electric signal transmitted from the imaging element 21. The first focusing estimating part 2 also includes the focusing estimated value creating device 23 for creating the data (the first focusing estimated value) for focusing the image formed on the imaging element 21 on the basis of the picture signal given from the picture signal making device 22. The focusing estimated value creating device 23 has the level detecting portion 23a for detecting a level of a proper frequency component from the picture signal generated by the picture signal making device 22, and the estimated value creating value by examining the level detected by the level detecting portion 23a. Note that the electric signal outputted from the imaging element 21 is used also for generating the picture signal of the video camera as illustrated in FIG. 46.

The second focusing estimating part 3 estimates focusing by the so-called image deviation method. The second focusing estimating part 3 comprises the mirror 31 for reflecting the light beam split by the optical element 45, toward a predetermined direction, and the image forming lens 32 for forming light beams incident via the mirror 31 into a conjugate image. The second focusing estimating part 3 further comprises the image re-forming lenses 33a, 33b for forming some of the light beams image formed by the image forming lens 32, again into images, the line sensors 34a, 34b for respectively picking up the images formed by the image re-forming lenses 33a, 33b and converting them into electric signals, the image processing device 35, and the focusing estimates value creating device 36.

The image re-forming lenses 33a, 33b are disposed in positions substantially symmetric with respect to the optical axis of the image forming lens 32. More specifically, the image reforming lenses 33a, 33b are so disposed as to individually re-form the images of the light beams passing through portions having the focus adjusting lens 11, the variable magnification lens 12, the correcting lens 13 and the image forming lens 32, among the light beams for forming the image formed by the image forming lens 32. The line sensors 34a, 34b are disposed in the positions substantially symmetric with respect to the optical axis of the image forming lens 32 and on a predetermined focal surface of the image re-forming lenses 33a, 33b corresponding to each other. The image processing device 35 executes the image processing based on the electric signals transmitted respectively from the line sensors 34a, 34b. The focusing estimated value creating device 36 creates the data (the second focusing estimated value) for focusing the image on the imaging element 21 on the basis of the signal transmitted from the image processing device 35. The focusing estimated value creating device 36 includes the positional deviation detecting portion 36a for detecting an imaging positional deviation (a deviating direction and a deviation quantity) between the image on the imaging element 34a and the image on the imaging element 34b on the basis of the signal transmitted from the image processing device 35, the correcting portion 36b for correcting the imaging positional deviation detected by the positional deviation detecting portion 36a, and the estimated value creating portion 36b for creating the positional deviation corrected by the correcting portion 36b.

The correcting portion 36b is stored with a table showing a relationship between the position of the image forming lens 14 and the imaging positional deviation detected by the positional deviation detecting portion 36a when focusing the image on the imaging element 21 upon the object. The correcting portion 36b obtains an imaging positional deviation corresponding to the position data of the image forming lens 14, which is detected by the position detecting device 7 from that table, and corrects the imaging positional deviation detected by the positional deviation detecting portion 36a, with the thus obtained imaging position deviation serving as a correction value.

The focusing method selecting device 4 selects at least one of the first focusing estimated value created by the first focusing estimating part 2 and the second focusing estimated value created by the second focusing estimating part 3. In accordance with the twelfth embodiment, referring first to the second focusing estimated value, if the defocus quantity or the required-for-focusing moving quantity of the focus adjusting lens 11 is larger than a threshold value, the second focusing estimated value is set to be selected, focusing estimated value is set to be selected. Note that this threshold value may also be set arbitrarily by the photographer and so forth through inputting from outside.

The motor driving device 6 drives the motor 5 on the basis of the focusing estimated value selected by the focusing method selecting device 4. Based on a command given from the motor driving device 6, the motor 5 moves the focus adjusting lens 11 forward and backward in the optical-axis direction of the photographing optical system 1.

Incidentally, the focusing estimated value creating devices 23, 36, and the focusing method selecting device 4 are integrally constructed of, e.g., the CPU (Central Processing Unit), etc.

Next, an operation of the autofocus apparatus in the twelfth embodiment will be described.

To start with, the operation of the autofocus apparatus as a whole in the twelfth embodiment will be explained with reference to FIG. 47.

At first, upon an incidence of the light beams upon the photographing optical system 1 from the object, the first focusing estimating part 2 creates the first focusing estimated value on the basis of the light beams obtained via the image forming lens 14 in the photographing optical system 1. Further, the focusing estimated value based on the light beams split by the optical element 45 in the photographing optical system 1 (step 271).

Next, the focusing method selecting device 4 judges whether or not the first focusing estimated value gives an indication of being focused (step 272). If the first focusing estimated value indicates a purport of being focused, a flow of processing shown in FIG. 47 comes to an end. Whereas if not, the processing proceeds to step 273.

In step 273, the focusing method selecting device 4 refers to the second focusing estimated value, and judges whether or not the defocus quantity or the required-for-focusing moving quantity of the focus adjusting lens 11 is under the threshold value. If the required-for-focusing moving quantity of the focus adjusting lens 11 is under the threshold value, the first focusing estimated value created by the first focusing estimating part 2 is selected (step 274). Whereas if above the threshold value, the second focusing estimated value selected by the second focusing estimating part 3 is selected (step 275).

Next, the motor driving device 6 drives the motor on the basis of the focusing estimated value selected by the focusing method selecting device 4 (step 276). When the second focusing estimated value is selected by driving device 6 drives the motor 5 so that the focus adjusting lens 11 is moved in the moving direction by the moving quantity, which are indicated by the selected second focusing estimated value. Further, when the first focusing estimated value is selected by the focusing method selecting device 4, it is estimated that the focus adjusting lens 11 is moving in such a direction as to approach a focusing point. At this time, the motor 5 is driven to make the rotating direction thereof remain unchanged. Moreover, when it is estimated that the focus adjusting lens 11 is moving in such a direction as to get away from the focusing point, the motor 5 is driven to reverse the rotating direction thereof.

The processing flow shown in FIG. 47 is repeatedly executed till the first focusing estimated value comes to have a content of being focused. The image on the imaging element 21 is thereby focused on.

Subsequently, an operation of the first focusing estimating part 2 in the twelfth embodiment will be explained with reference to FIG. 48.

At first, the picture signal making device 22 converts the image formed on the imaging element 21 through the photographing optical system 1 into a picture signal (step 351). As described in the prior art, the picture signal is, it can be assumed, formed frequencies. Then, it is well known that a level of high frequency component of the picture signal, as illustrated in FIG. 51, rises more sharply according as a degree of sharpness of the image formed on the imaging element 21 increases, i.e., the focus adjusting lens 11 moves closer to a focusing point A, and this level reaches a peak when the image on the imaging element 21 is focused on. Subsequently, the focusing estimated value creating device 23 causes a level detecting portion 23a to detect a proper high frequency component level at a predetermined sampling interval in consideration of an S/N ratio of the picture signal as well as of an imaging performance of the photographing optical system 1, out of the picture signal of the picture signal making device 22 (step 352). Then, an estimated value creating portion 23b creates the first focusing estimated value by monitoring a change in the detected level (step 353). For example, when the level of the selected frequency component rises, it is estimated that the focus adjusting lens 11 is moving in such a direction as to approach a focusing point. Further, when the level of the selected frequency component lowers, it is estimated that the focus adjusting lens 11 is moving in such a direction as to get away from the focusing point. Then, when the level of the selected frequency component exists within a from the peak value, it is estimated that the image on the imaging element 21 is focused on.

Note that the processing flow shown in FIG. 48 is repeatedly executed at a predetermined time interval taking a processing speed, etc. in the picture signal creating device 22 into consideration.

Next, an operation of the second focusing estimating part 3 in the twelfth embodiment will be explained with reference to FIG. 49.

To start with, the positional deviation detecting portion 36a detects a deviating direction and a deviation quantity between the images picked up by the line sensors 34a, 34b on the basis of the signals transmitted from the image processing device 35 (step 451). As stated in the prior art, when the light beams traveling through the image forming lens 32 are focused on the predetermined focal surface 37, some of the light beams are again formed on the line sensors 34a, 34b by the image re-forming lenses 33a, 33b. Hence, if focused on the predetermined focal surface 37, the images picked up by the two line sensors 33a, 33b are formed in substantially coincident positions on the line sensors. On the other hand, when the light beams passing through the image forming lens 32 are focused on anterior to the predetermined focal surface 37 (which is the so-called rear focus state), there must line sensors 34a, 34b. Also, when the light beams passing through the image forming lens 32 are focused on posterior to the predetermined focal surface 37 (which is the so-called front focus state), there must be a deviation in a direction opposite to the one in the rear focus state between the images picked up by the two line sensors 34a, 34b. Based on the deviating direction and deviation quantity between the images picked by the line sensors 34a, 34b, it can be therefore estimated how far the image on the predetermined focal surface 37 exists away from the focusing point.

Next, the correcting portion 36b obtains the imaging positional deviation corresponding to the data about the position of the image forming lens 14 which position is detected by the position detecting device from the stored table (step 452), and corrects the imaging positional deviation detected by the positional deviation detecting portion 36a, with the thus obtained imaging positional deviation serving as a correction value (step 453). Incidentally, the following is an elucidation of the reason why the imaging positional deviation detected by the positional deviation detecting portion 36a is corrected based on the position data of the image forming lens 14.

If the predetermined focal surface 37 and the part 2 are coincident with each other in terms of their optical positions, viz., if the image on the imaging element 21 is focused on when the image on the predetermined focal surface 37 is focused on, there can be directly made an estimation as to whether or not the image on the imaging element 21 is focused on in accordance with the image deviating direction and quantity that are detected by the positional deviation detecting portion 36a. However, if the optical positions of the predetermined focal surface 37 and of the imaging element 21 deviate from each other, and if the predetermined focal surface 37 and the imaging element 21 deviate in terms of their optical positions due to, e.g., the tracking adjustment, the image on the imaging element 21 is not focused on when the image on the predetermined focal surface 37 is focused on. Therefore, the estimation as to whether or not the image on the imaging element 21 is focused on is made based on the image deviating direction and quantity that are detected by the positional deviation detecting portion 36a, the focusing accuracy declines. Such being the case, in the twelfth embodiment, the correcting portion 36b is stored with the table indicating the relationship between the position of the image forming lens and the imaging positional deviation detected by the positional deviation detecting portion on the object. Detected from this table is the imaging positional deviation corresponding to the data about the position of the image forming lens 14, which position is detected by the position detecting device 17. Then, the imaging positional deviation detected by the positional deviation detecting portion 36a is corrected, with the thus detected imaging positional deviation serving as a correction value.

Next, the estimated value creating portion 36c creates the second focusing estimated value indicating a moving direction and a moving quantity of the focus adjusting lens 11, which are needed for focusing the image on the imaging element 21, on the basis of the positional deviating direction and quantity of the imaging positional deviation corrected by the correcting portion 36b (step 454).

Note that the processing flow shown in FIG. 49 is repeatedly executed at a predetermined time interval in consideration of the processing speed, etc. in the image processing device 35.

In the twelfth embodiment, the first focusing estimating part 2 creates the first focusing estimated value by use of the so-called crest climbing method, while the second focusing estimating part 3 creates the second focusing estimated value by employing the so-called image deviation method. Further, the focusing estimated value when the second focusing estimated value created by the second focusing estimating part 3 is above the threshold value, and selects the first focusing estimated value when under the threshold value. Then, the motor driving device 6, based on the focusing estimated value selected by the focusing method selecting device 4, drives the motor 5 to move the focus adjusting lens 11. With this operation, to begin with, the image on the imaging element 21 is roughly focused on by use of the second focusing estimated value, and thereafter the image on the imaging element 21 is finely focused on by use of the first focusing estimated value. Accordingly, in accordance with the twelfth embodiment, the image on the imaging element 21 can be focused on quickly with a high accuracy. Further, the high accuracy is not required of the second focusing estimating part 3 using the image deviation method, and hence the costs can be restrained from rising.

Moreover, in the twelfth embodiment, the imaging positional deviation corresponding to the data of the position of the image forming lens 14 that is detected by the position detecting device 7, is detected from the table, with which the correcting portion 36b is stored, showing the relationship between the position of the image forming lens 14 and the imaging positional detecting portion 36a when the image on the imaging element 21 is focused on the object. Then, with the detected imaging positional deviation serving as the correction value, the imaging positional deviation detected by the positional deviation detecting portion 36a is corrected. Therefore, even if there might be caused the deviation between the optical positions of the predetermined focal surface 37 and of the imaging element 21 because of the image forming lens 14 being moved due to, e.g., the tracking adjustment with the result that the image on the imaging element 21 is not focused on when the image on the predetermined focal surface 37 is focused on, the focusing accuracy of the second focusing estimated value can be prevented from declining.

Note that the image on the imaging element 21 is focused on by use of the first focusing estimated value in the end in accordance with the twelfth embodiment, and hence, even when the focusing accuracy of the second focusing estimated value declines, the final focusing accuracy of the image on the imaging element 21 does not change. If the focusing accuracy of the second focusing estimated value declines, however, a time of focusing operation involving the use of the first focusing estimated value created by the first focusing estimating part 2 elongates correspondingly. the imaging element 21 elongates. In this respect, according to the twelfth embodiment, as discussed above, the focusing accuracy of the second focusing estimated value can be prevented from declining, and therefore, even if there might be caused the deviation between the optical positions of the predetermined focal surface 37 and the imaging element 21 due to the tracking adjustment, etc., the image on the imaging element 21 can be focused on quickly with the high precision.

Furthermore, in the twelfth embodiment, a focal length of the optical system for forming the images for detecting the image deviation on the line sensors 34a, 34b, is a synthetic focal length of the focus adjusting lens 11, the variable magnification lens 12, the correcting lens 13 and the image forming lens 32. On the other hand, a focal length of the optical system for forming the image for the picture signal on the imaging element 21, is a synthetic focal length of the focus adjusting lens 11, the variable magnification lens 12, the correcting lens 13 and the image forming lens 14. Therefore, the focal lengths of the optical system for forming the images for detecting the image deviation and of the optical system for forming the image for the picture signal, are varied by changing the configurations of the image forming lenses 14, 32, respective optical systems can be varied. For instance, the image forming lens 32 is constructed to enlarge the images for detecting the image deviation by increasing the focal length of the optical system for forming the images for detecting the image deviation, whereby the pixel pitches of the lines sensors 34a, 34b become finer relatively to the above images. Hence, it is feasible to focus even a minute object. Further, for example, the image forming lens 32 is constructed to diminish the images for detecting the image deviation by shortening the focal length of the optical system for forming the images for detecting the image deviation, whereby the sizes of these images become smaller relatively to the line sensors 34a, 34b. Therefore, it is possible to detect a larger quantity of image deviation. Even if the focus adjusting lens is positioned far from the focusing point (which is the so-called largely defocused state), the focusing point can be thereby quickly detected. Also, the apparatus can be downsized.

Next, a thirteenth embodiment of the present invention will be hereinafter discussed with reference to the drawings.

Figure 50:
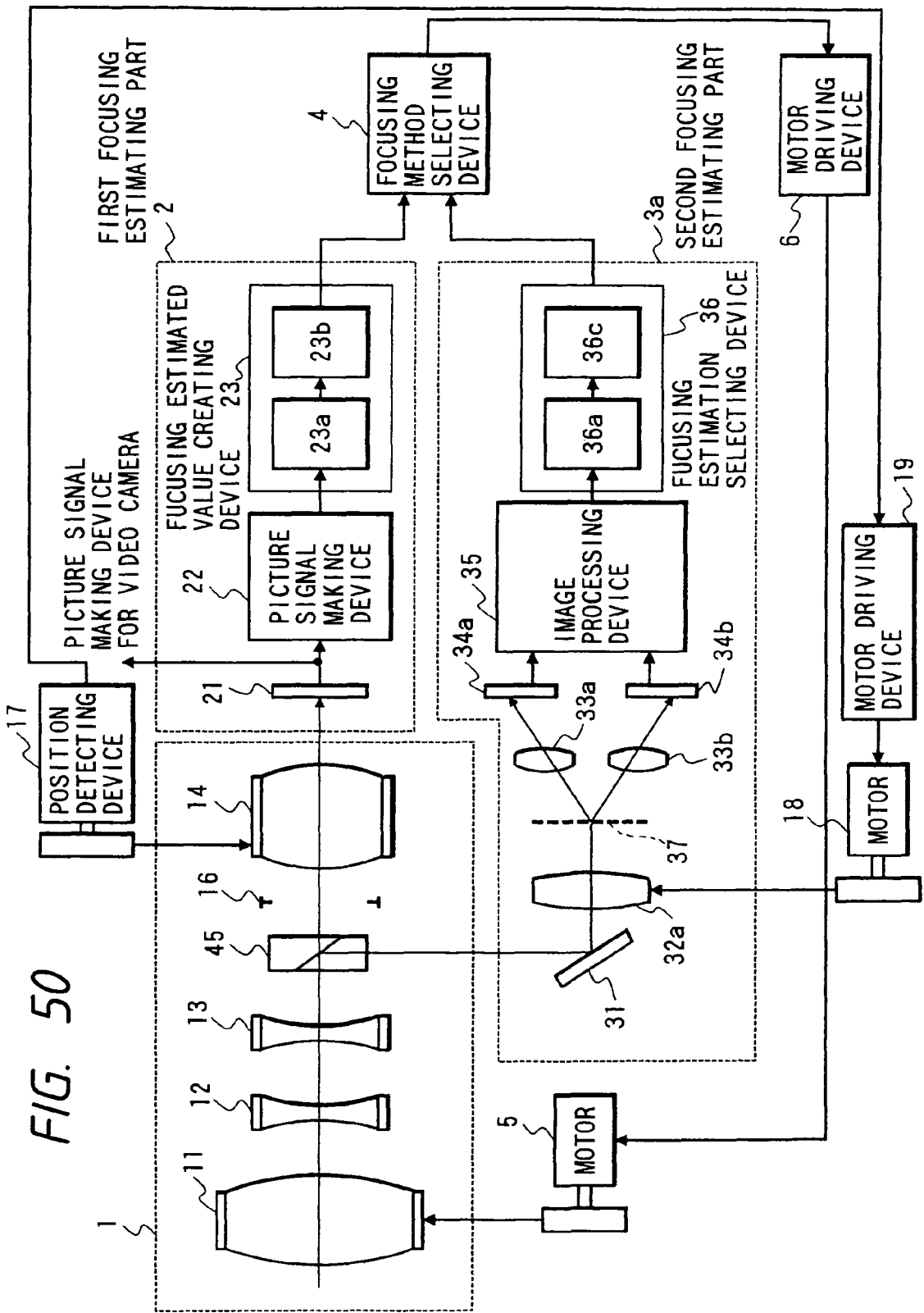
FIG. 50 is a schematic block diagram showing the autofocus apparatus in a thirteenth embodiment of the present invention.

FIG. 50 is a schematic block diagram illustrating the autofocus apparatus in the thirteenth embodiment of the present invention. Note that the elements having shown in FIG. 46 are marked with the like or corresponding numerals in the thirteenth embodiment of the present invention, and the detailed explanations thereof are omitted.

A different point of the autofocus apparatus in the thirteenth embodiment from the twelfth embodiment shown in FIG. 46, is that a second focusing estimating part 3a substitutes for the second focusing estimating part 3, and there are provided a motor 18 and a motor driving device 19.

The second focusing estimating part 3a is different from the second focusing estimating part 3 shown in FIG. 46 in terms of such a point that an image forming lens 32a for forming the light beams incident via the mirror 31 and emerging from the object into a conjugate image, is so disposed as to be movable in the optical-axis direction and that the focusing estimated value creating device 38 does not include the correcting portion 36b. The focusing estimated value creating device 38 makes the estimated value creating portion 36c create the second focusing estimated value based on the deviating direction and the deviation quantity of the imaging positional deviation detected by the positional deviation detecting portion 36a.

The motor driving device 19 is stored with a table showing a relationship between the position of the forming lens 32a, from which the image on the imaging element 21 and the image on the predetermined focal surface 37 become conjugate to each other. The motor driving device 19 obtains the position of the image forming lens 32a which corresponds to data about the position of the position of the image forming lens 14, which position is detected by the position detecting device 17 from that table, and drives the motor 18 so that the image forming lens 32a comes to this obtained position. Incidentally, if a formula well expresses the relationship between the position of the image forming lens 14 and the position of the image forming lens 32a, from which the images on the imaging element 21 and the image on the predetermined focal surface 37 become conjugate to each other, the position of the image forming lens 32a that corresponds to the data of the position of the image forming lens 14 which position is detected by the position detecting device 17, may be obtained by use of this formula instead of using the above table.

Based on a command from the motor driving device 19, the motor 18 moves the image forming lens 32a in the optical-axis direction thereof.

In the thirteenth embodiment, the position of the image forming lens 32a that corresponds to the data of the position of the image forming lens 14 which 17, is detected from the table stored in the motor driving device 19 and showing the relationship between the position of the image forming lens and the position of the image forming lens 32a, from which the image on the imaging element 21 and the image on the predetermined focal surface 37 become conjugated to each other. Then, the image forming lens 32a is moved so that the image forming lens 32a comes to the detected position concerned. Therefore, even when the image forming lens 14 moves due to, e.g., the tracking adjustment, it is possible to prevent the deviation in the optical positions between the predetermined focal surface 37 and the imaging element 21. This further makes it feasible to prevent the focusing accuracy of the second focusing estimated value from declining. Other effects are the same as those in the twelfth embodiment of the present invention.

The present invention is not confined to the respective embodiments discussed above by may be modified in a variety of forms within the scope of the gist thereof. For example, in each of the embodiments given above, the apparatus has been described so far, wherein the crest climbing type first focusing estimating part and the image deviation type second focusing estimating part, are provided, and the focusing estimated value created by the second focusing not, however, limited to this. The apparatus according to the present invention may comprise the plurality of focusing estimating parts for creating the focusing estimated values for focusing, on the object, the image formed on the predetermined plane through the photographing optical system. The apparatus may also comprise the position detecting portion for detecting the position data of the image forming lens in the photographing optical system, and the position detecting portion for detecting the position data of the image forming lens in the photographing optical system. The apparatus may further comprise the correcting portion for correcting the focusing data created by at least one of the focusing estimating parts on the basis of the data about the position of the image forming lens, which position is detected by the position detecting portion.

Moreover, the autofocus apparatus in the embodiments discussed above is applicable to not only the video camera but also other cameras such as an electronic still camera and so on.

As discussed above, in the autofocus apparatus according to the present invention, the first focusing estimating device creates the focusing estimated value, involving the use of the so-called crest climbing method. The second focusing estimating device creates so-called image deviation method. Then, the focusing estimation selecting device selects at least one of the focusing estimated values created by the first and second focusing estimating devices, and the focus adjusting lens is moved based on the thus selected focusing estimated value.

Hence, according to the autofocus apparatus of the present invention, to begin with, the image on the first imaging element is roughly focused on by use of the focusing estimated value of the second focusing estimating device, and thereafter the image on the first imaging element is finely focused on by use of the focusing estimated value of the first focusing estimating device. It is therefore feasible to perform the focusing quickly with the high accuracy.

Further, according to the autofocus apparatus of the present invention, if one of the first and second focusing estimated values is useless, the focusing on the object can be surely performed by selecting the other estimated value.

Moreover, according to the autofocus apparatus of the present invention, at least one of the first and second focusing estimated values is selected referring to the depth of field. With this operation, if the focusing accuracy in the first focusing estimating device is inferior to the focusing accuracy in the estimation selecting device can be set to select the data from the second focusing estimating device. The focusing can be thereby effected quickly with the high precision.

Also, when the autofocus apparatus of the present invention is provided with the above-constructed object dimension calculating device, the object dimension setting device and the focusing object controlling device, it is possible to focus on only a specified object (e.g., human being) from within the photographic area by focusing on the relevant object only when, for instance, the object real dimension calculated by the object dimension calculating device is coincident with the dimension of the photographing target, which dimension is set by the object dimension setting device.

Additionally, when the autofocus apparatus of the present invention is provided with the above-constructed focus area setting device, for example, the focus area of the first focusing estimating device is set smaller than the focus area of the second focusing estimating device. A detection sensitivity of the imaging positional deviation in the second focusing estimating device can be thereby decreased. This enables a resolution of the second imaging element to increase, and therefore the cost for the second Further, in other autofocus apparatuses of the present invention, with the constructions given above, for instance, only when the object real dimension calculated by the object dimension calculating device is coincident with the photographing target dimension set by the object dimension setting device, the focusing on the object concerned is carried out. Thus, it is feasible to focus on only the specified object (e.g., human being) from within the photographic area.

Furthermore, the camera according to the present invention has the above construction and therefore exhibits the same effects as those in the autofocus apparatus of the present invention.

According to the lens barrel of the present invention, with the construction described above, the image on the imaging element can be focused on by employing the two types, i.e., the crest climbing type and the image deviation type of the autofocus systems. Owing to this construction, at first, the image on the imaging element is roughly focused on by using the image deviation method, and, thereafter, the image on the imaging element is finely focused on by using the crest climbing method. The image on the imaging element can be thereby focused on quickly with the high accuracy. Further, since the camera body incorporates the first focusing estimating part usable in common optical system, the lens barrel can be prevented from rising in costs and can be downsized.

Moreover, according to the lens barrel of the present invention, the lens barrel incorporates the two types, viz., the crest climbing type and the image deviation type of the autofocus mechanisms, whereby the image on the imaging element can be focused on quickly with the high precision even if the camera body is constructed not corresponding to the autofocusing.

According to the camera of the present invention, owing to the construction given above, if the camera body does not include the first focusing estimating device, the autofocus function can be actualized by employing the second focusing estimating device of the lens barrel. Further, if the camera body has the first focusing estimating device, the autofocus function can be actualized by using the second focusing estimating device of the lens barrel as well as using the first focusing estimating device of the camera body.

According to the lens barrel of the present invention, the lens barrel incorporates the crest climbing type autofocus mechanism, thereby enabling the image on the imaging element to be focused on highly accurately even though the camera body is constructed not corresponding to the autofocus.

According to the lens barrel of the present deviation type autofocus mechanism, whereby the image on the imaging element can be focused on quickly even if the camera body is constructed not corresponding to the autofocus.

Moreover, according to the present invention, for example, there are provided the crest climbing type and image-deviation type focusing estimating devices. To start with, the image on the predetermined plane is roughly focused on by use of the focusing data of the image deviation type focusing estimating device. Thereafter, the selecting device is set so that the image on the predetermined plane is finely focused on by making use of the focusing data of the crest climbing type focusing estimating device. Thus the focusing can be done quickly with the high accuracy.

Moreover, as one of the plurality of focusing estimating devices, the light beams diverge from the photographing optical system for forming the image on the imaging surface of the camera body as in the image deviation type focusing estimating device, and the image is formed in a different position from the above imaging surface, thus estimating whether or not the image on the imaging surface is focused on by use of the relevant image. Even when using this estimating system, the storage device stores, as the correction value, the deviation in the optical positional body and the surface formed with the image for focusing estimation, and the focusing data of the corresponding focusing estimating device is corrected by using the thus stored correction value, thereby making it feasible to prevent the decline in the focusing accuracy when employing the relevant focusing estimating device.

Further, as one of the plurality of focusing estimating devices, the light beams diverge from the photographing optical system for forming the image on the imaging surface of the camera body as in the image deviation type focusing estimating device, and the image is formed in a different position from the above imaging surface, thus estimating whether or not the image on the imaging surface is focused on by use of the relevant image. Even when using this estimating system, the position data of the image forming lens is detected, and there is obtained the deviation in the optical positional relationship between the imaging surface of the camera body and the surface formed with the image for focusing estimation. Then, the focusing data of the corresponding focusing estimating device is corrected with the thus obtained deviation serving as the correction value, thereby making it possible to prevent the decline in the focusing accuracy when using the relevant focusing estimating device.

range of different working modes can be formed based on the invention without deviating from the spirit and scope of the invention. This invention is not restricted by its specific working modes except being limited by the appended claims.

What is claimed is:

1. An autofocus apparatus comprising:
   a photographing optical system having at least a focus adjusting lens disposed movably and an image forming lens to form, into an image, light beams incident on said focus adjusting lens and emerging from an object;
   a plurality of focusing estimating devices to create focusing data to focus an image formed on a predetermined plane through said photographing optical system, upon the object;
   a storage device stored with a correction value for the focusing data created by at least one of said plurality of focusing estimating devices, said correction value being stored differently from the focusing data;
   an updating device to update the correction value stored in said storage device at a predetermined timing;
   a correcting device to correct, with the correction value, the focusing data corresponding to the correction value stored in said storage device;
   a selecting device to select at least one of said plurality of focusing estimating devices; and
   a moving device to move said focus adjusting lens on the basis of the focusing data created by said focusing estimating device selected by said selecting device, or the relevant corrected focusing data if the relevant corrected focusing data has been corrected by said correcting device.

2. An autofocus apparatus according to claim 1, wherein said predetermined timing in said updating device is a timing in correspondence with operation by the user for updating.

3. An autofocus apparatus according to claim 1, wherein said predetermined timing in said updating device is a timing in correspondence with tracking adjustment.

4. An autofocus apparatus comprising:
- a photographing optical system having at least a focus adjusting lens disposed movably and an image forming lens to form, into an image, light beams incident on said focus adjusting lens and emerging from an object;
- a focusing estimating device to create focusing data to focus an image formed on a predetermined plane through said photographing optical system, upon the object;
- a storage device stored with a correction value for the focusing data created by said focusing estimating device, said correction value being stored differently from the focusing data;
- an updating device to update the correction value stored in said storage device at a predetermined timing;
- a correcting device to correct, with the correction value, the focusing data corresponding to the correction value stored in said storage device; and
- a moving device to move said focus adjusting lens on the basis of the focusing data created by said focusing estimating device, or the relevant corrected focusing data if the relevant corrected focusing data has been corrected by said correcting device.

5. An autofocus apparatus according to claim 4, wherein said predetermined timing in said updating device is a timing in correspondence with operation by the user for updating.

* * * * *

UNITED STATES PATENT AND TRADEMARK OFFICE
CERTIFICATE OF CORRECTION

PATENT NO. : 8,373,792 B2  Page 1 of 1
APPLICATION NO. : 12/591014
DATED : February 12, 2013
INVENTOR(S) : Hiroyuki Kurokawa et al.

It is certified that error appears in the above-identified patent and that said Letters Patent is hereby corrected as shown below:

On Title Page, left column, after item (60) insert:
--(30) Foreign Application Priority Data
Apr. 8, 1996    (JP).................... 8-85192
Apr. 8, 1996    (JP).................... 8-85193
May 10, 1996    (JP).................... 8-116742
May 10, 1996    (JP).................... 8-116743
Jun. 14, 1996    (JP).................... 8-154086
Jun. 14, 1996    (JP).................... 8-154087--

Signed and Sealed this
Thirteenth Day of August, 2013

Teresa Stanek Rea
*Acting Director of the United States Patent and Trademark Office*